(12) United States Patent
Malinowski et al.

(10) Patent No.: US 11,612,210 B2
(45) Date of Patent: Mar. 28, 2023

(54) METHODS FOR COMPRESSION MOLDING FOAM ARTICLES

(71) Applicant: NIKE, Inc., Beaverton, OR (US)

(72) Inventors: Rainer Malinowski, Beaverton, OR (US); Joseph Thomas Muth, North Plains, OR (US); Christian Alexander Steinbeck, Portland, OR (US)

(73) Assignee: NIKE, INC., Beaverton, OR (US)

( * ) Notice: Subject to any disclaimer, the term of this patent is extended or adjusted under 35 U.S.C. 154(b) by 762 days.

(21) Appl. No.: 16/458,606

(22) Filed: Jul. 1, 2019

(65) Prior Publication Data
US 2019/0328083 A1    Oct. 31, 2019

Related U.S. Application Data

(63) Continuation of application No. 16/396,674, filed on Apr. 27, 2019, now Pat. No. 10,383,396.
(Continued)

(51) Int. Cl.
*B29D 35/12* (2010.01)
*B29C 43/02* (2006.01)
(Continued)

(52) U.S. Cl.
CPC ............ *A43B 13/187* (2013.01); *A43B 13/02* (2013.01); *A43B 13/04* (2013.01); *A43B 13/14* (2013.01);
(Continued)

(58) Field of Classification Search
CPC .............. B29D 35/0054; B29D 35/065; B29D 35/085; B29C 43/02; B29C 43/003; B29C 43/021
See application file for complete search history.

(56) References Cited

U.S. PATENT DOCUMENTS 3,906,137 A * 9/1975 Bauer ................... B29C 44/56
                                                        156/196
4,674,204 A    6/1987 Sullivan et al.
(Continued)

FOREIGN PATENT DOCUMENTS

CN    1069692    3/1993
CN    1295920    5/2001
(Continued)

OTHER PUBLICATIONS

Zhang, T.; Lee, S.-J.; Yoo, Y.H.; Park, K.-H.; Kang, H.-J. Compression Molding of Thermoplastic Polyurethane Foam Sheets with Beads Expanded by Supercritical CO2 Foaming, Polymers 2021, 13, 656. https://doi.org/10.3390/polym13040656 (Year: 2021).*
(Continued)

*Primary Examiner* — Seyed Masoud Malekzadeh
*Assistant Examiner* — Jennifer L Groux
(74) *Attorney, Agent, or Firm* — Thomas | Horstemeyer, LLP

(57) ABSTRACT

Compression molded foam articles are provided having a closed cell foam structure comprising a plurality of cells having an anisotropic cell shape. The disclosed compression molded foam articles can be used as components or parts of a variety of articles, including articles of footwear and athletic equipment. Methods are disclosed for making the disclosed compression molded foam articles from a foamed preform having an elastomeric closed cell foam with substantially isotropic cell shape. This abstract is intended as a scanning tool for purposes of searching in the particular art and is not intended to be limiting of the present disclosure.

19 Claims, 41 Drawing Sheets

Related U.S. Application Data

(60) Provisional application No. 62/664,052, filed on Apr. 27, 2018.

(51) Int. Cl.

| | |
|---|---|
| *A43B 13/18* | (2006.01) |
| *A43B 13/02* | (2022.01) |
| *A43B 13/04* | (2006.01) |
| *A43B 13/14* | (2006.01) |
| *B29D 35/02* | (2010.01) |
| *B29D 35/00* | (2010.01) |
| *B29C 43/00* | (2006.01) |
| *B29C 43/52* | (2006.01) |
| *B29C 44/02* | (2006.01) |

(52) U.S. Cl.
CPC .......... *A43B 13/188* (2013.01); *B29C 43/003* (2013.01); *B29C 43/021* (2013.01); *B29C 43/52* (2013.01); *B29C 44/025* (2013.01); *B29D 35/0063* (2013.01); *B29D 35/02* (2013.01); *B29D 35/122* (2013.01)

(56) References Cited

U.S. PATENT DOCUMENTS

| | | | |
|---|---|---|---|
| 5,052,130 A | 10/1991 | Barry et al. | |
| 5,150,490 A | 9/1992 | Busch et al. | |
| 5,879,780 A | 3/1999 | Kindinger et al. | |
| 9,282,785 B2 | 3/2016 | Grondin | |
| 9,968,157 B2 | 5/2018 | Wardlaw et al. | |
| 2005/0166423 A1* | 8/2005 | Norton | B29C 44/0407 36/144 |
| 2010/0029796 A1* | 2/2010 | Alderson | B29C 44/5636 521/142 |
| 2010/0098797 A1 | 4/2010 | Davis et al. | |
| 2010/0325921 A1 | 12/2010 | Wu | |
| 2011/0104478 A1* | 5/2011 | Simard | B29C 44/586 264/48 |
| 2014/0068840 A1 | 3/2014 | Nauman et al. | |
| 2016/0039162 A1* | 2/2016 | Murphy | C08J 9/10 521/170 |
| 2016/0192862 A1 | 7/2016 | Merrell et al. | |
| 2017/0197342 A1 | 7/2017 | Jacobs | |
| 2017/0325546 A1 | 11/2017 | Becker et al. | |
| 2018/0168284 A1 | 6/2018 | Robertson et al. | |
| 2018/0317606 A1 | 11/2018 | Schneider et al. | |

FOREIGN PATENT DOCUMENTS

| | | |
|---|---|---|
| CN | 107920623 | 4/2018 |
| EP | 2767183 A1 | 8/2014 |
| EP | 2786670 A1 | 10/2014 |
| EP | 3649881 A1 | 5/2020 |
| TW | 201509638 | 3/2015 |
| WO | 2017160874 A1 | 9/2017 |
| WO | 2019236500 A1 | 12/2019 |

OTHER PUBLICATIONS

Written Opinion for PCT/US2019/029545, dated Mar. 26, 2020.
International Preliminary Report on Patentability for PCT/US2019/029545 dated Jul. 9, 2020.
Written Opinion of the International Searching Authority for PCT/US2019/02954 dated Mar. 26, 2020.
International Search Report and Written Opinion for PCT/US2019/029545 dated Jul. 19, 2019.
International Search Report and Written Opinion for PCT/US2022/070244, dated Apr. 25, 2022.
Written Opinion of the International Preliminary Examining Authority for PCT/US2022/070244, dated Sep. 29, 2022.
International Preliminary Report on Patentability for PCT/US2022/070244, dated Jan. 18, 2023.

* cited by examiner

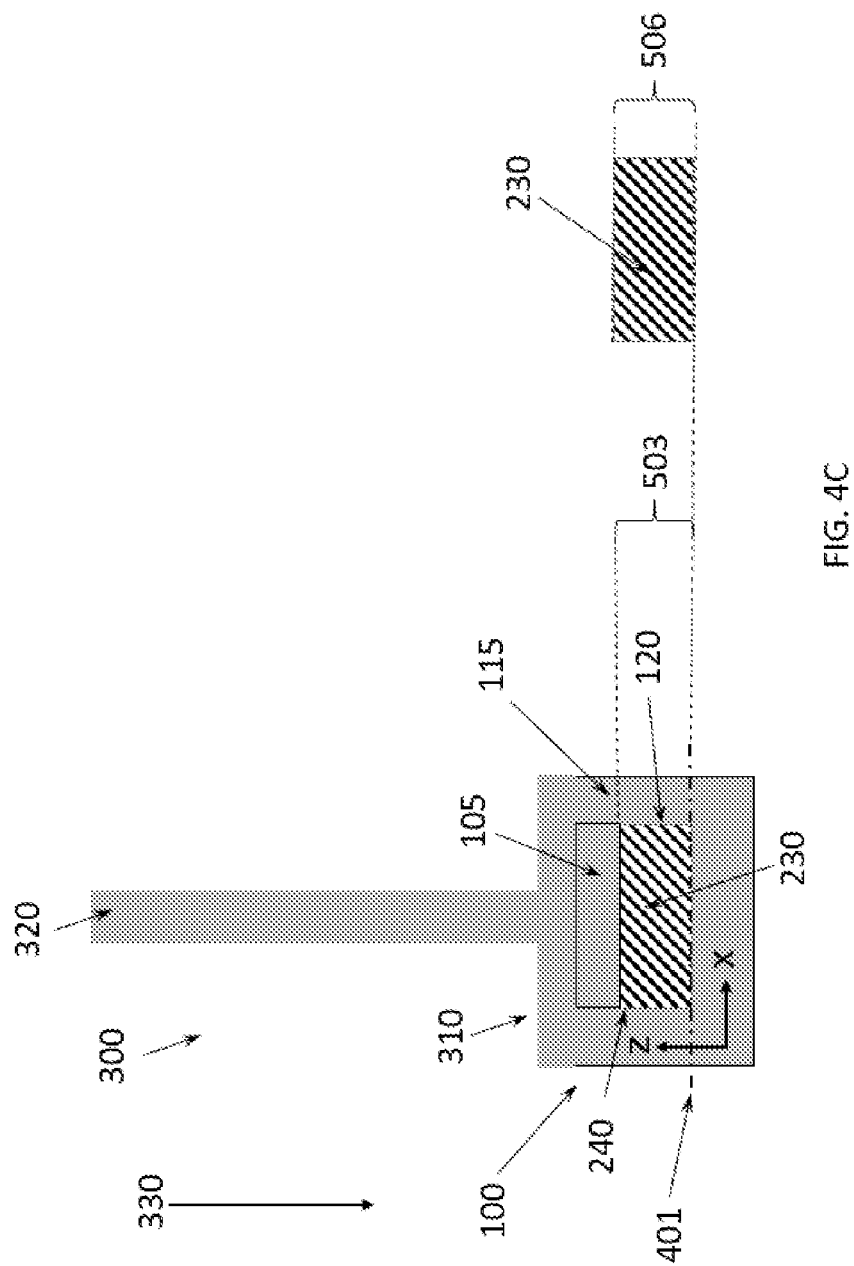

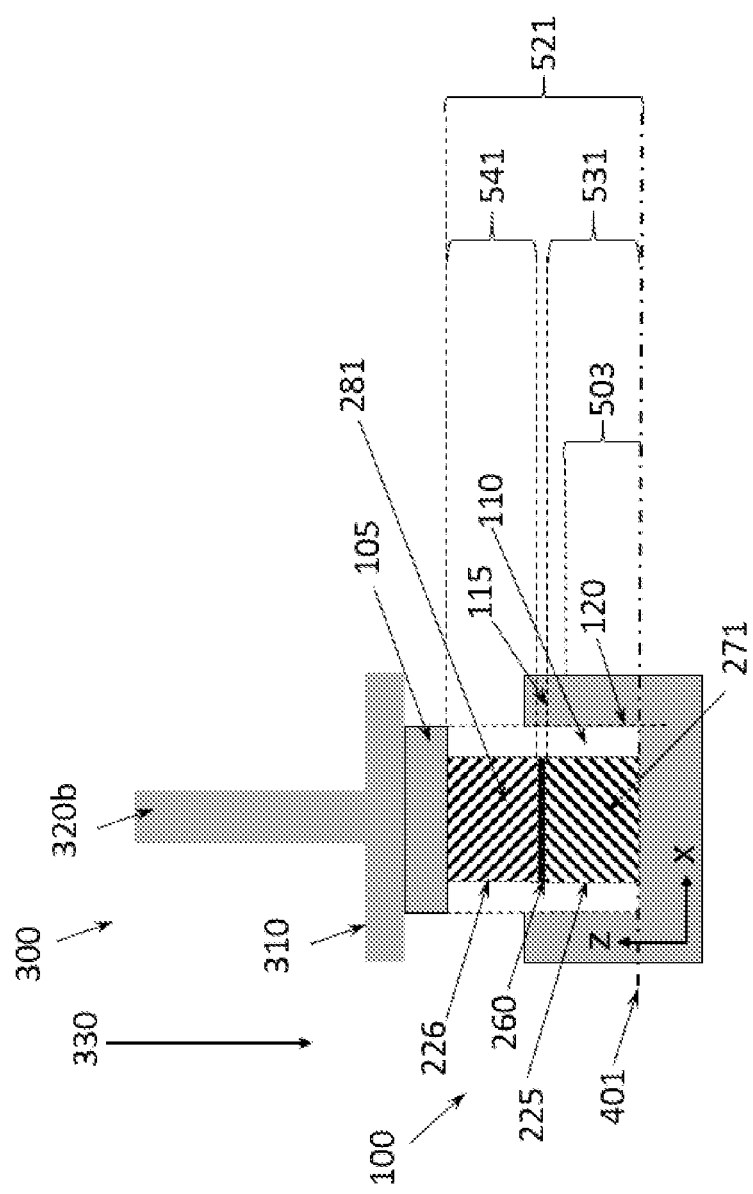

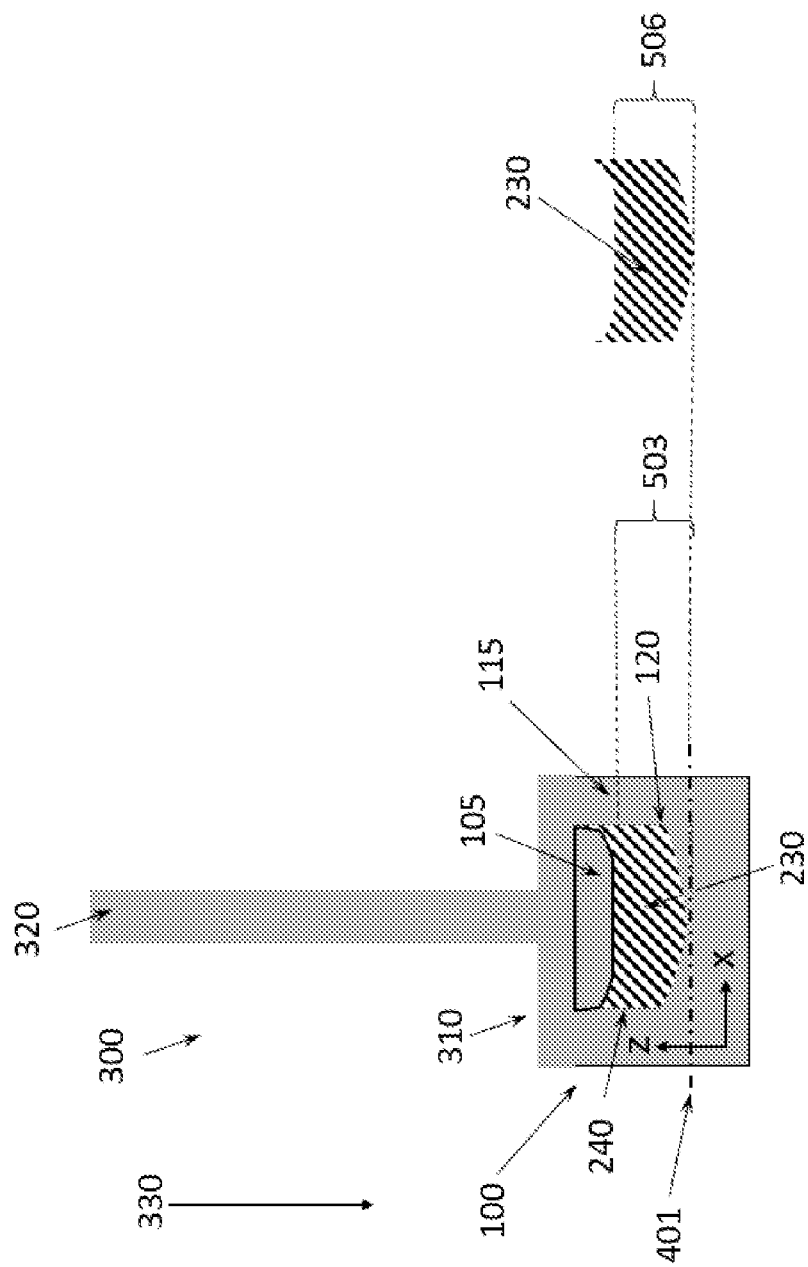

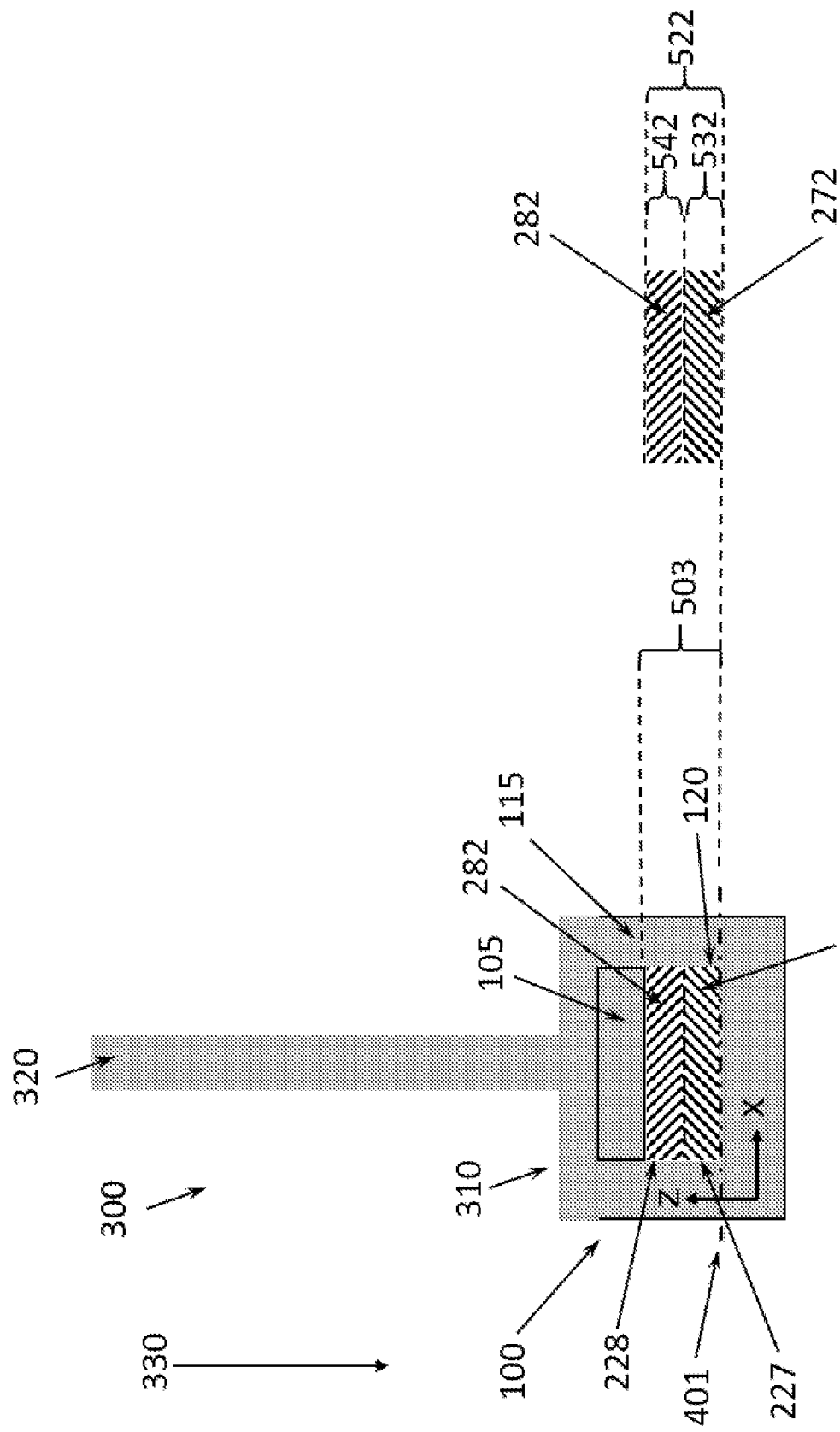

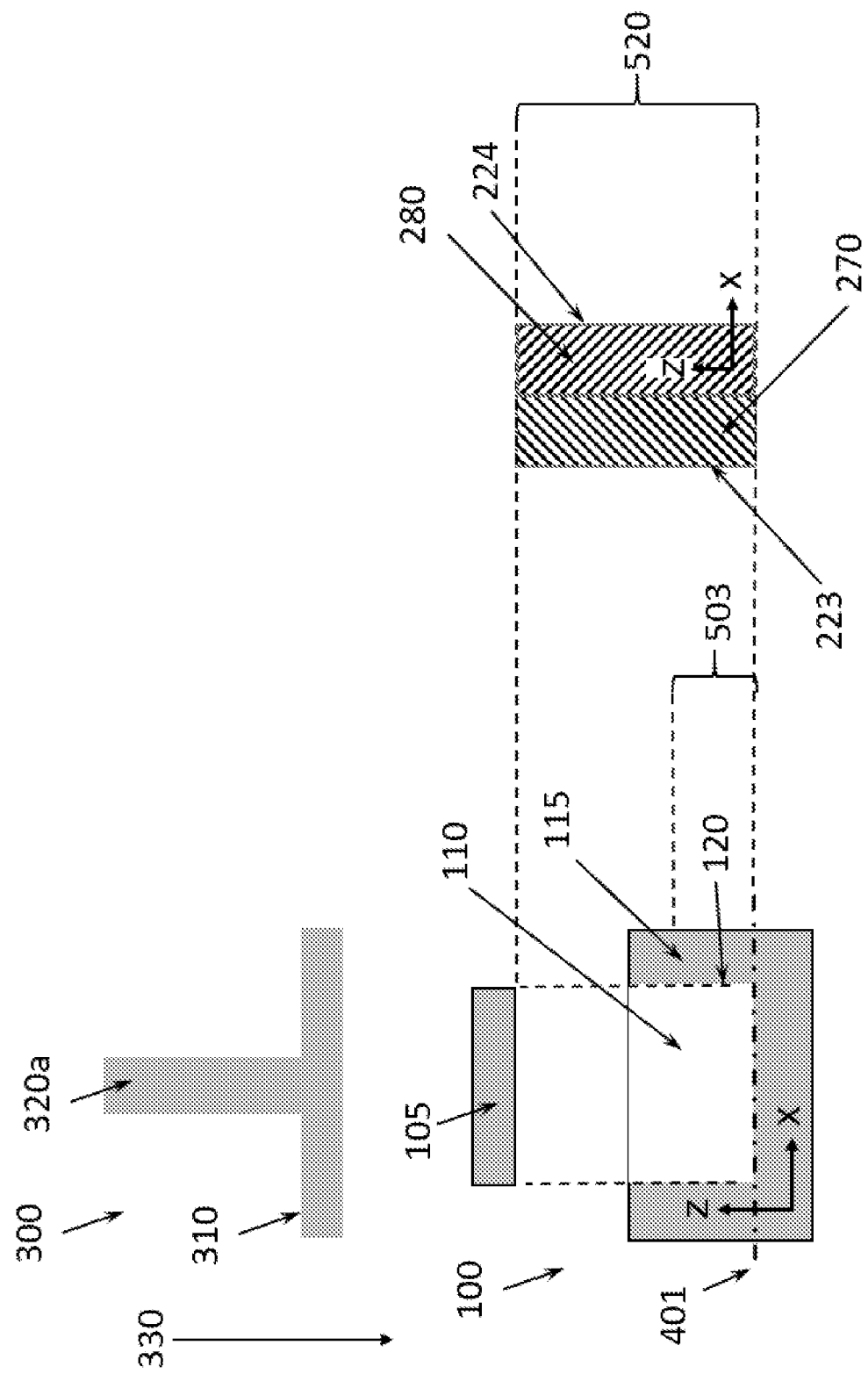

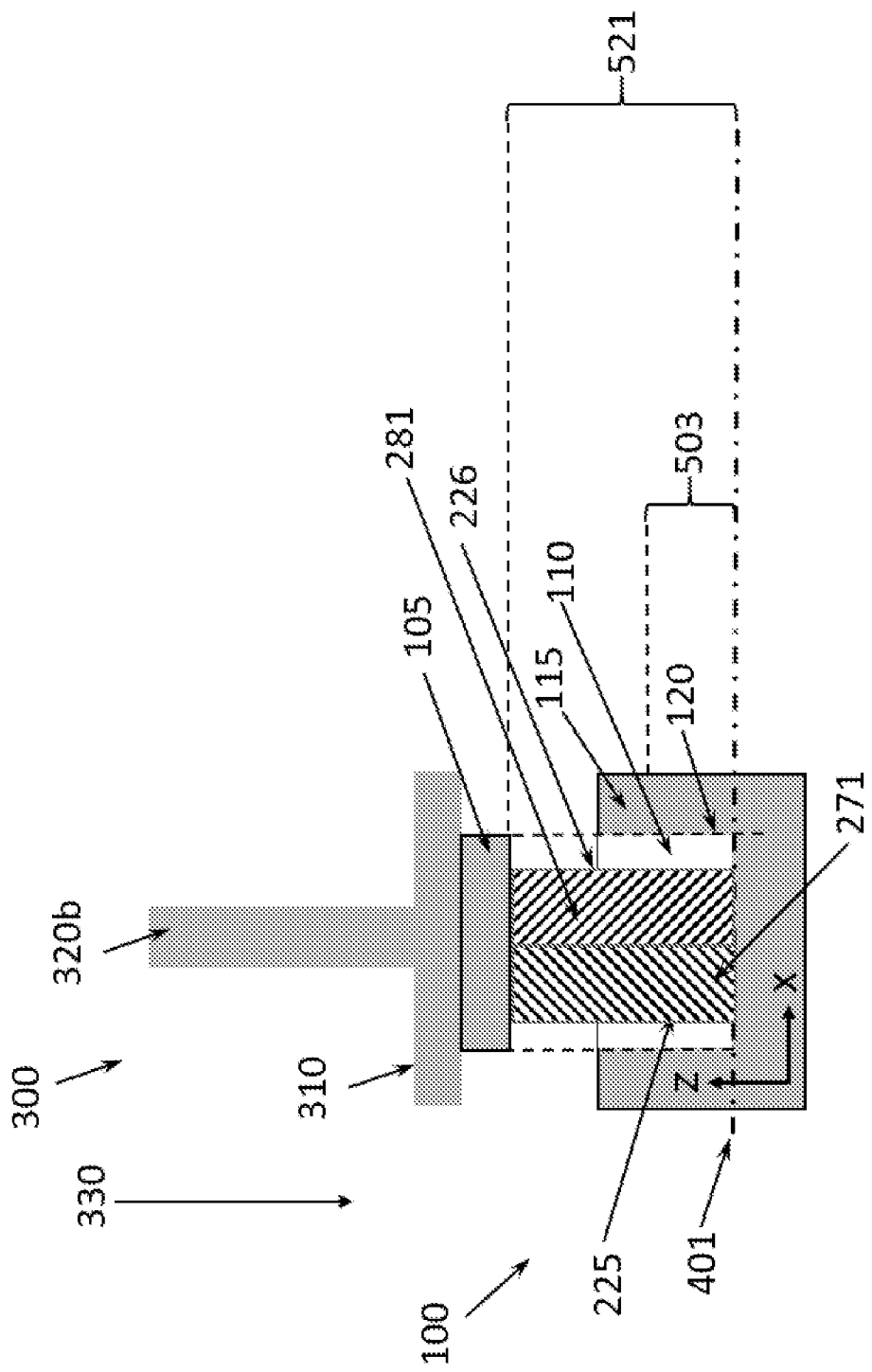

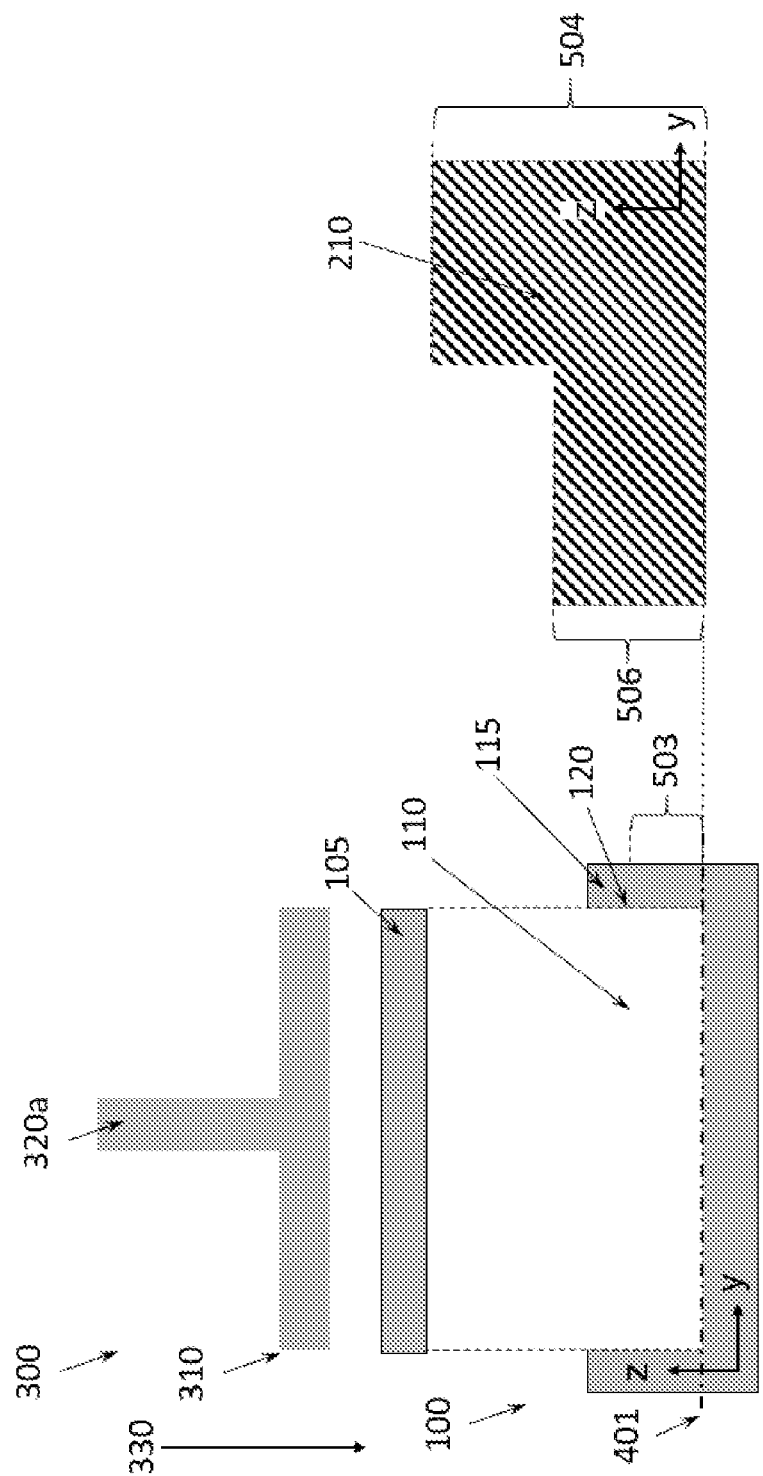

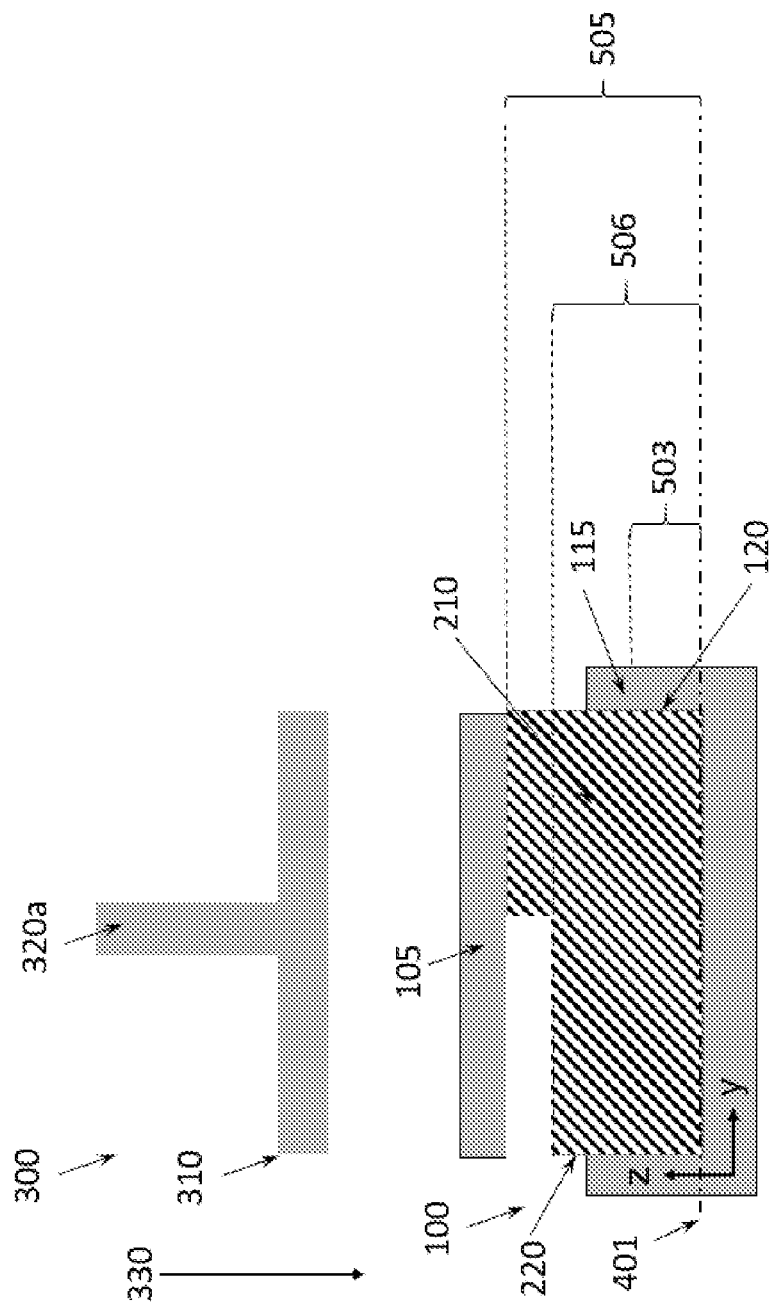

METHODS FOR COMPRESSION MOLDING FOAM ARTICLES

CROSS-REFERENCE TO RELATED APPLICATIONS

This Application is a continuation of, and claims priority to, U.S. patent application Ser. No. 16/396,674, filed on Apr. 27, 2019, now issued as U.S. Pat. No. 10,383,396, and which U.S. patent application Ser. No. 16/396,674 claims the benefit of U.S. Provisional Application No. 62/664,052, filed on Apr. 27, 2018, which is incorporated herein by reference in its entirety.

TECHNICAL FIELD

The present disclosure generally relates to molded polymeric foams, and in particular to molded polymeric foams for the footwear and related industries and uses thereof.

BACKGROUND

The design of athletic equipment and apparel as well as footwear involves a variety of factors from the aesthetic aspects, to the comfort and feel, to the performance and durability. While design and fashion may be rapidly changing, the demand for increasing performance in the market is unchanging. To balance these demands, designers employ a variety of foam materials and designs for the various components that make up athletic equipment and apparel as well as footwear, including cushioning elements.

BRIEF DESCRIPTION OF THE DRAWINGS

Further aspects of the present disclosure will be readily appreciated upon review of the detailed description, described below, when taken in conjunction with the accompanying drawings.

FIG. 1A is an isometric view of an exemplary aspect of an article of footwear according to aspects of the present disclosure. FIG. 1B is an exploded view of the article of footwear in FIG. 1A.

FIGS. 3A-3I show top plan views of a representative compression mold for a midsole showing a mold cavity therein without a foamed preform, with a foamed preform before compression molding, and a compression molded foam article after compression molding as described in further detail herein below. In some instances, reference lines 101 and 102 are shown corresponding to a cross-sectional plan view at the indicated position for parallel to the x-axis or y-axis, respectively. The respective cross-sectional views are shown in FIGS. 4A-4I (along reference line 101 for a cross-section plan view in the x-axis) and FIGS. 4J-4R (along reference line 102 for a cross-section plan view in the y-axis).

FIGS. 4A-4I and 4P-4U show cross-sectional plan views at a position marked by reference line 101 shown in FIGS. 3A-3I, respectively, and FIGS. 4J-4O and 4V-4X show cross-sectional plan views at a position marked by reference line 102 shown in FIGS. 3J-3R, respectively.

FIG. 5A shows a representative mold gap of the present disclosure at width reference line 101a. FIG. 5B shows a representative mold gap of the present disclosure at width reference line 101b. FIG. 5C shows a preform in a mold cavity in which a varying gap is located between the contoured perimeter edge generally along the y-axis in the toe region of the preform and the contoured boundary of the mold cavity in the toe region and highlights a representative mold gap of the present disclosure at width reference line 101a. FIG. 5D shows a preform in a mold cavity in which a varying gap is located between the contoured perimeter edge generally along the y-axis in the toe region of the preform and the contoured boundary of the mold cavity in the toe region and highlights a representative mold gap of the present disclosure at width reference line 101b.

FIG. 6A shows the representative compression mold for an article on the left of the figure and a representative preform that can be used with the compression mold shown. FIG. 6B shows the representative compression mold for an article of FIG. 6A with the representative foamed preform placed therein and prior to compression molding. As shown in FIG. 6B, there is a regular and even gap between each of the left and right outer edges of the preform and the inner face of the compression mold. FIG. 6C shows the representative compression mold for an article of FIG. 6A with the molded article after compression molding. As shown in FIG. 6C, there compression molding of the preform has resulted in the loss of the gap between each of the left and right outer edges of the preform and the inner face of the compression mold, and provides an anisotropic cell shape in the compression molded article.

DETAILED DESCRIPTION

Figure 1A:
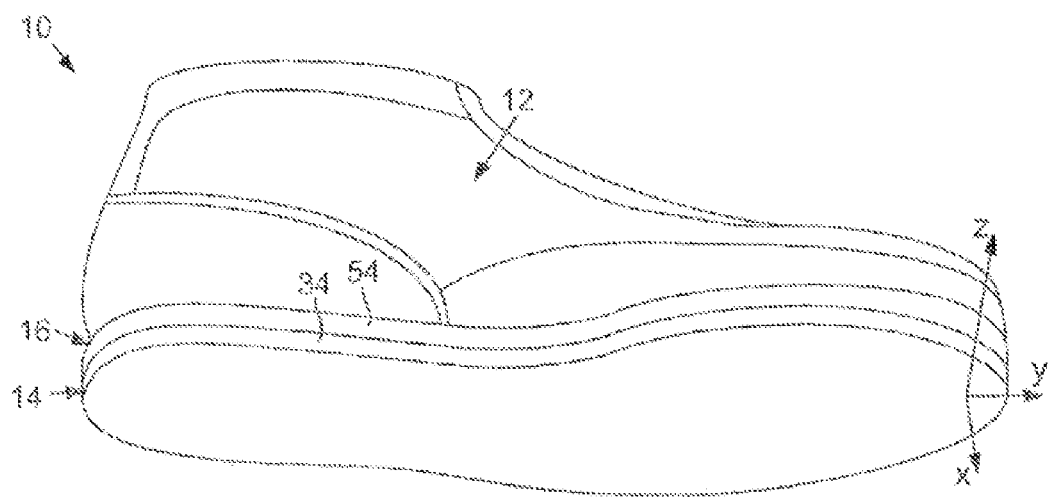
FIGS. 1A-1B are views of exemplary aspects of an article of footwear according to an aspect of the present disclosure.

New designs and materials for the footwear industry are needed. In particular, there remains a need for polymeric foams having improved physical properties, for example that can be used in the footwear industry to provide improved cushioning and energy return when used in a midsole or other component for an article of footwear.

Conventional compression molding processes are commonly used to form compression molded foam articles such as cushioning elements for use in footwear, e.g. a midsole. These processes are used to convert foam "preforms" to compression molded foam articles having properties which are desirable for footwear components, such as improved surface hardness and compression set. In conventional compression molding processes, a foam preform is enclosed in a mold cavity under compression, thereby increasing the density of the foam material. The foam material in the closed mold is then heated order to soften the foam, creating a skin on the foam which takes on the conformation of the molding surface. In addition to reducing the size of the preform (usually the height is reduced by at least 10 percent), increasing the density of the foam material, and altering the conformation and thickness of the external skin, the process typically alters the hardness, split tear, and tensile strength of the compression molded foam article as compared to the preform.

Typically, the molds used in conventional compression molding processes are multi-part molds (i.e., molds having molding surfaces spread across two or more parts), where the multiple parts of the mold, when closed, combine to form a mold cavity constrained along the x, y and z axes. Typically for footwear, the last part of the mold to be put in place is the part which constrains the mold along the z axis. When using a foamed preform having a pre-defined three-dimensional shape, the dimensions of the preform along the x and y axes are very close to if not the same as or slightly greater than the dimensions of the mold cavity along the x and y axes, as the preform is configured to fit easily within the mold cavity with little or no gap existing along the x and y axes. But along the z axis (corresponding to the height dimension), the dimension of the preform is greater than the dimension of the mold cavity, e.g., the height of the preform exceeds the height of the mold. It is understood that the height of the mold corresponds to the maximum height (i.e., dimension along the z-axis) when the mold is closed. The mold typically comprises a lower mold part and an upper mold part that sits atop the preform. The upper mold part is in contact with the preform, and a heated platen applies pressure to the upper mold part during compression molding, compressing the preform into the mold cavity. Typically the preform is about 110 percent to about 180 percent greater along the z-axis compared to the depth of the mold. Thus, the total volume of the preform is greater than the total volume of the mold cavity.

In conventional compression molding processes, the foam preform typically has a substantially isotropic cell structure or an isotropic cell structure. That is, the majority of the cells in the cell structure typically have a similar size and dimension in each of the three axes (x-, y-, and z-axis) that described the three physical dimension of the compression molded foam article. One consequence of the substantially isotropic or isotropic cell structure, as realized in conventionally molded foam articles, is that a physical property associated with the molded foam article will have isotropic character. For example, energy return is intimately associated with various aspects of the cell structure. As such, energy return will have an isotropic response for energy return determined for each of the three axes (x-, y-, and z-axis) of the molded foam article. That is, the energy return determined along each of three axes have similar energy return values. Other physical properties, e.g., stiffness, can also show isotropic responses if the compression molded foam article has a substantially isotropic or isotropic cell structure.

The present disclosure, pertains, in part, to molded foam articles that have an anisotropic cell structure. The anisotropic cell structure in the disclosed molded foam articles is associated with the compression molded foam article having at least one physical property that is anisotropic along at least one axis compared to one or both of the other two axes.

The present disclosure, further pertains, in part, to methods of preparing compression molded foam articles that surprisingly permit manufacture of molded foam articles that have a greater level of anisotropic cell structure as compared to the foam preform, by compression molding foamed preforms having unique geometries relative to the mold cavity used. The greater anisotropic cell structure in the disclosed molded foam articles is associated with the molded foam article having at least one physical property that is anisotropic along at least one axis compared to one or both of the other two axes. In a particular aspect, the molded foam articles made using the disclosed methods exhibit at least one physical property with greater anisotropic character along the axis that is parallel to the direction in which compression is applied. Thus, if a z-axis for a disclosed molded foam article is defined as an axis parallel to the direction in which compression is applied, then a physical property, e.g., energy return or stiffness, is anisotropic along the z-axis compared to either of the x-axis, the y-axis, or both.

In a first aspect, the present disclosure is directed to molded foam articles comprising: an elastomeric material having a closed cell foam structure comprising a plurality of cells having an anisotropic cell shape; wherein the molded foam article comprises a first axis, a second axis and a third axis; wherein the first axis is perpendicular to the second axis and the third axis; wherein the second axis and the third axis are each perpendicular to each other; and wherein the second and the third axis define a plane parallel to a major surface of the molded foam article; wherein a physical property determined along the first axis is different from the physical property determined along the second axis, the third axis, or both the second and third axis.

In a second aspect, the present disclosure is directed to articles comprising the molded foam articles of the first aspect. The articles comprising the molded foam articles can be cushioning elements. The articles comprising the molded foam articles can be articles of footwear, articles of apparel, or articles of sporting equipment.

In a third aspect, the present disclosure is directed to methods of making a compression molded foam article, the method comprising: arranging a preform in a compression mold; wherein the preform comprises a polymeric foam material having a closed cell foam structure; wherein the preform is associated with a preform x-axis, y-axis, and z-axis such that each axis is perpendicular to the other two; wherein the preform has a preform longitudinal dimension parallel to the preform y-axis of a preform x-y plan; wherein the preform z-axis is parallel to the direction of compression applied to the compression mold; wherein the preform has a preform height that is a dimension parallel to the preform z-axis; wherein the preform has an initial preform height equal to the preform height prior to compression molding; wherein the preform has a preform area comprising an area of a preform x-y plane; and wherein the preform has an initial preform area that is the preform area prior to compression molding; wherein the compression mold comprises a mold cavity; and wherein the mold cavity is associated with a mold cavity x-axis, y-axis, and z-axis such that each axis is perpendicular to the other two; wherein the mold cavity has a mold cavity longitudinal dimension parallel to the mold cavity y-axis of a mold cavity x-y plane; wherein the mold cavity z-axis is parallel to the direction of compression applied to the compression mold; wherein the mold cavity has a mold cavity height that is a dimension parallel to the preform z-axis when the mold is closed; wherein the mold cavity has a mold cavity area corresponding to an area of a mold cavity bottom; and wherein the mold cavity bottom is a mold cavity x-y plane opposite a mold cavity opening; wherein the initial preform area is less than about 95 percent the mold cavity area; wherein the arranging comprises aligning the preform x-axis, y-axis, and z-axis with the mold cavity x-axis, y-axis, and z-axis; and wherein the initial preform height is from about 1.1- to about 5-fold greater than the mold cavity height; closing the compression mold and compressing the preform into a closed mold cavity; applying heat, pressure, or a combination of both to the closed mold cavity for a duration of time to: (a) alter at least one preform dimension in the preform x-axis, y-axis, and z-axis; and (b) alter the closed cell foam structure to a closed cell foam structure having a greater proportion of anisotropic cell shapes; opening the compression mold after the least one preform dimension in the preform x-axis, y-axis, and z-axis and the closed cell foam structure are altered; removing the compression molded foam article from the compression mold; and forming the compression molded foam article; wherein the compression molded foam article retains dimensions of the closed mold cavity within about plus or minus 50 percent; and wherein the compression molded foam article has the closed cell foam structure having a greater proportion of closed cells with the anisotropic cell shapes as compared to the preform, or having substantially the same proportion of closed cells with the anisotropic cells shapes as compared to the preform, where an average aspect ratio of the proportion of the closed cells with the anisotropic cell shapes is greater as comparted to the preform, or both the proportion and the aspect ratio of closed cells with the anisotropic cell shapes are greater in the foam structure of the compression molded foam article as compared to the foam structure of the preform.

In a fourth aspect, the present disclosure is directed to methods of making a compression molded foam article, the method comprising: arranging a preform in a compression mold; wherein the preform comprises a polymeric material having a closed cell foam structure; wherein the preform is associated with a preform x-axis, y-axis, and z-axis such that each axis is perpendicular to the other two; wherein the preform has a preform longitudinal dimension parallel to the preform y-axis of a preform x-y plan; wherein the preform z-axis is parallel to the direction of compression applied to the compression mold; wherein the preform has a plurality of initial preform widths; wherein each initial preform width of the plurality of initial preform widths is designated as $IPW_1$; wherein i is an integer having a value of 1 to 100; and wherein each $IPW_1$ has a dimension parallel to the preform x-axis of the preform x-y plane at a position, $Y_i$, along the preform longitudinal dimension prior to compression molding; wherein the preform has a preform height; wherein the preform height is a dimension parallel to the preform z-axis; and wherein the initial preform height is the preform height prior to compression molding; wherein the compression mold comprises a mold cavity associated with a mold cavity x-axis, y-axis, and z-axis such that each axis is perpendicular to the other two; wherein the mold cavity has a longitudinal dimension parallel to the mold cavity y-axis of a mold cavity x-y plane; wherein the mold cavity z-axis is parallel to the direction of compression applied to the compression mold; wherein the mold cavity has a plurality of mold cavity widths; wherein each mold cavity width of the plurality of mold cavity widths is designated as $CW_1$; wherein j is an integer having a value of 1 to 100; wherein each ON has a dimension parallel to the mold cavity x-axis of the mold cavity x-y plane of the preform at a position, $P_j$, along the mold cavity longitudinal dimension; wherein the mold cavity has a mold cavity height that is a dimension parallel to the preform z-axis when the mold is closed; wherein the arranging comprises aligning the preform x-axis, y-axis, and z-axis with the mold cavity x-axis, y-axis, and z-axis; wherein each $P_j$ is associated with a corresponding position of the preform longitudinal dimension when the preform y-axis and the mold cavity y-axis are aligned; wherein the initial preform height is from about 1.1- to about 5-fold greater than the mold cavity height; wherein the preform and the mold cavity are associated with a plurality of mold gaps; wherein each mold gap of the plurality of mold gaps is designated as $MG_k$; wherein k is an integer having a value of 1 to 100; wherein each $MG_k$ is obtained from the following equation:

$$MG_k = \frac{CW_j - IPW_i}{CW_j}$$

and wherein each mold gap is independently from about 0.1 to about 0.7; closing the compression mold and compressing the preform into a closed mold cavity; applying heat, pressure, or a combination of both to the closed mold cavity for a duration of time to: (a) alter at least one preform dimension in the preform x-axis, y-axis, and z-axis; and (b) alter the closed cell foam structure of the preform to having a greater proportion of anisotropic cell shape; opening the compression mold after the least one preform dimension in the preform x-axis, y-axis, and z-axis and the closed cell foam structure are altered; removing the compression molded foam article from the compression mold; and forming a compression molded foam article; wherein the compression molded foam article retains dimensions of the closed mold cavity within about plus or minus 50 percent; and wherein the compression molded foam article has the closed cell foam structure having a greater proportion of closed cells with the anisotropic cell shapes as compared to the preform, or having substantially the same proportion of closed cells with the anisotropic cells shapes as compared to the preform, where an average aspect ratio of the proportion of the closed cells with the anisotropic cell shapes is greater as comparted to the preform, or both the proportion and the aspect ratio of closed cells with the anisotropic cell shapes are greater in the foam structure of the compression molded foam article as compared to the foam structure of the preform.

In a fifth aspect, the present disclosure is directed to methods of making a compression molded foam article, the method comprising: arranging a preform in a compression mold; wherein the preform comprises a polymeric material having a closed cell foam structure; wherein the preform is associated with a preform x-axis, y-axis, and z-axis such that each axis is perpendicular to the other two; wherein the preform has a preform longitudinal dimension parallel to the preform y-axis of a preform x-y plan; wherein the preform z-axis is parallel to the direction of compression applied to the compression mold; wherein the preform has a preform height that is a dimension parallel to the preform z-axis; wherein the preform has an initial preform height equal to the preform height prior to compression molding; wherein the preform has a preform volume; and wherein the preform has an initial preform volume that is the preform volume prior to compression molding; wherein the compression mold comprises a mold cavity; and wherein the mold cavity is associated with a mold cavity x-axis, y-axis, and z-axis such that each axis is perpendicular to the other two; wherein the mold cavity has a longitudinal dimension parallel to the mold cavity y-axis of a mold cavity x-y plane; wherein the mold cavity z-axis is parallel to the direction of compression applied to the compression mold; wherein the mold cavity has a mold cavity height that is a dimension parallel to the preform z-axis when the mold is closed; wherein the mold cavity has a mold cavity volume associated with the mold when it is closed; wherein the arranging comprises aligning the preform x-axis, y-axis, and z-axis with the mold cavity x-axis, y-axis, and z-axis; wherein the initial preform height is from about 1.1- to about 5-fold greater than the mold cavity height; wherein less than about 90 percent of the mold cavity volume is occupied by the preform; and wherein at least 30 percent of the initial preform volume is positioned outside the mold cavity; closing the compression mold and compressing the preform into a closed mold cavity; applying heat, pressure, or a combination of both to the closed mold cavity for a duration of time to: (a) alter at least one preform dimension in the preform x-axis, y-axis, and z-axis; and (b) alter the closed cell foam structure of the preform to having a greater proportion of anisotropic cell shape; opening the compression mold after the least one preform dimension in the preform x-axis, y-axis, and z-axis and the closed cell foam structure are altered; removing the compression molded foam article from the compression mold; and forming a compression molded foam article; wherein the compression molded foam article retains dimensions of the closed mold cavity within about plus or minus 50 percent; and wherein the compression molded foam article has the closed cell foam structure having a greater proportion of closed cells with the anisotropic cell shapes as compared to the preform, or having substantially the same proportion of closed cells with the anisotropic cells shapes as compared to the preform, where an average aspect ratio of the proportion of the closed cells with the anisotropic cell shapes is greater as comparted to the preform, or both the proportion and the aspect ratio of closed cells with the anisotropic cell shapes are greater in the foam structure of the compression molded foam article as compared to the foam structure of the preform.

In a sixth aspect, the present disclosure is directed to compression molded foam articles made any one of the disclosed methods of the third, fourth, or fifth aspects.

In a seventh aspect, the present disclosure is directed to articles comprising the compression molded foam article made by any one of the disclosed methods of the third, fourth, or fifth aspects.

Articles of Footwear.

In various aspects, an article of footwear 10 includes an upper 12, an optional outsole 14, and a midsole 16. When present, the midsole 16 is operably secured to both the upper 12 and the outsole 14, and the midsole 16 is disposed between the upper 12 and the outsole 14. The midsole 16 and the outsole 14 generally extend in transverse directions (i.e., within the X-Y plane) (FIG. 1A), and the midsole 16 and the outsole 14 each have a thickness defined along a thickness direction (i.e., along the z-axis). In a further aspect, the outsole 14, when present, can be configured such that it does not have the same length and width of the midsole 16. That is, the outsole 14, when present, can be of a width and length such that it contacts portions of the ground-facing portion of the midsole 16. In various aspects, the midsole 16 comprises materials that are sufficiently abrasion resistant that the ground-facing portion thereof does not require a full or partial outsole 14. That is, in some aspects, the midsole 16 comprises materials that are sufficiently abrasion resistant that the ground-facing portion thereof can directly contact the ground during use. It is understood, unless otherwise indicated, that herein throughout like reference numbers used in one figure refer to like aspects in another figure.

In some aspects, the upper 12 includes various thin sections of material that partially overlap each other and that are operably secured to each other, for example, by stitching, adhesives, and the like. The upper 12 defines a cavity in which the wearer's foot is received. The upper 12 can also include a fastening structure, such as laces, buckles, and/or other features for tightly securing the upper 12 to the foot of the wearer. It will also be appreciated that the upper 12 can include various decorative features. In addition, the upper 12 can have any suitable shape and/or features that adapt the article of footwear 10 for its intended use.

Figure 1B:
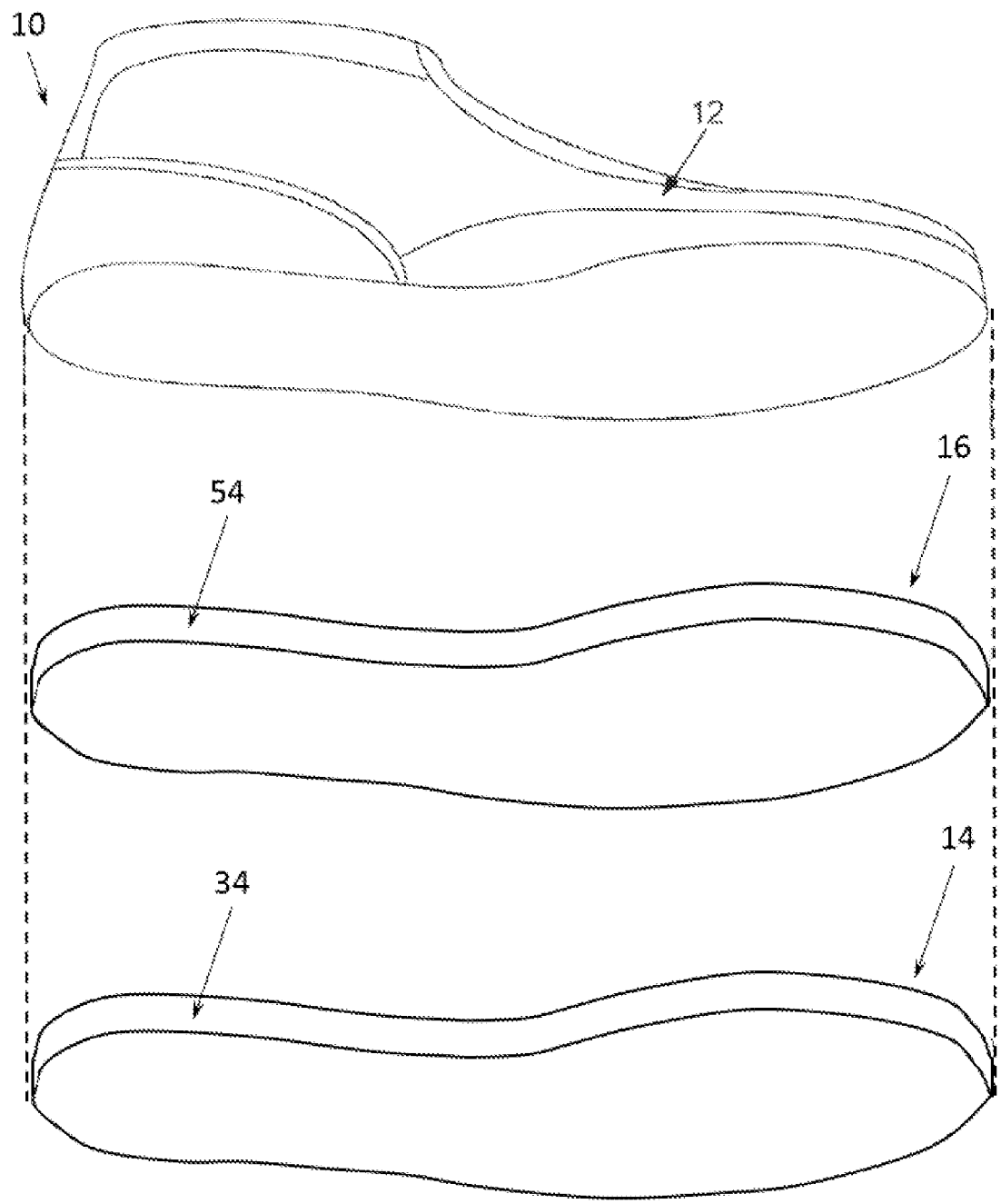
Figure 2:
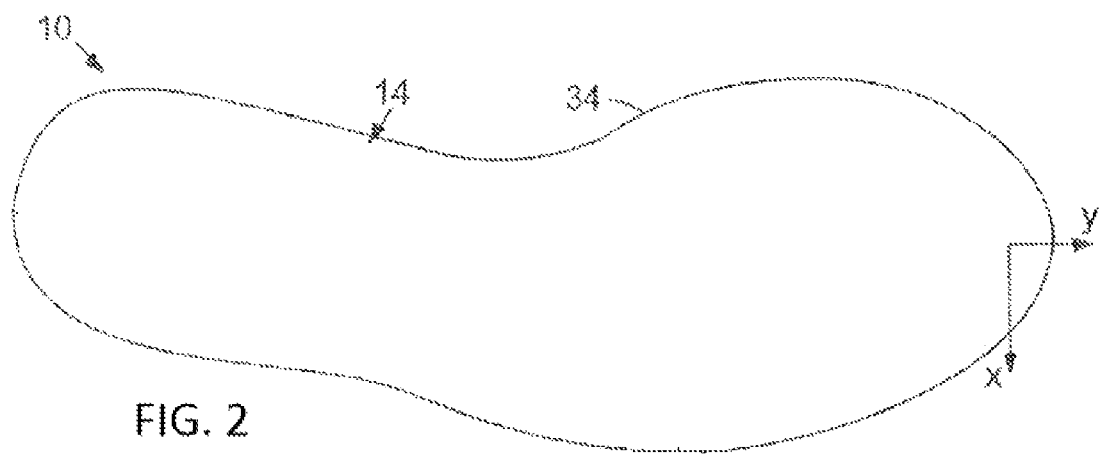
FIG. 2 is a bottom plan view of the article of footwear of FIG. 1A.

As shown in FIGS. 1A, 1B, and 2, the outsole 14 can include a layer of material that extends in the transverse directions (i.e., within the X-Y plane). The outsole 14 can also have any suitable curvature along the transverse directions. Additionally, the outsole 14 can have any suitable thickness (i.e., along the Z-axis), and the thickness of the outsole 14 can vary in any suitable fashion. Moreover, the outsole 14 can include various grooves, projections or other features for increasing traction of the footwear 10. It will be appreciated that the outsole 14 can be made out of any suitable material. For instance, the outsole 14 can include an abrasion-resistant solid or lightly foamed polymeric material such as rubber. Also, in some aspects, the outsole 14 can include a transparent material. Also, it will be appreciated that the outsole 14 can vary in material, thickness, function, aesthetics, and the like. Furthermore, in some aspects, the outsole 14 includes an outer periphery 34 that is entirely continuous with the outer periphery of the midsole 16 (FIGS. 1A, 1B, and 2, more specifically, as shown in FIG. 1B). In other aspects (not illustrated), the outer periphery of the outsole 14 is not continuous with the outer periphery of the midsole 16.

As shown in FIGS. 1A, 18, and 2, the midsole 16 can include a layer of material that extends in the transverse directions (i.e., within the X-Y plane). The midsole 16 can also have any suitable curvature along the transverse directions. Furthermore, the midsole 16 can have any suitable thickness (i.e., along the z-axis), and the thickness of the midsole 16 can vary in any suitable fashion. In further aspects, the midsole 16 includes an outer periphery 54 that is entirely continuous with the outer periphery of the outsole 14 (FIGS. 1A, 1B, and 2, more specifically, as shown in FIG. 1B). It will be appreciated that the midsole 16 can be made out of any suitable material. For instance, the midsole 16 can be made out of any suitable polymeric foam material, such as ethylene vinyl acetate (EVA) foam, polyamide polymers or co-polymers (PA), styrenic polymers or co-polymers, and/or polyurethane (TPU).

The midsole 16 can also include a material with air pockets or fluid-filled bladders included therein. Additionally, the midsole can include additional elements such as a stabilizer or a plate. Also, it will be appreciated that the midsole can vary in material, thickness, function, aesthetics, and the like.

In some aspects, an article of footwear can comprise a sole structure, a sole structure component, an upper, an upper component, or any combination thereof. An upper component refers to a piece that is stitched or otherwise joined with one or more other pieces to form an upper. The materials in the upper generally contribute to characteristics such as breathability, conformability, weight, and suppleness or softness. A sole structure component refers to a piece that is joined with one or more other pieces to form the lower portion of an article of footwear. The sole structure can include, for example, the outsole and midsole. The choice of outsole materials and design will contribute, for instance, to the durability, traction, as well as to the pressure distribution during use. The midsole materials and design contribute to factors such as the cushioning and support. Grindery components include all of the additional components that can be attached to the upper, sole structure, or both. Grindery components can include, for example, eyelets, toe puffs, shanks, nails, laces, velcro, catches, backers, linings, padding, heel backings, heel foxings, toe caps, etc.

In some aspects, the upper is a lasted upper. A "lasted upper," as used herein, refers to an upper that is formed into the shoe shape prior to attachment to the sole by one or more mechanical means. The lasted upper can include a heel counter formed to shape the heel of the upper. The lasted upper can include a strobel or a strobel board attached to the upper, typically via a strobel stitch.

Methods of Making Foam Articles Comprising Anisotropic Cell Structure.

In various aspects, the present disclosure pertains to methods for making compression molded foam articles. The disclosed methods use a preform comprising a polymeric foam material having a closed cell foam structure to form a compression molded foam article having a closed cell foam structure with a plurality of cells having an anisotropic cell shape such that either: (a) the compression molded foam article retains dimensions of the closed mold cavity within about plus or minus 50 percent; and (b) wherein the compression molded foam article has the closed cell foam structure having a greater proportion of closed cells with the anisotropic cell shapes as compared to the preform, or having substantially the same proportion of closed cells with the anisotropic cells shapes as compared to the preform, where an average aspect ratio of the proportion of the closed cells with the anisotropic cell shapes is greater as comparted to the preform, or both the proportion and the aspect ratio of closed cells with the anisotropic cell shapes are greater in the foam structure of the compression molded foam article as compared to the foam structure of the preform. In some instances, the proportion of cells having an anisotropic cell shape is increased in the compression molded foam article compared to the preform. In further instances, the compression molded foam article can have cells with a greater degree of anisotropic cell shape compared to the preform, e.g., a greater aspect ratio of a major axis to a minor of the anisotropic cells. In a further aspect, the disclosed methods are capable of using a foam preform having a closed cell foam structure with a substantially isotropic cell shape to form a compression molded foam article having a closed cell foam structure having a substantially anisotropic cell shape.

In various aspects, the proportion of cells having an anisotropic cell shape is increased in the molded foam article compared to the preform within a portion of the molded foam article, e.g., within a portion of the molded foam article having a volume of at least 1 cubic centimeter, or at least 2 cubic centimeters, or at least 3 cubic centimeters, or at least 10 percent, or at least 20 percent, or at least 30 percent, or at least 40 percent, or at least 50 percent of a total volume of the molded foam article. In a particular aspect, the proportion of cells having an anisotropic cell shape is increased in the molded foam article compared to the preform within a portion of the molded foam article that is at least 1 cubic centimeter.

It is known that molded foam articles, e.g., a compression molded foam article, can be associated with a skin localized to the portions of the molded article that are in direct contact with the mold wall. Such a skin has substantially no closed cell foam structure. In various aspects, disclosed molded foam articles have an anisotropic cell-structure in at least a portion of the non-skin portions of the molded foam article, e.g., a distance of about 0.1 millimeters to about 2 millimeters from the outside surface of the molded foam article. In some aspects, disclosed molded foam articles have an anisotropic cell-structure in the non-skin portions of the molded foam article at least a distance of about 1 millimeters from the outside surface of the molded foam article.

Figure 3A:
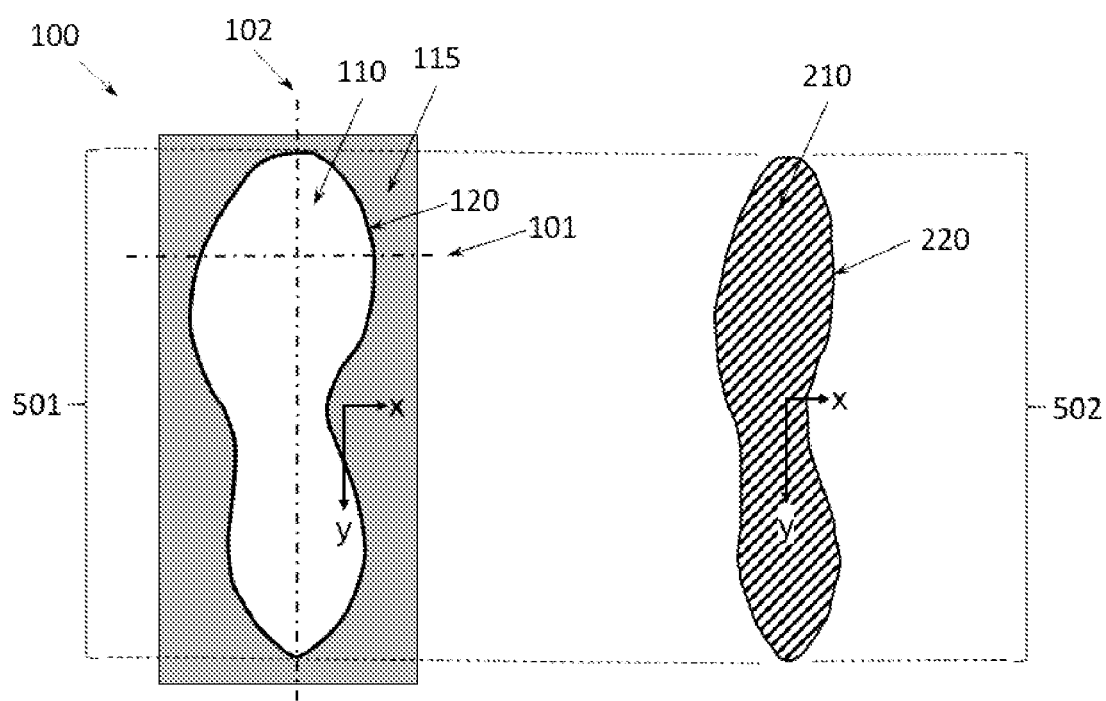
Figure 3B:
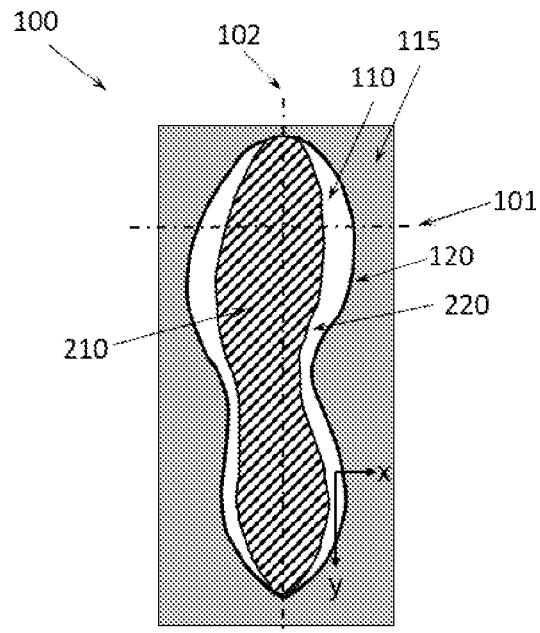
Figure 3C:
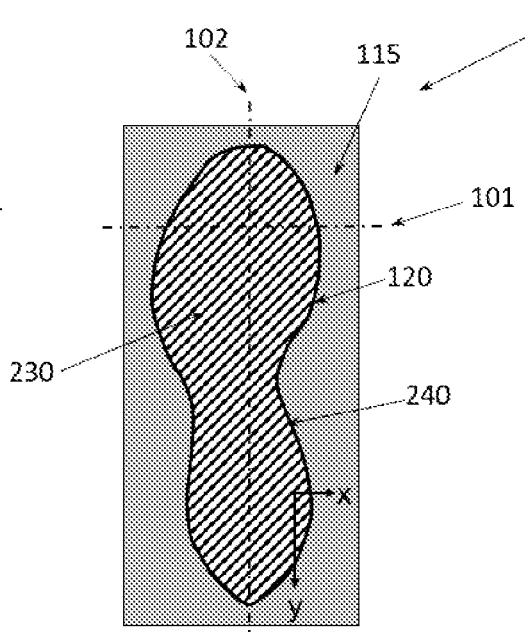
Figure 4A:
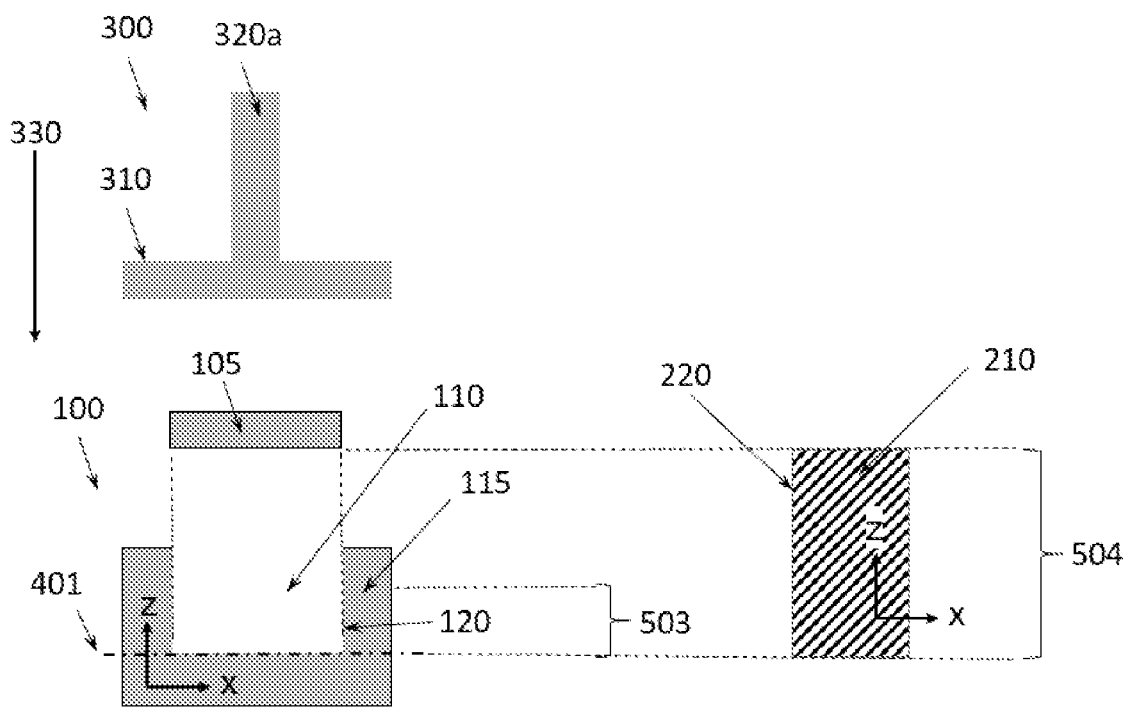
Figure 4B:
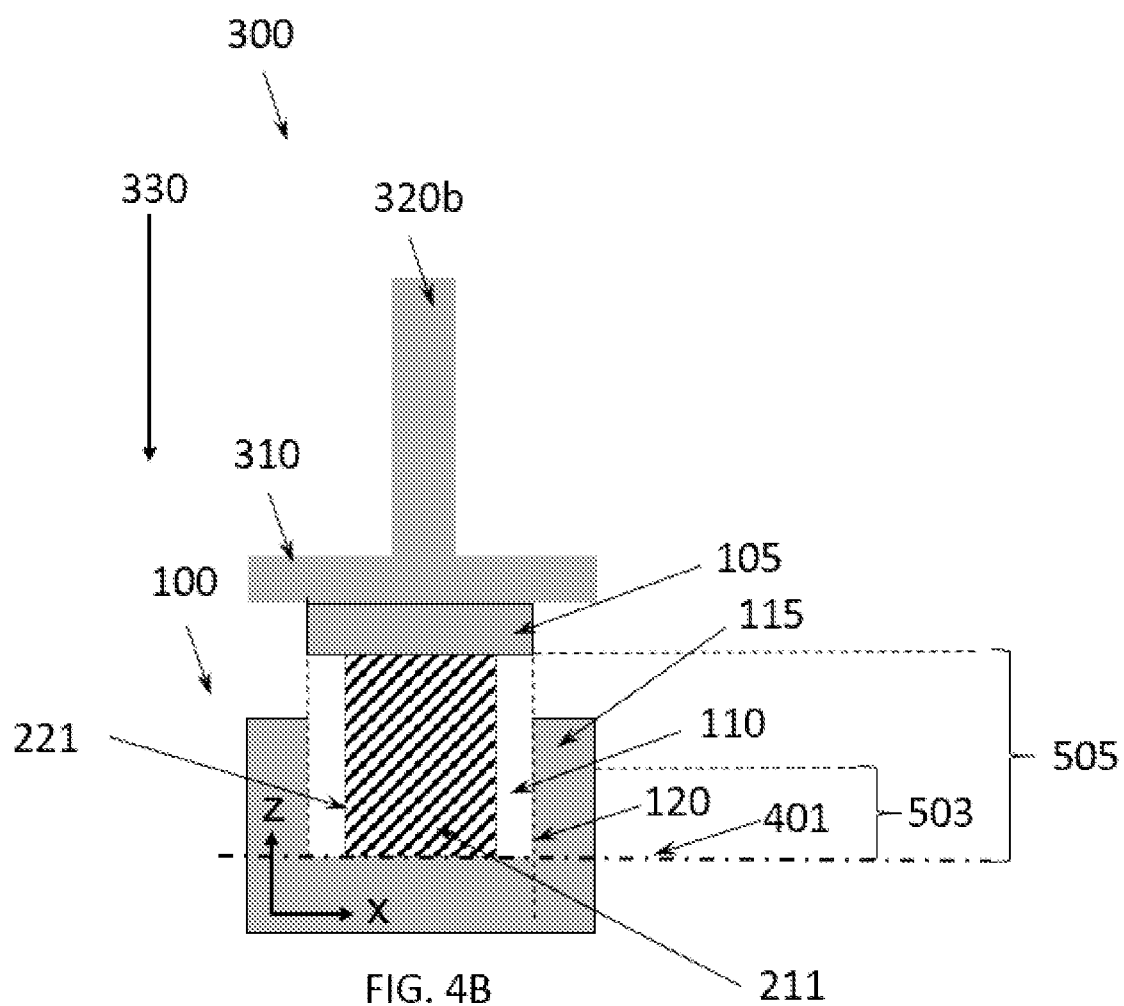

In some aspects, exemplary steps of the disclosed methods are shown in FIGS. 3A, 3B, and 3C, show top plan views at a position marked by reference line 401 shown in FIGS. 4A, 4B and 4C, respectively. The orientation of a mold cavity x-y plane is shown in each of FIGS. 3A, 3B, and 3C. In the plan views of FIGS. 3A, 3B, and 3C, which are at a position perpendicular to cross-sectional plan view reference line 401 shown in FIGS. 4A-4C, respectively. Accordingly, the mold cavity x-y plane is located at a bottom of the mold cavity, and the top plan view is shown looking down into a mold cavity opening.

Figure 3D:
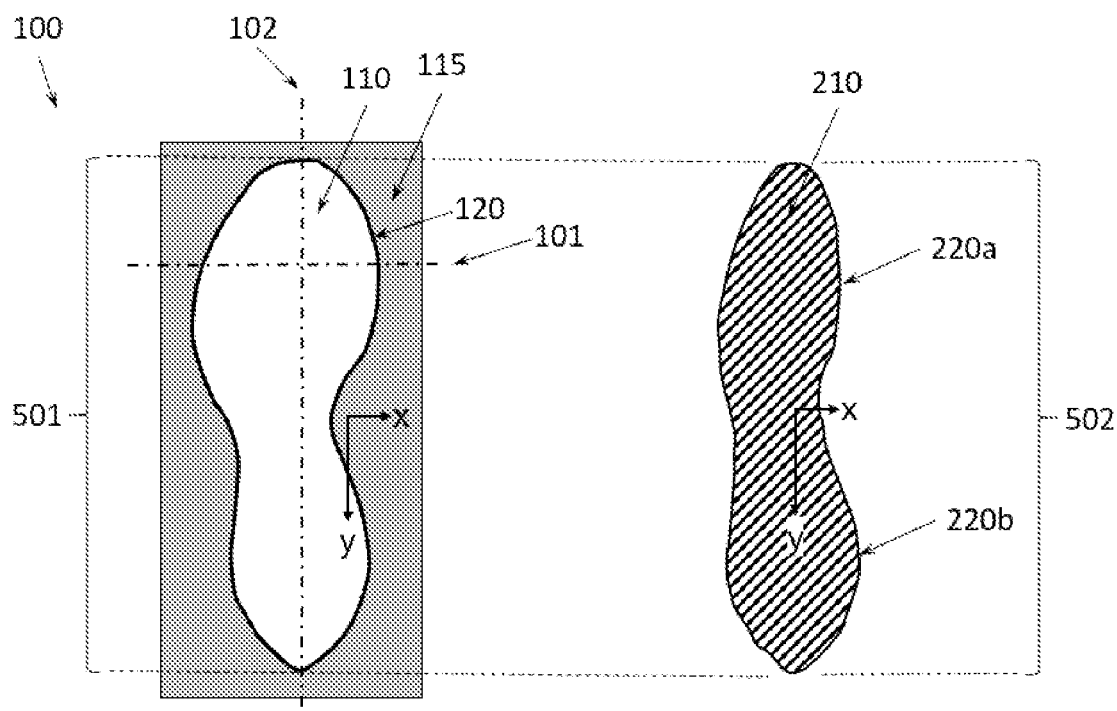
Figure 3G:
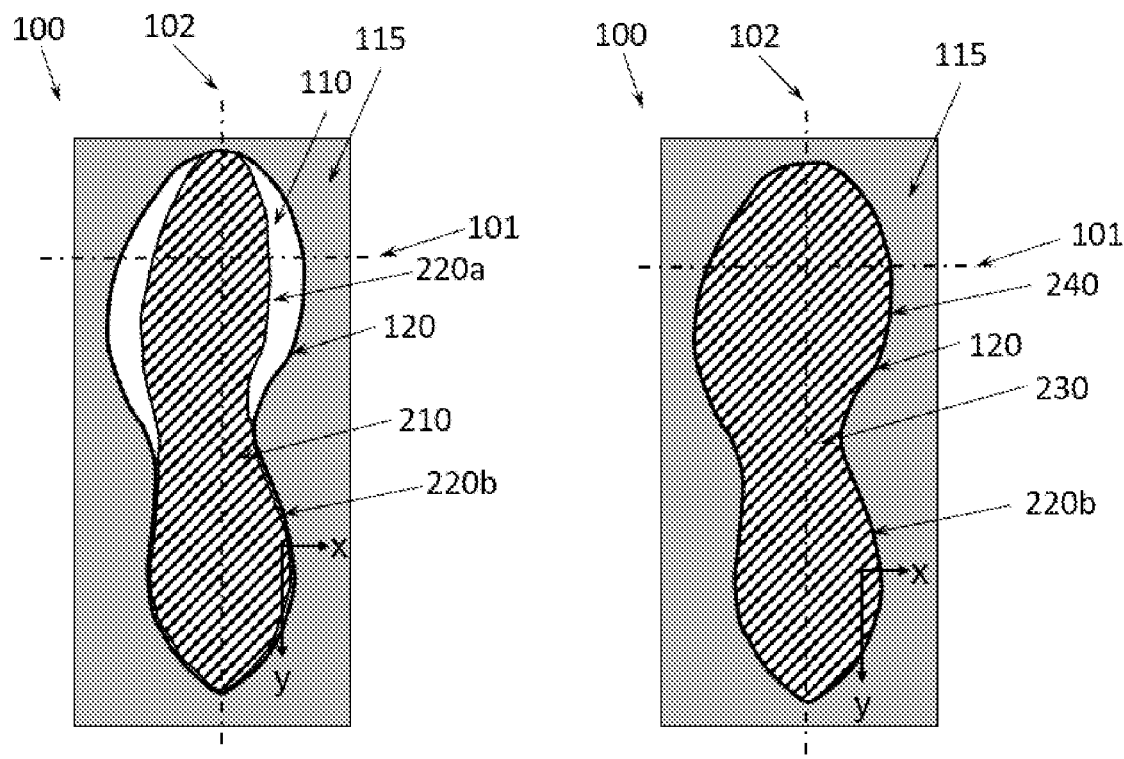
Figure 3G:
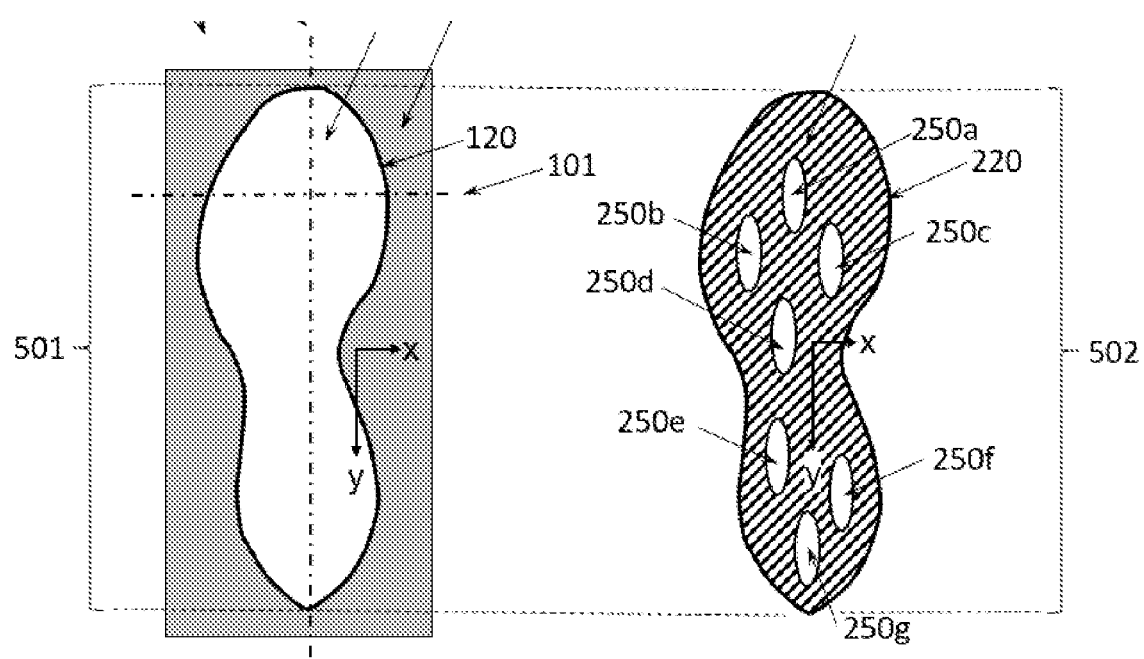
Figure 3H:
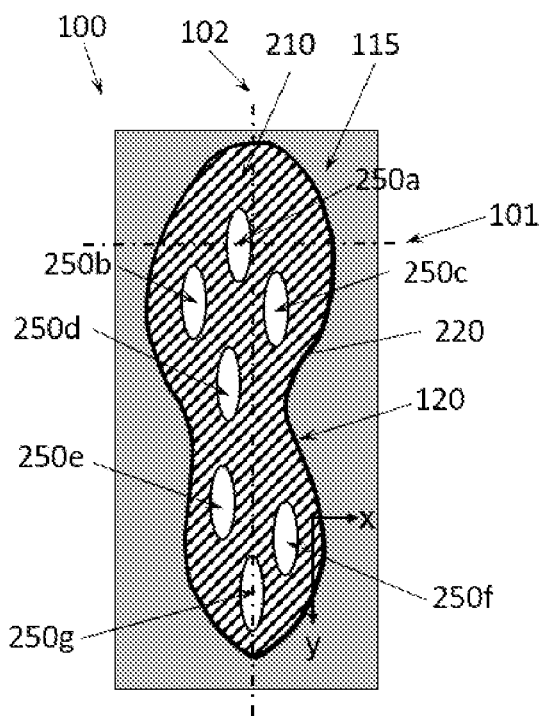
Figure 3I:
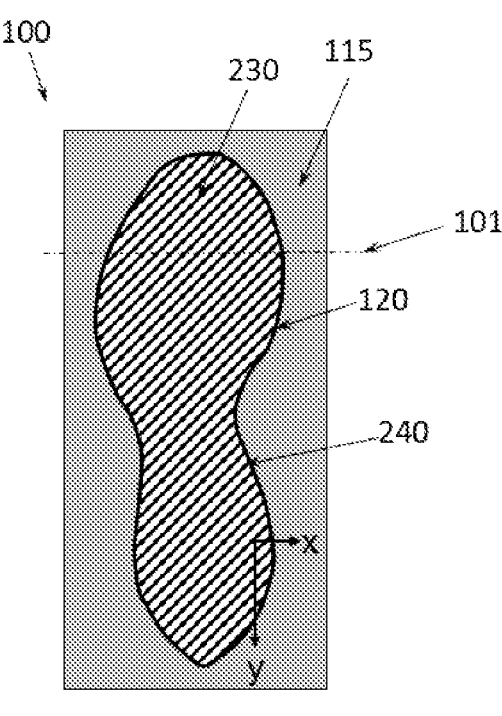

Briefly, referring to FIGS. 3A-3I: FIG. 3A shows a top plan view of a representative compression mold for a midsole showing a mold cavity therein without a foamed preform in the mold cavity (the preform is shown adjacent to the mold); FIG. 3B shows a top plan view of the compression mold in FIG. 3A with a foamed preform arranged in the mold cavity, prior to compression molding, showing gaps between all contoured perimeter edges generally along the y-axis of the preform and the contoured boundary of the mold cavity; FIG. 3C shows a top plan view of the compression mold in FIG. 3A of the resulting molded foam article after compression molding the foam preform, showing that a majority of the contoured perimeter of the compression molded foam article is in contact with the contoured boundary of the mold cavity following the compression molding; FIG. 3D shows a top plan view of a representative compression mold for a midsole showing a mold cavity therein without a foamed preform in the mold cavity (the preform is shown adjacent to the mold); FIG. 3E shows a top plan view of the compression mold in FIG. 3D with a foamed preform arranged in the mold cavity, prior to compression molding, showing gaps between contoured perimeter edges generally along the y-axis in the toe region of the preform and the contoured boundary of the mold cavity; FIG. 3F shows a top plan view of the compression mold in FIG. 3D of the resulting compression molded article after compression molding the preform, showing that a majority of the contoured perimeter of the compression molded foam article is in contact with the contoured boundary of the mold cavity following the compression molding; FIG. 3G shows a top plan view of a representative compression mold for a midsole showing a mold cavity therein without a foamed preform in the mold cavity (the preform is shown adjacent to the mold with internal gaps); FIG. 3H shows a top plan view of the compression mold in FIG. 3G with a foamed preform arranged in the mold cavity, prior to compression molding, showing the preform contoured perimeter is in close proximity with the contoured boundary of the mold cavity, and further shows internal gaps within the preform which oriented lengthwise along the y-axis of the preform and the contoured boundary of the mold cavity; FIG. 3I shows a top plan view of the compression mold in FIG. 3G of the resulting molded foam article showing that the internal gaps have been compressed and do not exist as gaps after compression molding, and showing that the majority of the contoured perimeter of the compression molded foam article is in contact with the contoured boundary of the mold cavity following the compression molding.

Referring now to FIG. 3A in detail, the figure shows a top plan view of a compression mold, e.g., for a midsole, 100 that is open and comprises a lower mold component 115 having a mold cavity 110 encompassed by a cavity contoured boundary 120. The mold 100 is shown with a width reference line 101. The mold cavity 110 is associated with a mold cavity area, which is an area of the mold cavity 110 in an x-y plane as shown. The mold cavity has a mold cavity longitudinal dimension 501 as shown, which is along a line parallel to the y-axis, and represents the longest dimension in the y-axis of the mold cavity. FIG. 3A also shows a foamed preform 210, prior to compression molding, shown in a position near the mold 100, and is shown with the orientation of a foamed preform x-y plane. The preform 210, prior to compression molding is associated with an initial preform area, which is an area of the preform 210, prior to compression molding, in the preform x-y plane as shown. As shown, the preform x-y plane and the mold cavity x-y plane are aligned. The preform 210, prior to compression molding, is associated with a foamed preform initial contoured perimeter 220. The preform has a foamed preform initial longitudinal dimension 502, which is along a line parallel to the y-axis, and represents the longest dimension in the y-axis of the preform prior to compression molding.

Referring now to FIG. 3B in detail, the figure shows a top plan view of the compression mold 100 in FIG. 3A with a foamed preform 210, prior to compression molding, arranged in the mold cavity 110, prior to compression molding, showing a mold gap of variable dimension extending between the contoured perimeter of a foamed preform 220 and the contoured boundary of the mold cavity 120. FIG. 3B shows that the initial preform area is less than the mold cavity area. This relationship of initial preform area to the mold cavity area is also apparent in FIG. 3A. The arrangement of the 210, prior to compression molding, in the mold cavity 110, is such that the preform x-y plane and the mold cavity x-y plane are aligned. Moreover, as arranged in FIG. 3B, the mold cavity longitudinal dimension 501, and the preform initial longitudinal dimension 502, are co-aligned along the same line that is parallel to the y-axis.

Referring now to FIG. 3C in detail, the figure shows a top plan view of the compression mold 100 in FIG. 3A of a foamed preform 230, after compression molding, which is associated with a foamed preform final contoured perimeter 240. As shown in the figure, the preform 230, after compression molding, is associated with a final preform area, which is an area of the preform 230, after compression molding, in the preform x-y plane as shown. In this instance, the final preform area is about the same as the mold cavity area. As shown in FIG. 3C, the preform final contoured perimeter 240 is in contact with the mold cavity contoured boundary 120. In some aspects, there can be contact at substantially all points along the preform final contoured perimeter 240 and mold cavity contoured boundary 120. However, in other aspects, a mold gap may exist between the preform final contoured perimeter 240 at one or more points along the mold cavity contoured boundary 120.

Referring now to FIG. 3D in detail, the figure shows a top plan view of a compression mold, e.g., for a midsole, 100 that is open and comprises a lower mold component 115 having a mold cavity 110 encompassed by a cavity contoured boundary 120. The mold 100 is shown with a width reference line 101. The mold cavity 110 is associated with a mold cavity area, which is an area of the mold cavity 110 in an x-y plane as shown. The mold cavity has a mold cavity longitudinal dimension 501 as shown, which is along a line parallel to the y-axis, and represents the longest dimension in the y-axis of the mold cavity. FIG. 3D also shows a foamed preform 210, prior to compression molding, shown in a position near the mold 100, and is shown with the orientation of a foamed preform x-y plane. The preform 210, prior to compression molding is associated with an initial preform area, which is an area of the preform 210, prior to compression molding, in the preform x-y plane as shown. As shown, the preform x-y plane and the mold cavity x-y plane are aligned. The preform 210, prior to compression molding, is associated with a foamed preform initial contoured perimeter 220a and 220b. The preform has a foamed preform initial longitudinal dimension 502, which is along a line parallel to the y-axis, and represents the longest dimension in the y-axis of the preform prior to compression molding.

Referring now to FIG. 3E in detail, the figure shows a top plan view of the compression mold 100 in FIG. 3D with a foamed preform 210, prior to compression molding, arranged in the mold cavity 110, prior to compression molding, showing a mold gap of variable dimension extending between the contoured perimeter of a foamed preform 220a and the contoured boundary of the mold cavity 120 in the toe region of the preform and mold. However, in the heel region, the contoured perimeter of the foamed preform 220b is in close proximity and/or contact with the contoured boundary of the mold cavity in the heel region of the mold cavity. FIG. 3E shows that the initial preform area in the toe region is less than the mold cavity area in the toe region. This relationship of initial preform area to the mold cavity area is also apparent in FIG. 3D. The arrangement of the 210, prior to compression molding, in the mold cavity 110, is such that the preform x-y plane and the mold cavity x-y plane are aligned. Moreover, as arranged in FIG. 3B, the mold cavity longitudinal dimension 501, and the preform initial longitudinal dimension 502, are co-aligned along the same line that is parallel to the y-axis.

Referring now to FIG. 3F in detail, the figure shows a top plan view of the compression mold 100 in FIG. 3D of a compression molded article 230, e.g., a compression molded midsole, which is formed from the preform following compression molding, which is associated with a molded article contoured perimeter 240. As shown in the figure, the compression molded article 230, after compression molding, is associated with a final preform area, which has an area approximately that or the same as the mold cavity in the preform x-y plane as shown. In this instance, the final preform area is about the same as the mold cavity area. As shown in FIG. 3F, the preform final contoured perimeter 240 is in contact with the mold cavity contoured boundary 120. In some aspects, there can be contact at substantially all points along the preform final contoured perimeter 240 and mold cavity contoured boundary 120. However, in other aspects, a mold gap may exist between the molded article contoured perimeter 240 at one or more points along the mold cavity contoured boundary 120.

Referring now to FIG. 3G in detail, the figure shows a top plan view of a compression mold, e.g., for a midsole, 100 that is open and comprises a lower mold component 115 having a mold cavity 110 encompassed by a cavity contoured boundary 120. The mold 100 is shown with a width reference line 101. The mold cavity 110 is associated with a mold cavity area, which is an area of the mold cavity 110 in an x-y plane as shown. The mold cavity has a mold cavity longitudinal dimension 501 as shown, which is along a line parallel to the y-axis, and represents the longest dimension in the y-axis of the mold cavity. FIG. 3G also shows a foamed preform 210, prior to compression molding, shown in a position near the mold 100, and is shown with the orientation of a foamed preform x-y plane. The foamed preform 210, prior to compression molding is associated with a plurality of internal gaps 250a-250f. The preform has a foamed preform initial longitudinal dimension 502, which is along a line parallel to the y-axis, and represents the longest dimension in the y-axis of the preform prior to compression molding.

Referring now to FIG. 3H in detail, the figure shows a top plan view of the compression mold 100 in FIG. 3G with a foamed preform 210, prior to compression molding, arranged in the mold cavity 110, prior to compression molding, that all gaps are internal to the preform. FIG. 3H shows that the initial preform area in the toe region is less than the mold cavity area in the toe region. This relationship of initial preform area to the mold cavity area is also apparent in FIG. 3G. The arrangement of the 210, prior to compression molding, in the mold cavity 110, is such that the preform x-y plane and the mold cavity x-y plane are aligned. Moreover, as arranged in FIG. 3B, the mold cavity longitudinal dimension 501, and the preform initial longitudinal dimension 502, are co-aligned along the same line that is parallel to the y-axis. As shown in FIG. 3H, the contoured perimeter of the foamed preform 220 and the contoured boundary of the mold cavity 120 are in close proximity. In some instances, the gap between the foamed preform 220 and the contoured boundary of the mold cavity 120 is negligible or essentially absent. In other instances, the gap between the foamed preform 220 and the contoured boundary of the mold cavity 120 can be about 0.01 millimeter to about 1 millimeter.

Referring now to FIG. 3I in detail, the figure shows a top plan view of the compression mold 100 in FIG. 3G of a compression molded article 230, e.g., a compression molded midsole, which is formed from the preform following compression molding, which is associated with a molded article contoured perimeter 240. As shown in the figure, the compression molded article 230, after compression molding, is associated with a final preform area, which has an area approximately that or the same as the mold cavity in the preform x-y plane as shown. In this instance, the final preform area is about the same as the mold cavity area. As shown in FIG. 3I, the preform final contoured perimeter 240 is in contact or essentially in contact with the mold cavity contoured boundary 120. In some aspects, there can be contact at substantially all points along the preform final contoured perimeter 240 and mold cavity contoured boundary 120. However, in other aspects, a mold gap may exist between the molded article contoured perimeter 240 at one or more points along the mold cavity contoured boundary 120.

In some aspects, exemplary steps of the disclosed methods are shown in FIGS. 4A-4I show cross-sectional plan views at a position marked by reference line 101 shown in FIGS. 3A-3I, respectively, and FIGS. 4J-4O show cross-sectional plan views at a position marked by reference line 102 shown in FIGS. 3J-3R, respectively. The orientation of a mold cavity x-z plane is shown in each of FIGS. 4A-4I, and the orientation of a mold cavity y-z plane is shown in each of FIGS. 4J-4O.

Referring now to FIG. 4A in detail, the figure shows a cross-sectional plan view of a compression mold 100 that is open and comprises a lower mold component 115 having a mold cavity 110 encompassed by a cavity contoured boundary 120 and an upper mold component 105. The upper mold component 105 fits within the lower mold component 115 (as shown in FIG. 4C) when the mold is closed. The outside edges of the upper mold component 105 can fit flush with the inner edges of the lower mold component 115. In other aspects, a small gap may exist between the outside edges of the upper mold component 105 can fit flush with the inner edges of the lower mold component 115, with the gap being of a dimension of 0.01 millimeter to about several millimeters. The mold 100 is shown with a width reference line 401. Prior to closing the mold, the upper mold component 105 can be placed atop the preform 210, as shown in FIG. 4B. The mold is understood to be closed when the upper mold component 105 is arranged in the lower mold component 115 to a desired position, e.g., such that an outer edge of the upper mold component 105 is flush with an upper edge of the lower mold component 115 as shown in FIG. 4C. FIGS. 4J-4L show the mold 100 in the y-z plane corresponding to FIGS. 4A-4C, respectively.

The mold cavity has a mold cavity height dimension 503 as shown, which is along a line parallel to the z-axis, and represents the height at a particular position along the mold cavity longitudinal dimension 501. In some instances, the mold cavity height dimension 503 can be approximately uniform as determined at various positions along the mold cavity longitudinal dimension 501. However, in other instances, the mold cavity height dimension 503 can comprise a plurality of mold cavity height dimensions comprising individual mold cavity height dimensions, each individual mold cavity height dimension associated with a particular position along the mold cavity longitudinal dimension 501. In some aspects, the individual mold cavity height dimensions can vary from one another. The plurality of mold cavity height dimensions can be associated with an average mold cavity height dimension which is the number weighted average of individual mold cavity height dimensions determined along the mold cavity longitudinal dimension 501.

FIG. 4A also shows a unitary foamed preform 210, prior to compression molding, with the orientation of a foamed preform x-z plane shown. The preform has an initial preform height dimension 504 as shown, which is along a line parallel to the z-axis, and represents the height at a particular position along the mold cavity longitudinal dimension 501. In some instances, the initial preform height dimension 504 can be approximately uniform as determined at various positions along the mold cavity longitudinal dimension 501. However, in other instances, the initial preform height dimension 504 can comprise a plurality of initial preform height dimensions comprising individual initial preform height dimensions, each initial preform height dimension associated with a particular position along the mold cavity longitudinal dimension 501. In some aspects, the individual initial preform height dimensions can vary from one another. The plurality of initial preform height dimensions can be associated with an average initial preform height dimension which is the number weighted average of individual initial preform height dimensions determined along the mold cavity longitudinal dimension 501. The preform 210, prior to compression molding, is associated with a foamed preform initial contoured perimeter 220.

As shown in FIGS. 4A, 4B, and 4C, the mold 100 is further associated with a movable platen assembly 300 comprising a movable platen compression member 310 and a movable platen extendable member 320, which, as shown in FIGS. 4A, 4B, and 4C, can extend to contact the upper mold component outside edges of the upper mold component 105 can fit flush with the inner edges of the upper mold component 105, thereby moving the movable platen compression member 310 and the upper mold component 105 in a direction of movement 330 parallel to the z-axis. As shown in FIGS. 4A, 4B, and 4C, the movable platen extendable member 320 is shown at different positions as follows: in a position in which the movable platen extendable member 320a such that the mold is open (FIG. 4A); in a position in which the movable platen extendable member 320b such that the mold is still open, but in which the movable platen compression member 310 is closer to the preform 210, prior to compression molding (FIG. 4B); and); in a position in which the movable platen extendable member 320c such that the mold is closed with the movable platen compression member 310 essentially in contact with a top surface of the mold 100, thereby compressing the preform to the preform 230, after compression molding (FIG. 4C). The direction of movement 330 of the movable platen compression member 310 is in a direction in which compression is applied to the mold 100.

Referring now to FIG. 4B, the figure shows a cross-sectional plan view of the compression mold 100 in FIG. 4A with a foamed preform 210, prior to compression molding, arranged in the mold cavity 110, prior to compression molding, showing a mold gap extending between the contoured perimeter of a foamed preform 220 and the contoured boundary of the mold cavity 120. FIG. 4B shows that a width dimension of the preform 210, prior to compression molding, along a dimension parallel to the x-axis is less than a mold cavity width along a dimension parallel to the x-axis. The arrangement of the 210, prior to compression molding, in the mold cavity 110, is such that the preform x-z plane and the mold cavity x-z plane are aligned. Moreover, as arranged in FIG. 4B, the mold cavity longitudinal dimension 501, and the preform initial longitudinal dimension 502, are co-aligned along the same line that is parallel to the y-axis.

Referring now to FIG. 4C, the figure shows a cross-sectional view of the compression mold 100 in FIG. 4A of a foamed preform 230, after compression molding, which is associated with a foamed preform final contoured perimeter 240. FIG. 4C shows that a width dimension of the preform 230, prior to compression molding, along a dimension parallel to the x-axis is about the same as the mold cavity width along a dimension parallel to the x-axis. As shown in FIG. 4C, the preform final contoured perimeter 240 is in contact with the mold cavity contoured boundary 120. In some aspects, there can be contact at substantially all points along the preform final contoured perimeter 240 and mold cavity contoured boundary 120. However, in other aspects, a mold gap may exist between the preform final contoured perimeter 240 at one or more points along the mold cavity contoured boundary 120.

FIG. 4C also shows a foamed preform 230, after compression molding, with the orientation of a foamed preform x-z plane shown. The preform has a final preform height dimension 505 as shown, which is along a line parallel to the z-axis, and represents the height at a particular position along the mold cavity longitudinal dimension 501. In some instances, the final preform height dimension 505 can be approximately uniform as determined at various positions along the mold cavity longitudinal dimension 501. However, in other instances, the final preform height dimension 505 can comprise a plurality of final preform height dimensions comprising individual final preform height dimensions, each final preform height dimension associated with a particular position along the mold cavity longitudinal dimension 501. In some aspects, the individual final preform height dimensions can vary from one another. The plurality of final preform height dimensions can be associated with an average final preform height dimension which is the number weighted average of individual final preform height dimensions determined along the mold cavity longitudinal dimension 501.

Figure 4D:
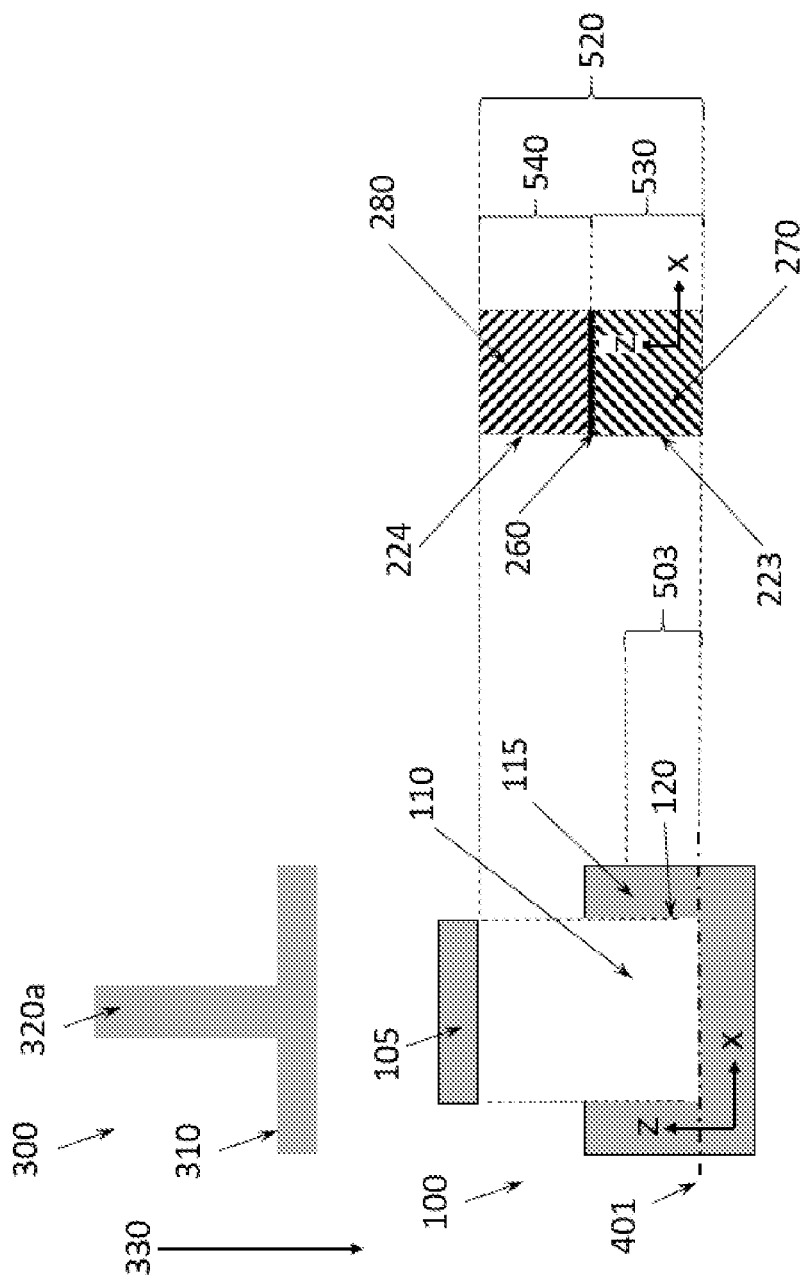
Figure 4F:
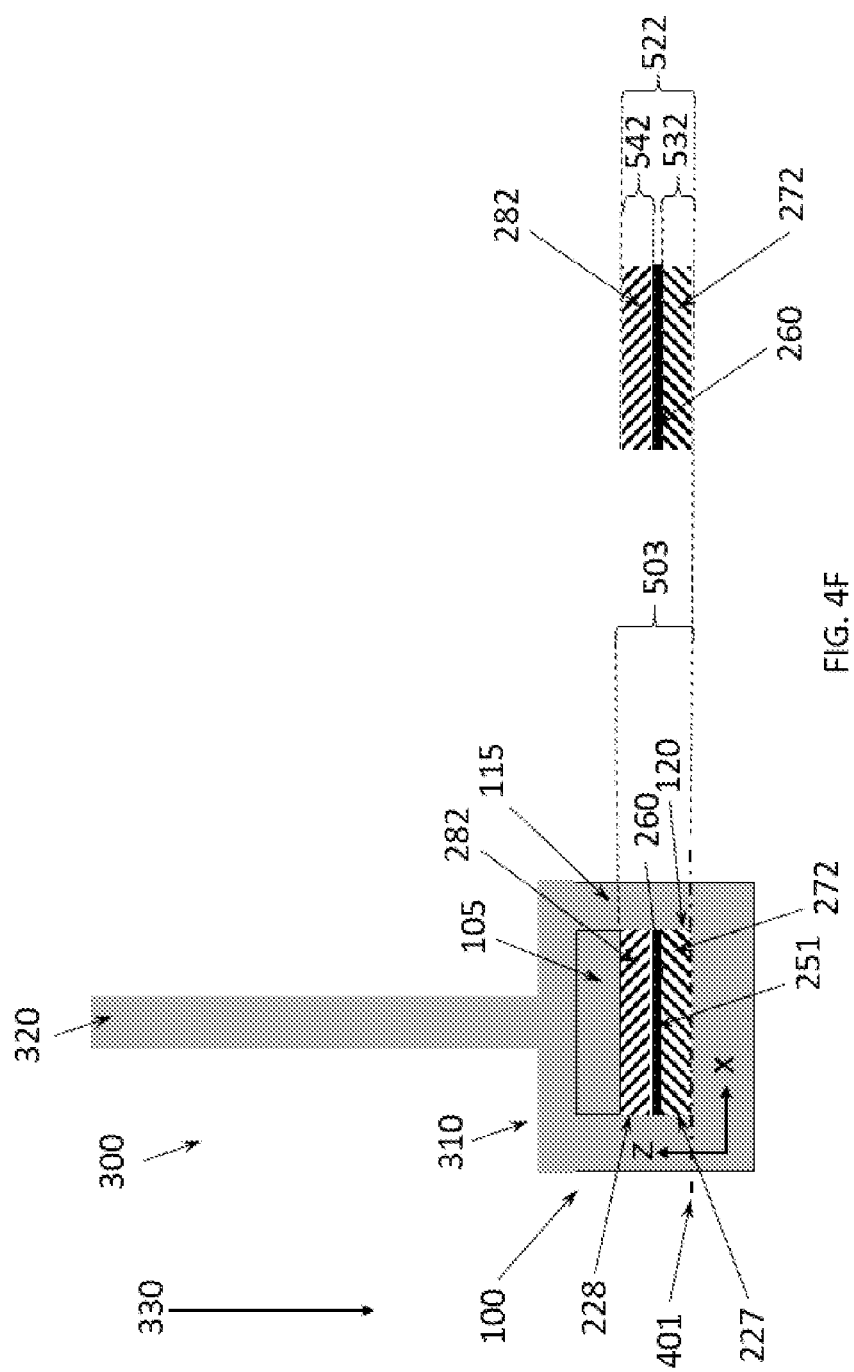

Referring now to FIG. 4D, the figure shows a cross-sectional plan view of a compression mold 100 that is open and comprises a lower mold component 115 having a mold cavity 110 encompassed by a cavity contoured boundary 120 and an upper mold component 105. The upper mold component 105 fits within the lower mold component 115 (as shown in FIG. 4C) when the mold is closed. The outside edges of the upper mold component 105 can fit flush with the inner edges of the lower mold component 115. In other aspects, a small gap may exist between the outside edges of the upper mold component 105 can fit flush with the inner edges of the lower mold component 115, with the gap being of a dimension of 0.01 millimeter to about several millimeters. The mold 100 is shown with a width reference line 401. Prior to closing the mold, the upper mold component 105 can be placed atop the preform 210, as shown in FIG. 4E. The mold is understood to be closed when the upper mold component 105 is arranged in the lower mold component 115 to a desired position, e.g., such that an outer edge of the upper mold component 105 is flush with an upper edge of the lower mold component 115 as shown in FIG. 4F.

The mold cavity has a mold cavity height dimension 503 as shown, which is along a line parallel to the z-axis, and represents the height at a particular position along the mold cavity longitudinal dimension 501. In some instances, the mold cavity height dimension 503 can be approximately uniform as determined at various positions along the mold cavity longitudinal dimension 501. However, in other instances, the mold cavity height dimension 503 can comprise a plurality of mold cavity height dimensions comprising individual mold cavity height dimensions, each individual mold cavity height dimension associated with a particular position along the mold cavity longitudinal dimension 501. In some aspects, the individual mold cavity height dimensions can vary from one another. The plurality of mold cavity height dimensions can be associated with an average mold cavity height dimension which is the number weighted average of individual mold cavity height dimensions determined along the mold cavity longitudinal dimension 501.

FIG. 4E also shows a stacked foam preform comprising a first foam preform 270, a sheet 260, and a second foam preform 280, prior to compression molding, with the orientation of a foamed preform x-z plane shown. In some instances, the sheet 260 is not present (as shown in FIG. 4P), and the stacked foam preform comprises a first foam preform and a second foam preform, respectively, as 270 and 280. Similarly, as shown in FIG. 4S, a split foam preform can be utilized comprising a first foam preform 270, a sheet 260, and a second foam preform 280, and arranged relative to one another as shown therein. It is understood that the first foam preform 270 and the second foam preform 280, in any of the configurations as shown in FIG. 4D, 4P, or 4S, can be the same or similar in cell density and/or preform density using the same or similar polymers. Alternatively, each of the first foam preform 270 and the second foam preform 280 can independently be distinct from one another in cell density, preform density, and polymer composition. In various further aspects, each of the first foam preform 270 and the second foam preform 280 can be of any desirable shape such as wedge, rectangular, or irregular when viewed in either a top plan view or cross-sectional view in the y-z plane or in the x-z plane.

The preform has a stacked foam preform initial height dimension 520 as shown, which is along a line parallel to the z-axis, and represents the height at a particular position along the mold cavity longitudinal dimension 501. The initial stacked foam preform height dimension 520 is the sum of the first foam preform initial height dimension 530, the thickness of the mesh 260, and the second foam preform initial height dimension 540. In some instances, the stacked foam preform initial height dimension 520 can be approximately uniform as determined at various positions along the mold cavity longitudinal dimension 501. However, in other instances, the initial stacked foam preform height dimension 520 can comprise a plurality of initial preform height dimensions comprising individual initial preform height dimensions, each initial preform height dimension associated with a particular position along the mold cavity longitudinal dimension 501. In some aspects, the individual initial preform height dimensions can vary from one another. The plurality of initial preform height dimensions can be associated with an average initial preform height dimension which is the number weighted average of individual initial preform height dimensions determined along the mold cavity longitudinal dimension 501. The first foam preform 270 and the second foam preform 280, prior to compression molding, are associated with a foam preform initial contoured perimeter 223 and 224, respectively.

As shown in FIGS. 4D, 4E, and 4F, the mold 100 is further associated with a movable platen assembly 300 comprising a movable platen compression member 310 and a movable platen extendable member 320, which, as shown in FIGS. 4D, 4E, and 4F, can extend to contact the upper mold component outside edges of the upper mold component 105 can fit flush with the inner edges of the upper mold component 105, thereby moving the movable platen compression member 310 and the upper mold component 105 in a direction of movement 330 parallel to the z-axis. As shown in FIGS. 4D, 4E, and 4F, the movable platen extendable member 320 is shown at different positions as follows: in a position in which the movable platen extendable member 320a such that the mold is open (FIG. 4D); in a position in which the movable platen extendable member 320b such that the mold is still open, but in which the movable platen compression member 310 is closer to the preform 210, prior to compression molding (FIG. 4E); and); in a position in which the movable platen extendable member 320c such that the mold is closed with the movable platen compression member 310 essentially in contact with a top surface of the mold 100, thereby compressing the preform to the preform 230, after compression molding (FIG. 4F). The direction of movement 330 of the movable platen compression member 310 is in a direction in which compression is applied to the mold 100.

Referring now to FIG. 4E, the figure shows a cross-sectional plan view of the compression mold 100 in FIG. 4D with a stacked foam preform comprising a first foam preform 270, a sheet 260, and a second foam preform 280, prior to compression molding, arranged in the mold cavity 110, prior to compression molding, showing a mold gap extending between the contoured perimeter first foam preform 270 and the second foam preform 280, i.e., a foam preform initial contoured perimeter 223 and 224, respectively, and the contoured boundary of the mold cavity 120. FIG. 4E shows that a width dimension of the stacked foam preform, prior to compression molding, along a dimension parallel to the x-axis is less than a mold cavity width along a dimension parallel to the x-axis. The arrangement of the stacked foam preform, prior to compression molding, in the mold cavity 110, is such that the preform x-z plane and the mold cavity x-z plane are aligned. Moreover, as arranged in FIG. 4E, the mold cavity longitudinal dimension 501, and the preform initial longitudinal dimension 502, are co-aligned along the same line that is parallel to the y-axis.

Referring now to FIG. 4F, the figure shows a cross-sectional view of the compression mold 100 in FIG. 4A of a stacked molded article, after compression molding, comprising a first molded article 272, e.g., a first molded midsole, and a second molded article 282, e.g., a second molded midsole, and a sheet 260 located between the first molded article and the second molded article, and which a first molded article contoured perimeter 223 and a second molded article contoured perimeter 224. FIG. 4F shows that a width dimension of the stacked molded article along a dimension parallel to the x-axis is about the same as the mold cavity width along a dimension parallel to the x-axis. As shown in FIG. 4F, the molded article contoured perimeter comprising the first molded article contoured perimeter 223 and the second molded article contoured perimeter 224 is in contact or essentially in contact with the mold cavity contoured boundary 120. In some aspects, there can be contact at substantially all points along the molded article contoured perimeter and mold cavity contoured boundary 120. However, in other aspects, a mold gap may exist between the molded article contoured perimeter at one or more points along the mold cavity contoured boundary 120.

FIG. 4F also shows a stacked molded article, after compression molding, comprising a first molded article 272, e.g., a first molded midsole, and a second molded article 282, e.g., a second molded midsole, and a sheet 260 located between the first molded article and the second molded article with the orientation of a foamed preform x-z plane shown. The preform has a molded article height dimension 522 as shown, which is along a line parallel to the z-axis, and represents the height at a particular position along the mold cavity longitudinal dimension 501. The molded article height dimension 522 is a sum of the first molded article height dimension 532, the thickness of the mesh 260, and the second molded article height dimension 542. In some instances, the molded article height dimension 522 can be approximately uniform as determined at various positions along the mold cavity longitudinal dimension 501. However, in other instances, the molded article height dimension 522 can comprise a plurality of final preform height dimensions comprising individual final preform height dimensions, each final preform height dimension associated with a particular position along the mold cavity longitudinal dimension 501. In some aspects, the individual final preform height dimensions can vary from one another. The plurality of final preform height dimensions can be associated with an average final preform height dimension which is the number weighted average of individual final preform height dimensions determined along the mold cavity longitudinal dimension 501.

Figure 4G:
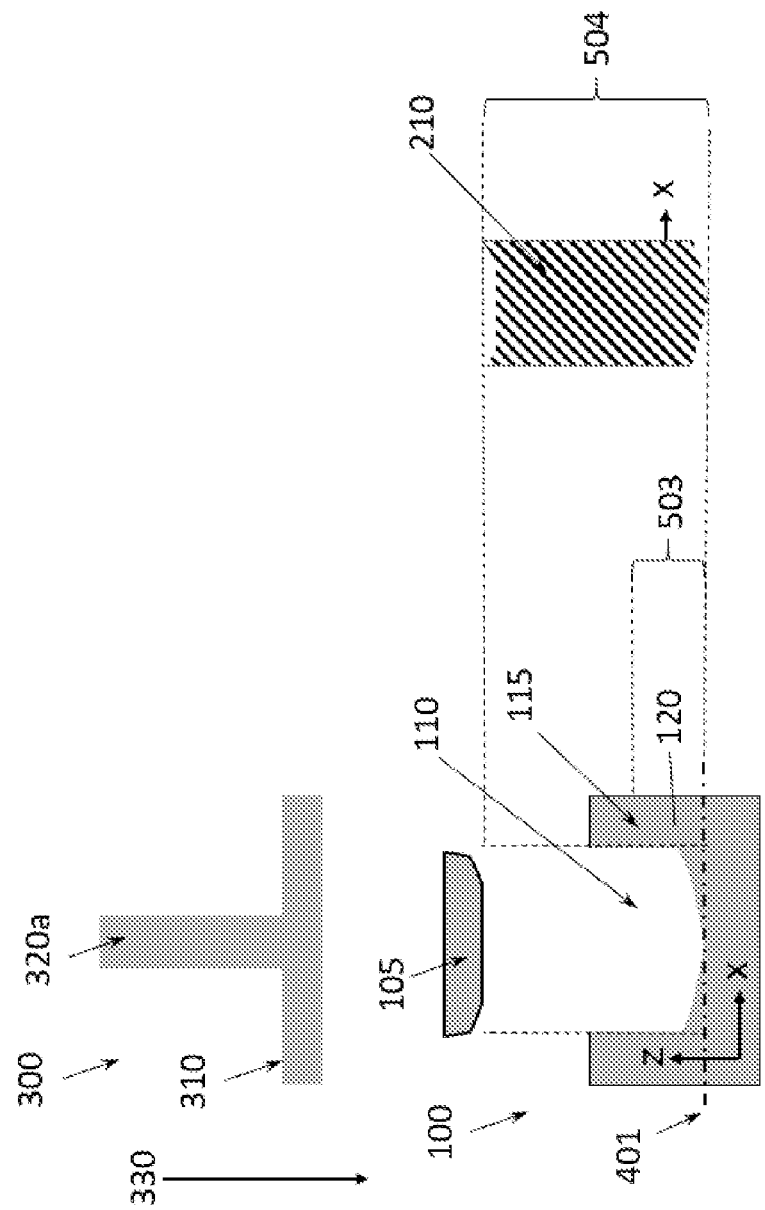
Figure 4H:
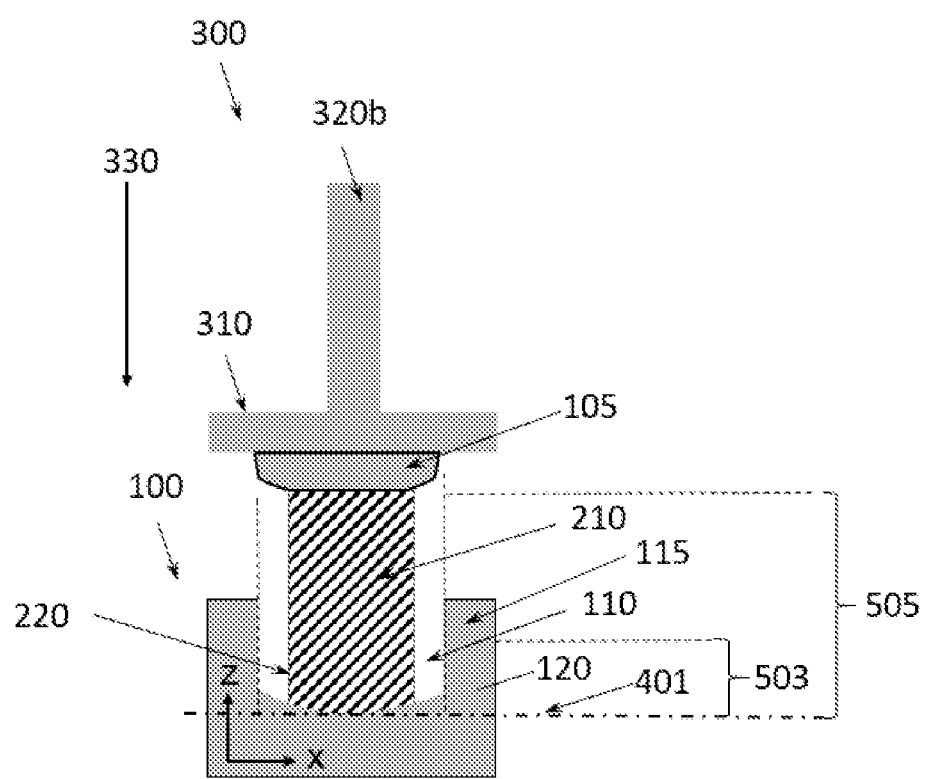
Figure 4J:
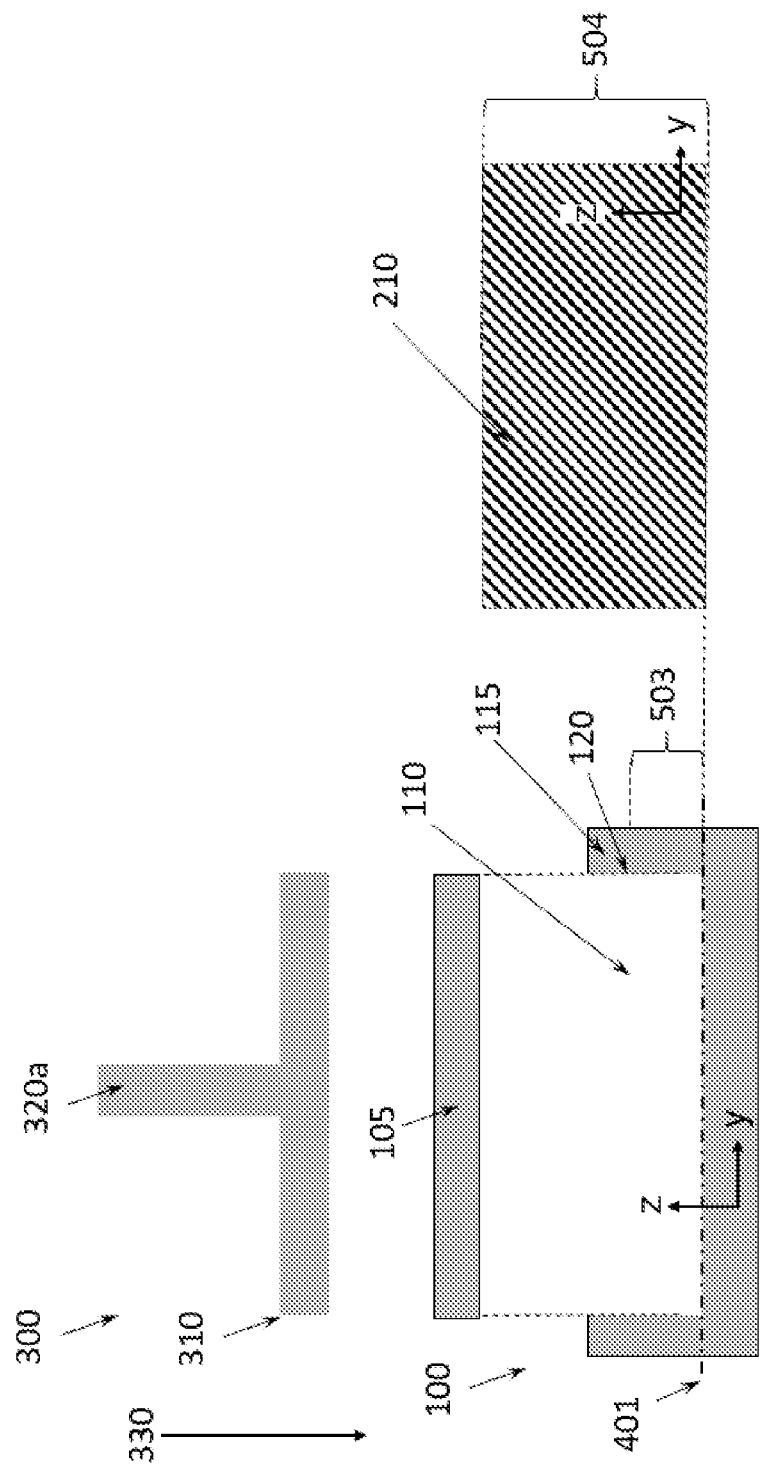
Figure 4K:
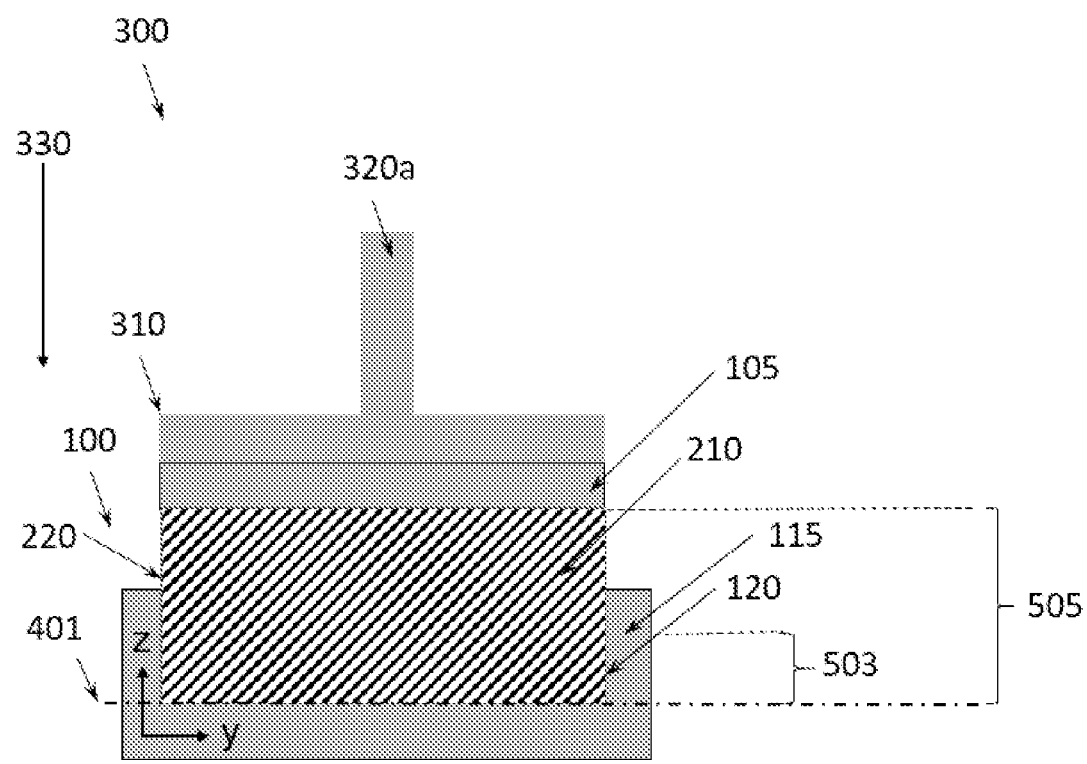
Figure 4L:
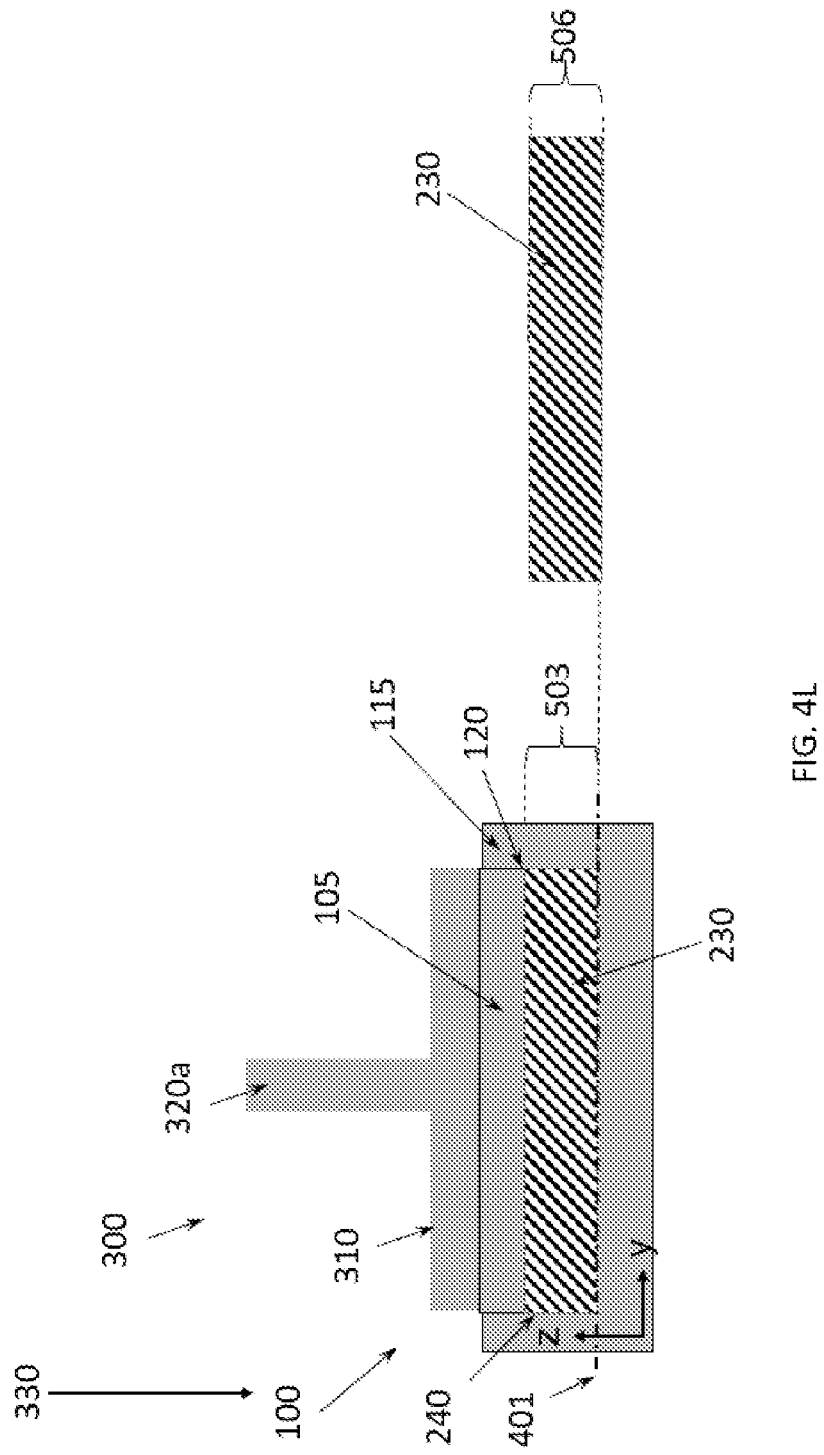
Figure 4M:
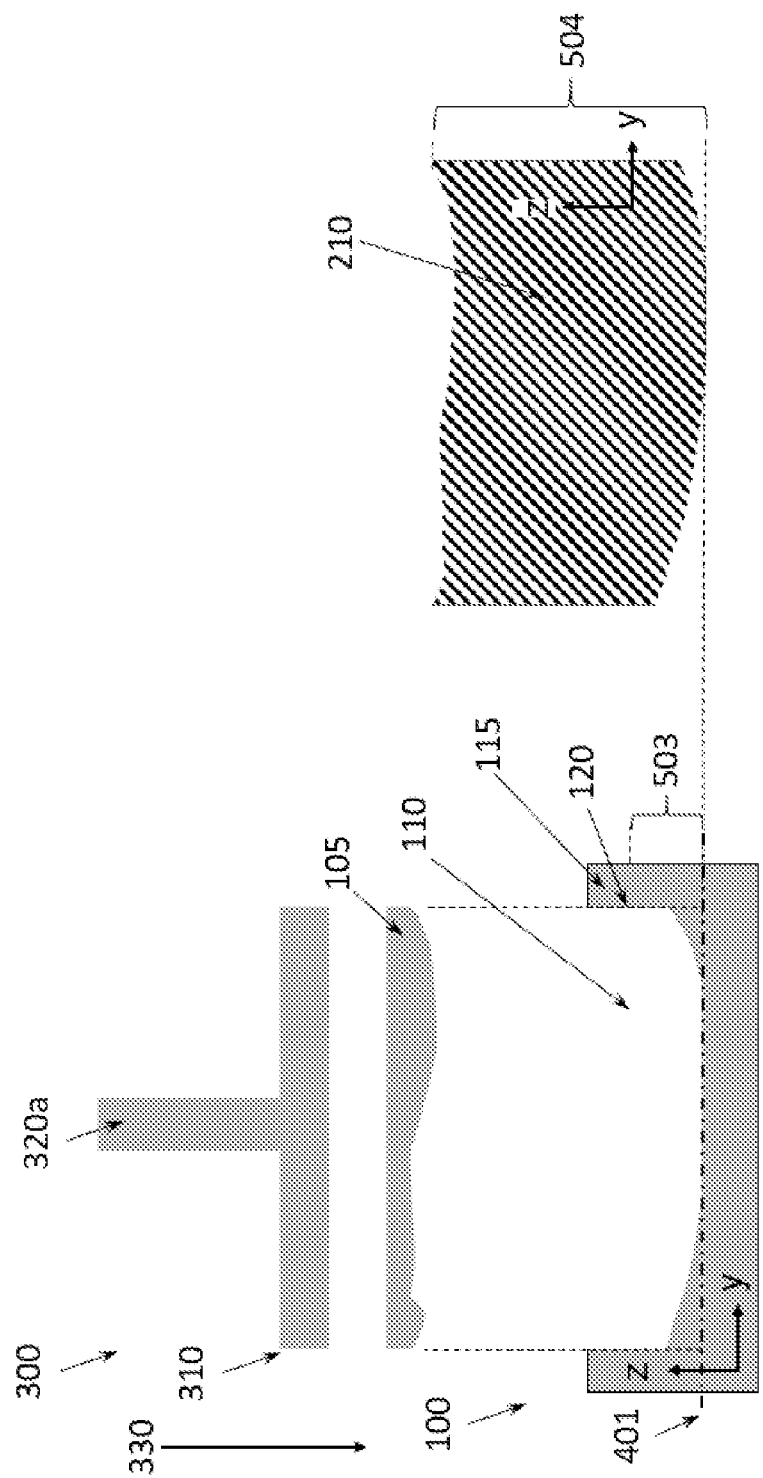
Figure 4N:
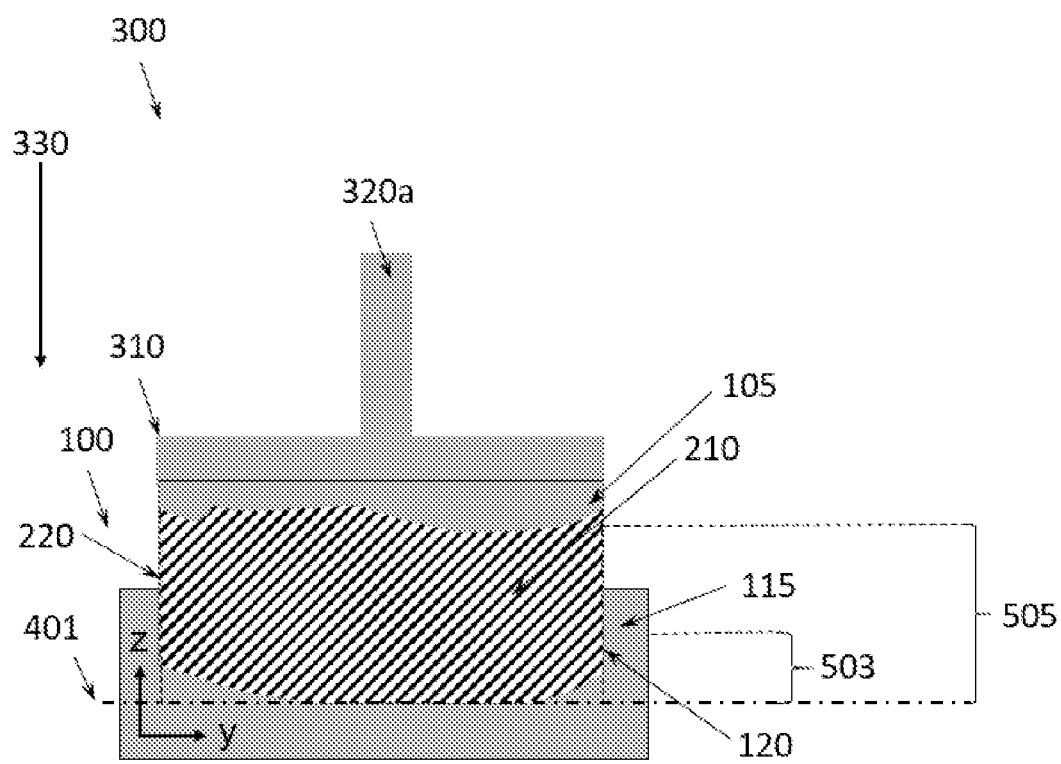
Figure 4O:
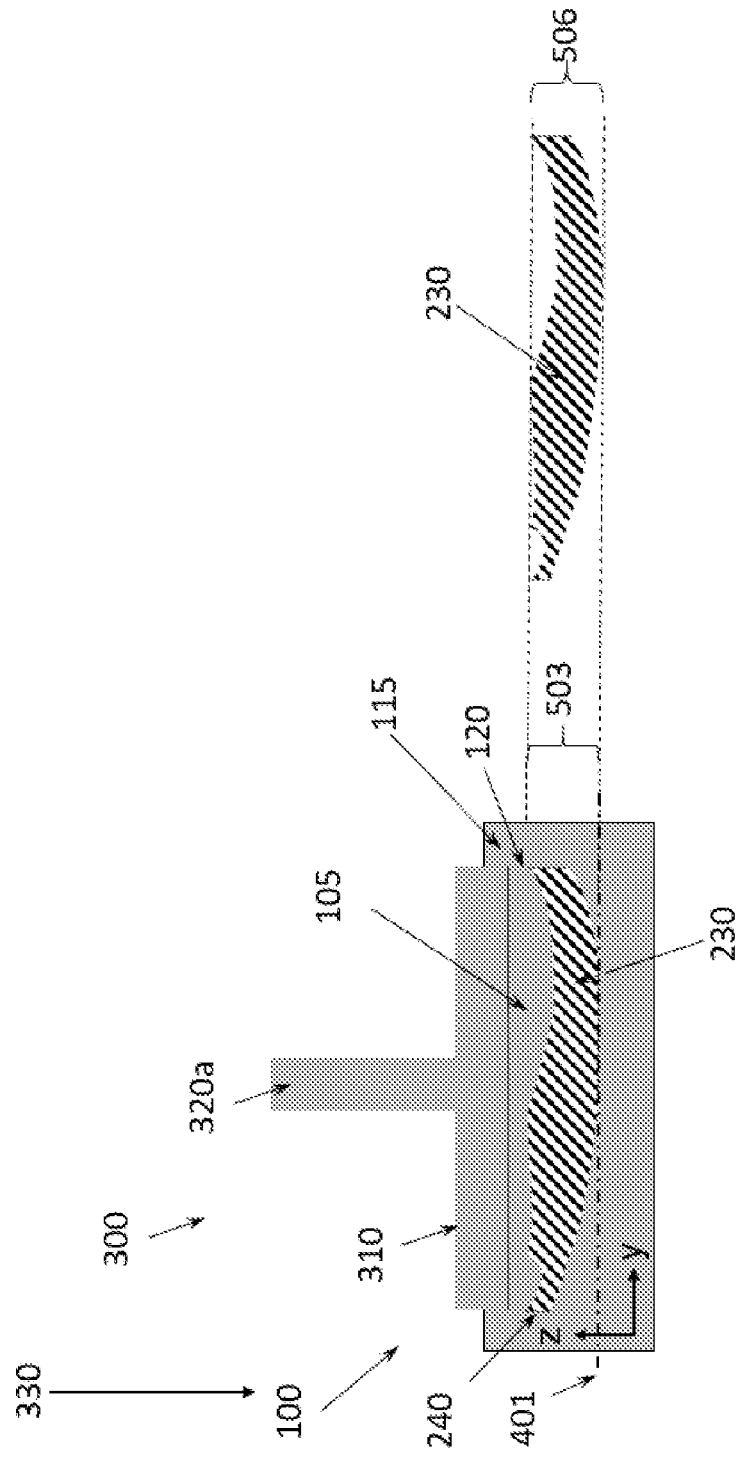
Figure 4P:
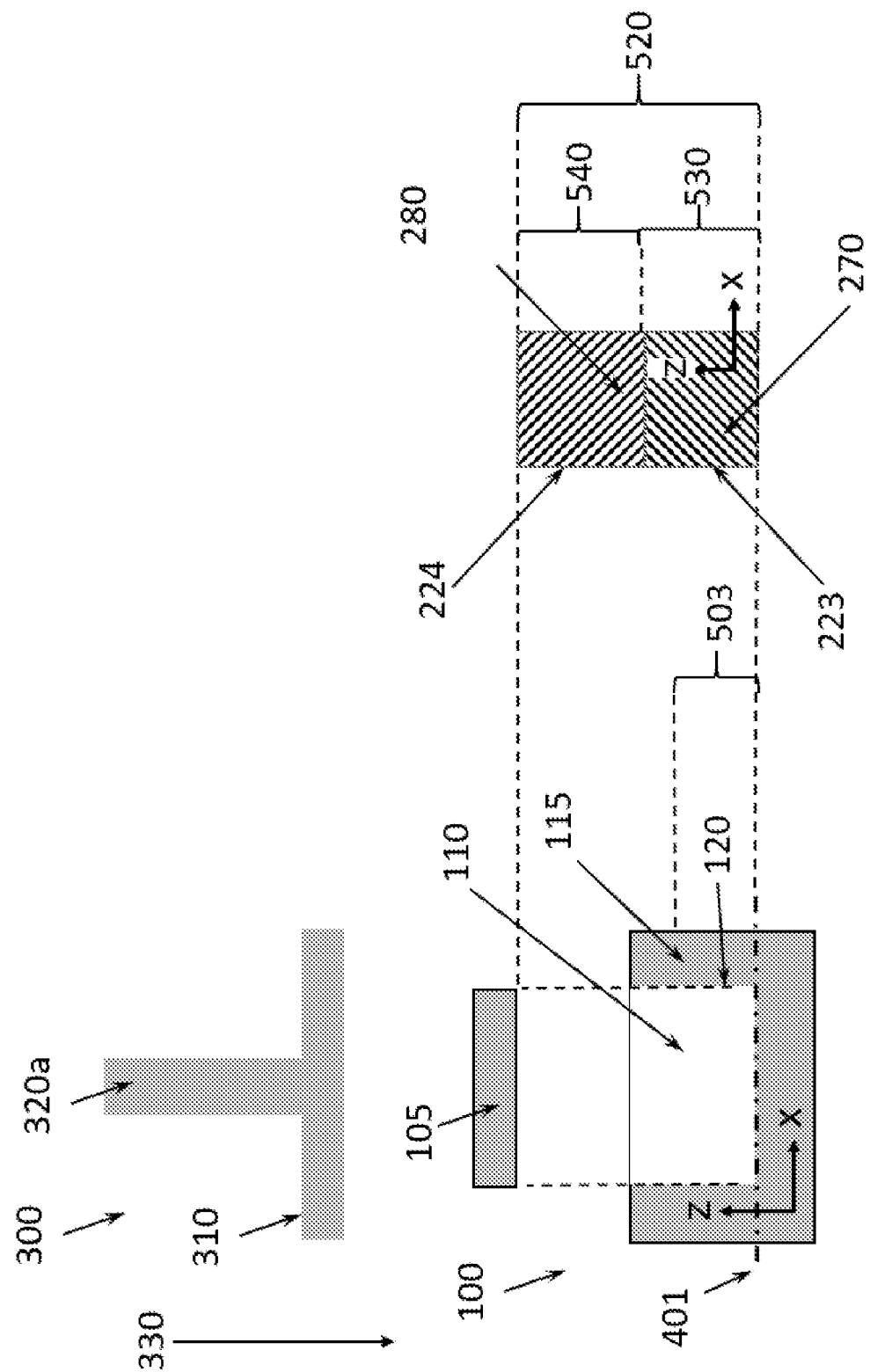

FIGS. 4G-4I are similar to FIGS. 4A-4C, except that the upper mold component 105 and the lower mold component 115 are shown with a curved shape in the x-z plane. Similarly, the foam preform can have a similar curved shape in the x-z plane as shown. In other instances, the foam preform can be essentially flat on the upper and lower edges (as shown in FIG. 4A), and a shape can be obtained from compression molding with a curved upper mold component 105 and a curved lower mold component 115 as shown in FIGS. 4G-4I. FIGS. 4M-4O show the mold 100 in the y-z plane corresponding to FIGS. 4G-4I, respectively.

Figure 4Q:
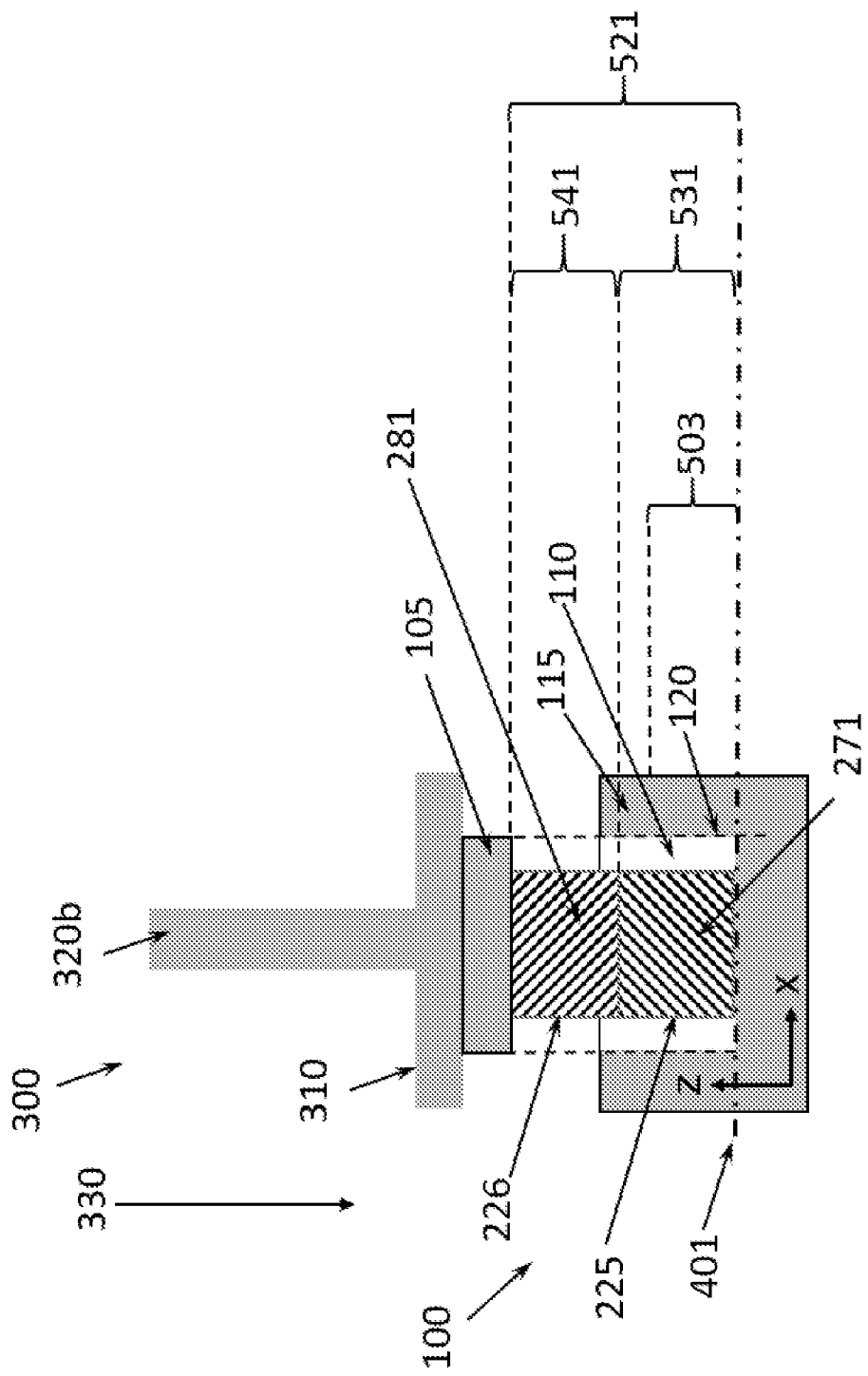

FIGS. 4P-4R are similar to FIGS. 4A-4C, except that as shown in FIG. 4P, two preforms, i.e., a first preform and a second preform, are used and are stacked upon one on top of the other. That is, the method further comprises arranged a second preform on top of a first preform, with the method optionally comprising placing an adhesive on the first preform, on the second preform, or both the first and second preforms prior to arranging the second preform on top of it. Noteworthy is that as in situation where a single preform is used, such as described for FIGS. 4A-4C, there is a gap between the preform perimeter, as defined by the combination of the first and second preforms, and the mold wall. The process is otherwise as described for FIGS. 4A-4C. As noted above, an adhesive can be placed between the two preforms. However, in some aspects, no adhesive is placed between the first and the second preforms, but they become affixed to one another during the compression molding process as a result of at least partial softening of the first preform, the second preform, or both, and the melted preform flowing to the other, thereby at least partially affixing the first preform to the second preform. As can be appreciated, the method as discussed herein is merely one example. That is, it is not limited to just use of a first and second preform, but rather it is contemplated that a plurality of preforms of varying thicknesses could be arranged one on top of the other in an analogous manner.

Figure 4U:
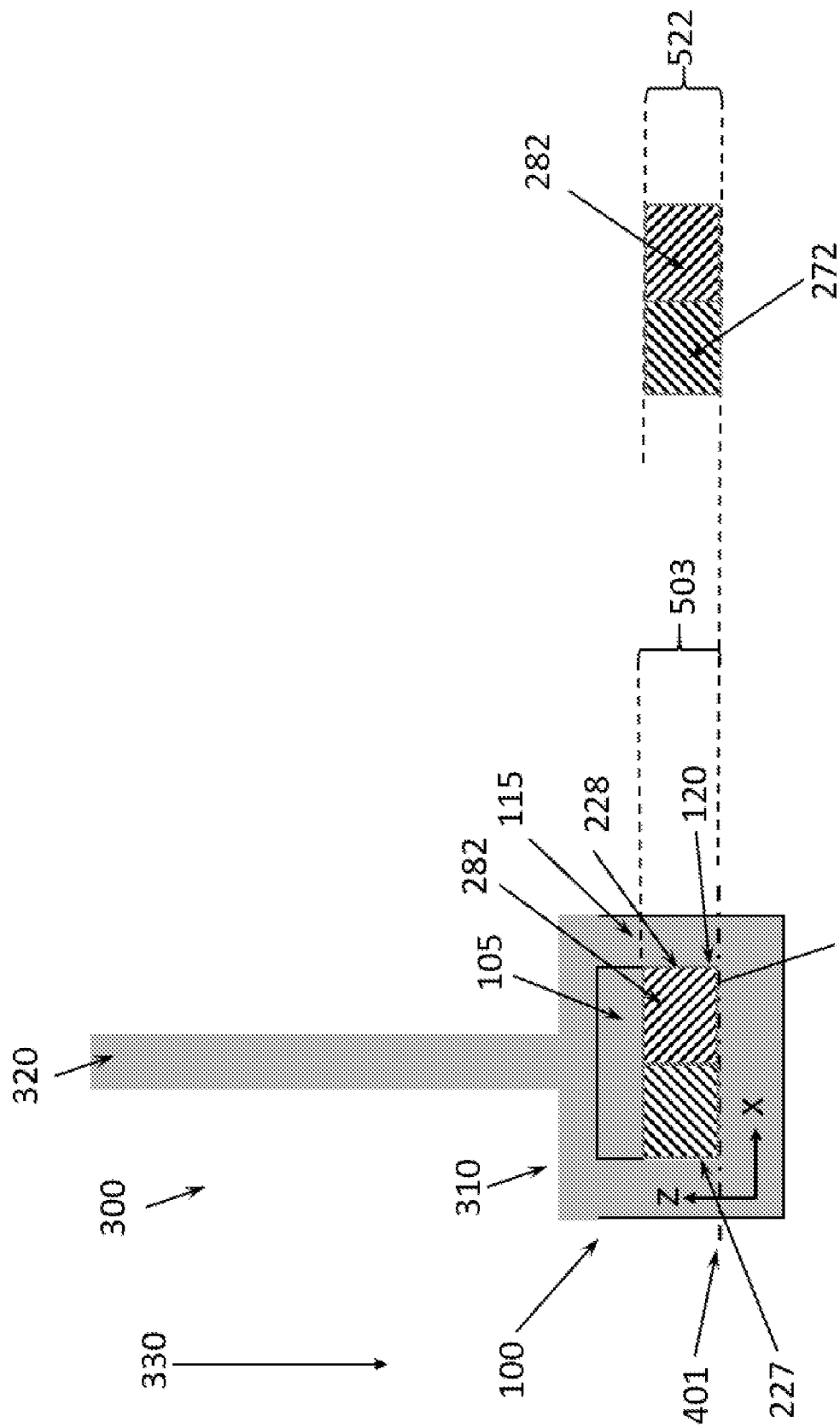

FIGS. 4S-4U are similar to FIGS. 4A-4C, except that as shown in FIG. 4S, two preforms, i.e., a first preform and a second preform, are used and are arranged side-by-side as shown in FIG. 4S. That is, the method further comprises arranged a second preform alongside a first preform, with the method optionally comprising placing an adhesive on the first preform, on the second preform, or both the first and second preforms prior to arranging the second preform alongside of it. Noteworthy is that as in situation where a single preform is used, such as described for FIGS. 4A-4C, there is a gap between the preform perimeter, as defined by the combination of the first and second preforms, and the mold wall. The process is otherwise as described for FIGS. 4A-4C. As noted above, an adhesive can be placed between the two preforms. However, in some aspects, no adhesive is placed between the first and the second preforms, but they become affixed to one another during the compression molding process as a result of at least partial softening of the first preform, the second preform, or both, and the melted preform flowing to the other, thereby at least partially affixing the first preform to the second preform. As can be appreciated, the method as discussed herein is merely one example. That is, it is not limited to just use of a first and second preform, but rather it is contemplated that a plurality of preforms of varying thicknesses could be arranged side-by-side in an analogous manner.

Figure 4X:
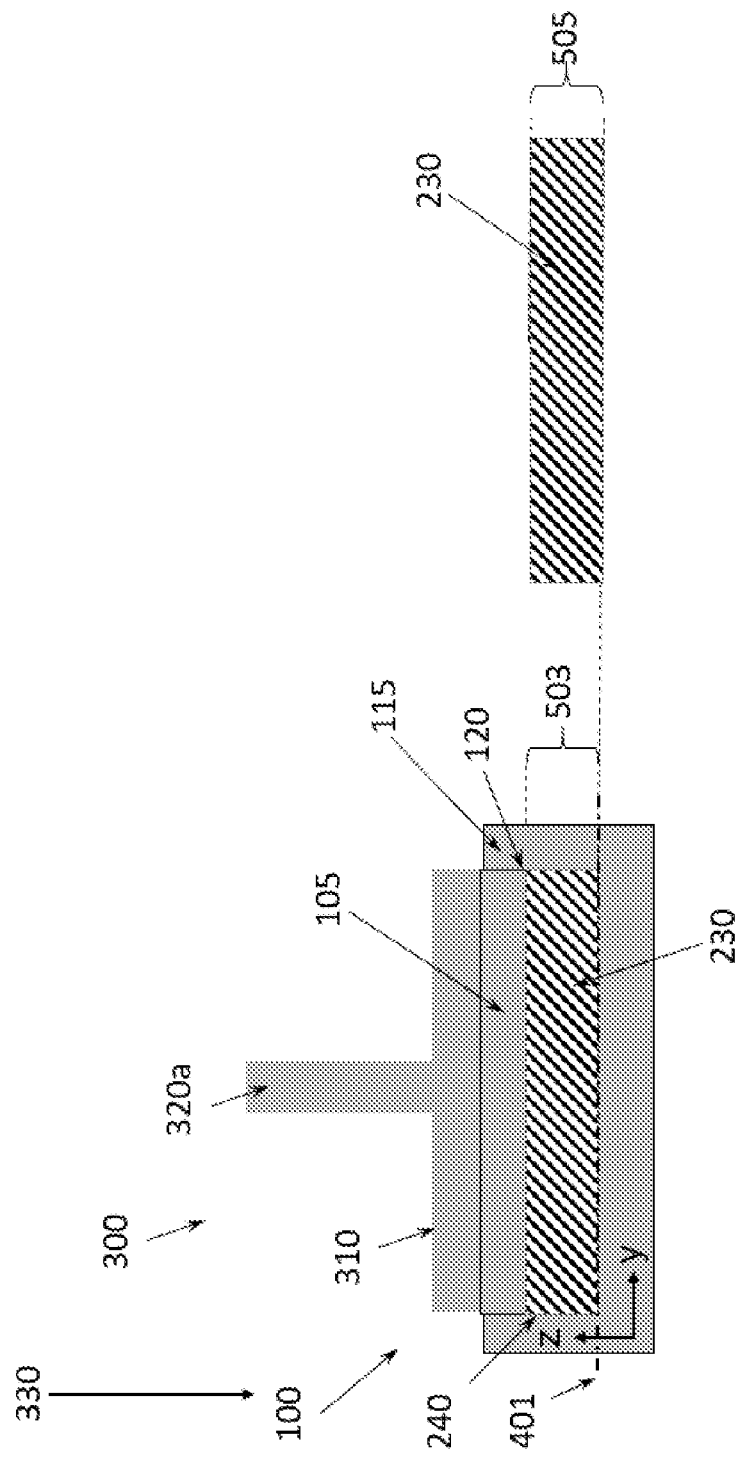

FIGS. 4V-4X are similar to FIGS. 4J-4L, except that as shown in FIG. 4V, a preform is used that has two height dimensions over the length of the preform. This can be obtained in a unitary or single preform by molding as such, or alternatively, cutting or shaping a uniform preform have a substantially similar height dimension as shown in FIG. 4J. Alternatively, a preform having two heights as shown can be obtained by arranging a second preform on top of a first preform, or arranging a shorter height dimension first preform alongside of a higher height dimension preform as variation of the methods described immediately above for FIGS. 4P-4R and FIGS. 4S-4U. As can be appreciated, compression of a stepped preform as shown in FIG. 4V, can provide distinct properties associated with each portion of differing height dimensions including different degrees of anisotropy, density, and the like, or differences in combinations of these properties. As can be appreciated, the method as discussed herein is merely one example. That is, it is not limited to just utilizing a preform having two different height dimensions, but rather it is contemplated that a preform having a plurality of height dimensions can be utilized in an analogous manner.

In various aspects, a mold 100 having a mold cavity 110 and a mold cavity wall 115 can comprise one or a plurality of microvents arranged in the mold cavity wall 115, such that each microvent has an opening of from about 10 micrometers to about 500 micrometers.

The sheet 260 can be a film or a textile such as a mesh textile, and can be a single sheet or a plurality of sheets, e.g., a plurality of films and/or mesh textiles arranged in layers. In some implementations, the midsole structure includes a plurality of sheets disposed between the first midsole portion and the second midsole portion. The plurality of sheets may include two or more sheets 260 positioned between a medial side of the midsole structure and a lateral side of the midsole structure. A width of each of the two or more sheets may be at least 0.5 cm. At least a portion of the plurality of sheets disposed between the first midsole portion and the second midsole portion may partially or fully overlap each other in a region between the first midsole portion and the second midsole portion. Optionally, none of the plurality of sheets 260 disposed between the first midsole portion and the second midsole portion may overlap each other in a region between the first midsole portion and the second midsole portion.

In some configurations, the midsole structure includes an adhesive disposed between the first midsole portion and the second midsole portion. The adhesive may be applied to at least one of the first midsole portion, the second midsole portion, an upper surface of the sheet 260, and a lower surface of the sheet 260. The sheet 260 may include at least one aperture. For example, the sheet may include a mesh textile including at least one aperture in a structure of the mesh or including a plurality of apertures in a structure of the mesh. A region of the sheet disposed between the first midsole portion and the second midsole portion may include at least 50 apertures in the structure of the sheet. The sheet 260 may further include a plurality of apertures each being at least 0.5 mm in length in a largest dimension or at least 1.0 mm in length in a largest dimension. The sheet 260 may also include a plurality of apertures each being less than 10 mm in length in a largest dimension, each being less than 5.0 mm in length in a largest dimension, or each being less than 3.0 mm in length in a largest dimension. Additionally or alternatively, the sheet 260 may include a plurality of apertures each having a length in a largest dimension from about 0.5 mm to about 3.0 mm.

In some implementations, the sheet 260 is configured to stretch in in only one dimension, such as a textile configured to stretch in only one dimension. Optionally, the sheet 260 may be configured to stretch in two dimensions. The sheet 260 may be an embroidered sheet, such as an embroidered textile. The sheet 260 may include embroidered regions disposed at discrete locations of the sheet 260. The sheet 260 may also include first embroidered regions and second embroidered regions. The first embroidered regions may have a different concentration of fibers than the second embroidered regions.

In some configurations the sheet 260 includes a textile such as a woven textile, a knit textile, a crocheted textile, a braided textile, a non-woven textile, or any combination thereof. The sheet 260 can include at least one of a woven textile and a knitted textile. The method may also include providing an adhesive between the first midsole portion and the second midsole portion. The method may further include bonding the first midsole portion, the second midsole portion, and the sheet 260 together via the adhesive. Optionally, the method may include forming at least one of the first midsole portion and the second midsole portion from a foamed material. In some instances, the sheet 260 is a textile that is a mesh. In various aspects, the sheet 260 is a film, such as a flexible film.

The sheet 260 may be formed from a polymeric material such as, for example, a thermoplastic polymeric material. An exemplary thermoplastic polymeric material may include, for example, a thermoplastic polyurethane or the like. In some examples, the sheet 260 may be a thermoformable material. In some examples, if the sheet 260 is a textile, the textile can comprise polyester fibers. Furthermore, in other examples, if the sheet 260 is a textile including apertures such as a mesh textile, each aperture of the sheet 260 may be at least 0.5 mm in length in a largest dimension or at least 1.0 mm in length in a largest dimension. Furthermore, each aperture formed in the sheet 260 may be configured to permit one or both of the first midsole portion and the second midsole portion to directly contact one another. In various aspects, the sheet 260 includes a polymeric material comprising one or more polymers, such as a polyurethane, a polyurea, a polyamide, a polyester, a polyether, a polyolefin, and any combination thereof. The one or more polymers can include a block copolymer of ethylene and α-olefins having 4 to about 8 carbon atoms, a styrene block copolymer such as poly(styrene-butadiene-styrene), poly(styrene-ethylene-co-butylene-styrene), and poly(styrene-isoprene-styrene), and combinations thereof.

In some instances, the sheet 260 is an embroidered sheet, such as an embroidered textile, and has one or more first regions including embroidery and one or more second regions without embroidery or with a lower percentage of embroidered surface area as comparted to the one or more first regions. The embroidery can provide reduced stretch or a "lock down" feature to areas of the sheet 260. Such areas of the sheet 260 providing a reduced stretch quality may be located, for example, at a region of the sheet 260 that is arranged between the first midsole portion and the second midsole portion.

A compression ratio can be associated with the disclosed methods, such that the compression ratio is the ratio of initial preform height dimension 504 to the final preform height dimension 505. In various aspects, the compression ratio can be a ratio from about 1.1 to about 10.0, or about 1.2 to about 4.0, or about 1.5 to about 3.0.

Figure 5A:
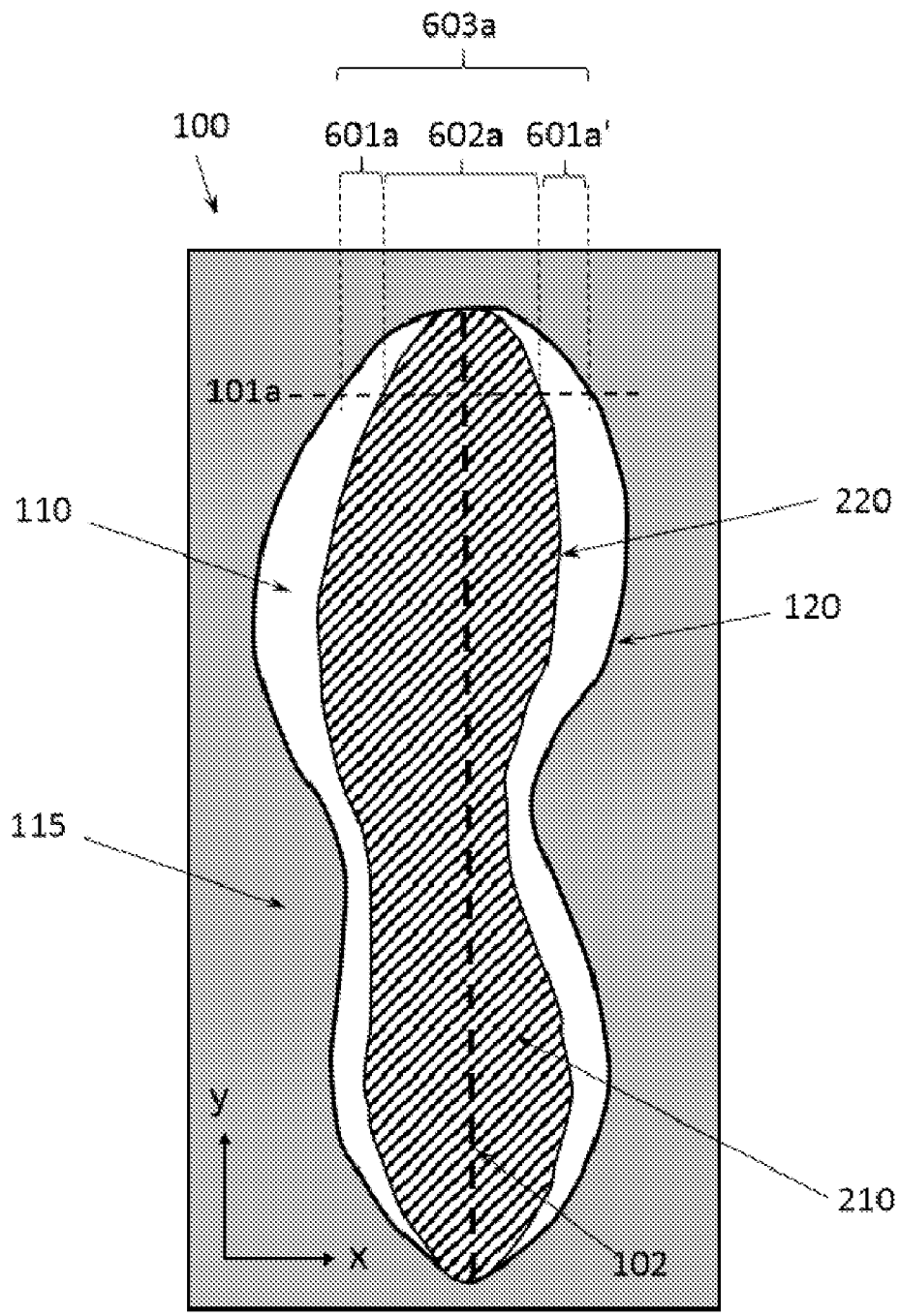
FIGS. 5A-5D are top plan views of a representative compression mold for a midsole with preform arranged therein prior to compression molding.
Figure 5B:
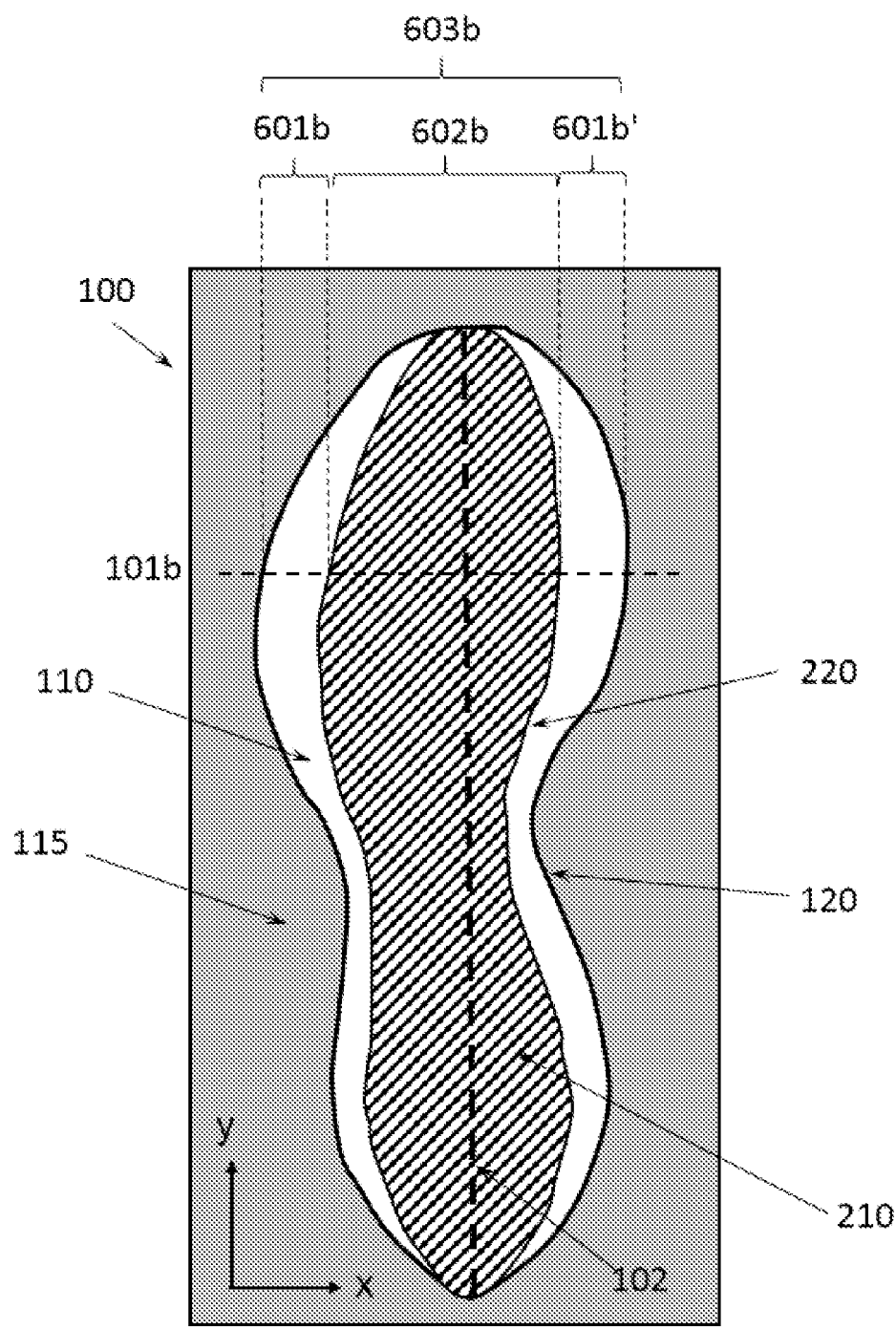

Referring now to FIGS. 5A and 5B, further views of the mold gap are shown. Referring to FIG. 5A, a top plan view width reference line 101*a* is shown at a particular position, $P_1$, along a longitudinal cavity dimension line 102. The longitudinal cavity dimension line 102 is parallel to the y-axis of the mold x-y plane as shown. As shown, the preform 210, prior to compression molding, has an initial preform width, $IPW_1$, 602*a* along the top plan view width reference line 101*a*. Further, as shown, the mold cavity 110 has mold cavity width, $CVW_1$, 603*a* along the top plan view width reference line 101*a*. In this instance, the initial preform width, $IPW_1$, 602*a* is less than the mold cavity width, $CVW_1$, 603*a* at the top plan view width reference line 101*a*. In FIG. 5A, the preform 210, prior to compression molding, is arranged in the mold cavity 110 such they are each co-aligned in the y-axis along the longitudinal cavity dimension line 102. That is, the preform 210, prior to compression molding, is approximately centered in the mold cavity 110 in the y-axis. As a result of the particular alignment of the preform 210, prior to compression molding, and the mold cavity 110, there exist two mold gaps, 601*a* and 601*a'*, along the top plan view width reference line 101*a* between the preform initial contoured perimeter 220 and the mold cavity contoured boundary 120 as shown. In some aspects, as shown, the mold gaps, 601*a* and 601*a'*, can have different dimensions. In other aspects, the mold gaps, 601*a* and 601*a'*, can be of equal dimensions.

Referring to FIG. 5B, a top plan view width reference line 101*b* is shown at a particular position, $P_2$, along a longitudinal cavity dimension line 102. The longitudinal cavity dimension line 102 is parallel to the y-axis of the mold x-y plane as shown. As shown, the preform 210, prior to compression molding, has an initial preform width, $IPW_2$, 602*b* along the top plan view width reference line 101*b*. Further, as shown, the mold cavity 110 has mold cavity width, $CW_2$, 603*b* along the top plan view width reference line 101*b*. In this instance, the initial preform width, $IPW_2$, 602*b* is less than the mold cavity width, $CW_2$, 603*b* at the top plan view width reference line 101*a*. In FIG. 5B, the preform 210, prior to compression molding, is arranged in the mold cavity 110 such they are each co-aligned in the y-axis along the longitudinal cavity dimension line 102. That is, the preform 210, prior to compression molding, is approximately centered in the mold cavity 110 in the y-axis. As a result of the particular alignment of the preform 210, prior to compression molding, and the mold cavity 110, there exist two mold gaps, 601*b* and 601*b'*, along the top plan view width reference line 101*b* between the preform initial contoured perimeter 220 and the mold cavity contoured boundary 120 as shown. In some aspects, as shown, the mold gaps, 601*b* and 601*b'*, can have different dimensions. In other aspects, the mold gaps, 601*b* and 601*b'*, can be of equal dimensions.

Figure 5C:
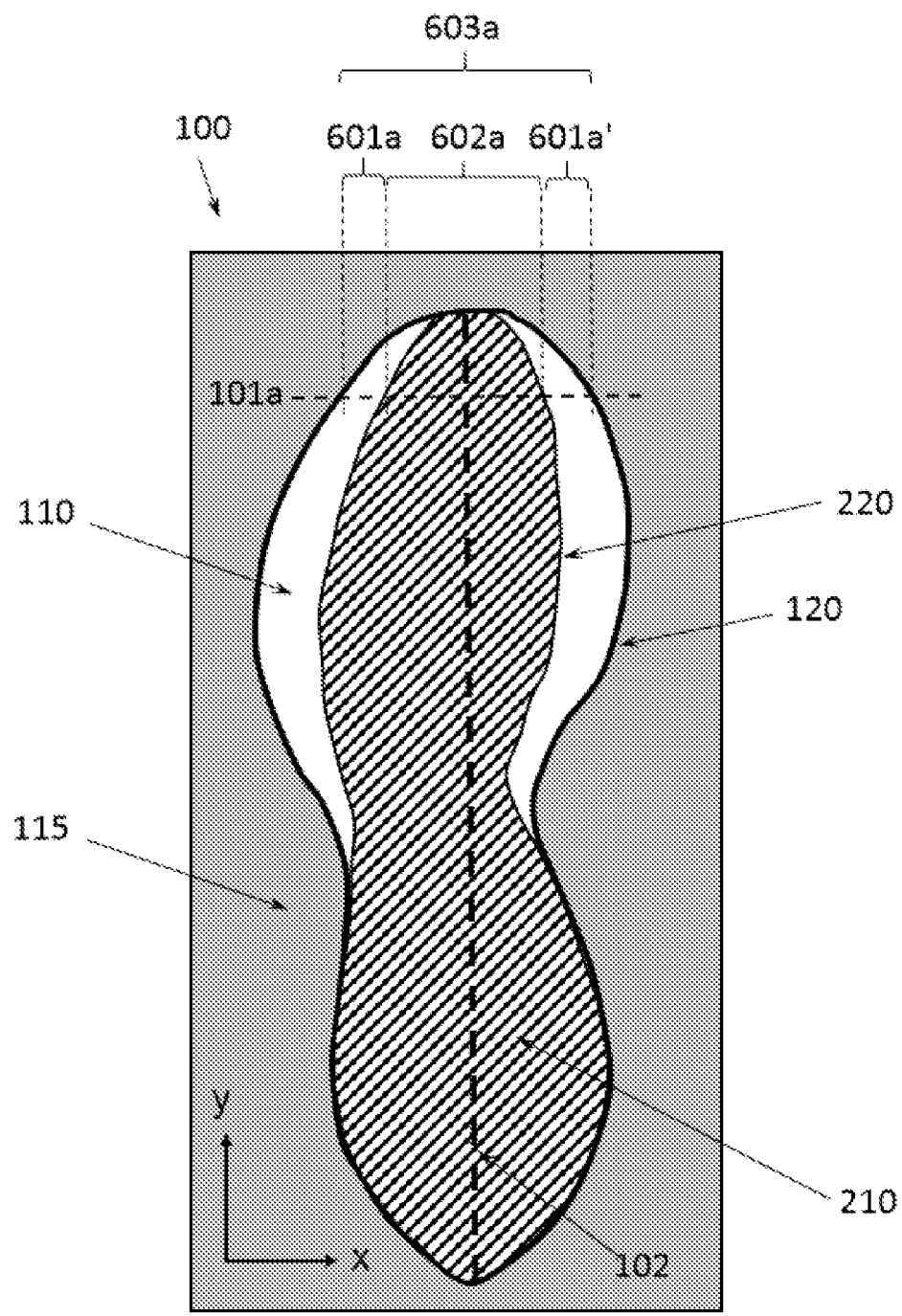

Referring now to FIGS. 5C and 5C, further views of the mold gap are shown. Referring to FIG. 5C, a top plan view width reference line 101*a* is shown at a particular position, $P_1$, along a longitudinal cavity dimension line 102. The longitudinal cavity dimension line 102 is parallel to the y-axis of the mold x-y plane as shown. As shown, the preform 210, prior to compression molding, has an initial preform width, $IPW_1$, 602*a* along the top plan view width reference line 101*a*. Further, as shown, the mold cavity 110 has mold cavity width, $CW_1$, 603*a* along the top plan view width reference line 101*a*. In this instance, the initial preform width, $IPW_1$, 602*a* is less than the mold cavity width, $CW_1$, 603*a* at the top plan view width reference line 101*a*. In FIG. 5A, the preform 210, prior to compression molding, is arranged in the mold cavity 110 such they are each co-aligned in the y-axis along the longitudinal cavity dimension line 102. That is, the preform 210, prior to compression molding, is approximately centered in the mold cavity 110 in the y-axis. As a result of the particular alignment of the preform 210, prior to compression molding, and the mold cavity 110, there exist two mold gaps, 601*a* and 601*a'*, along the top plan view width reference line 101*a* between the preform initial contoured perimeter 220 and the mold cavity contoured boundary 120 as shown. In some aspects, as shown, the mold gaps, 601*a* and 601*a'*, can have different dimensions. In other aspects, the mold gaps, 601*a* and 601*a'*, can be of equal dimensions. As shown in FIG. 5C, there are essentially no or negligible gaps between the foamed preform and the mold cavity contoured boundary 120 in the heel region of the foamed preform and the mold cavity.

Figure 5D:
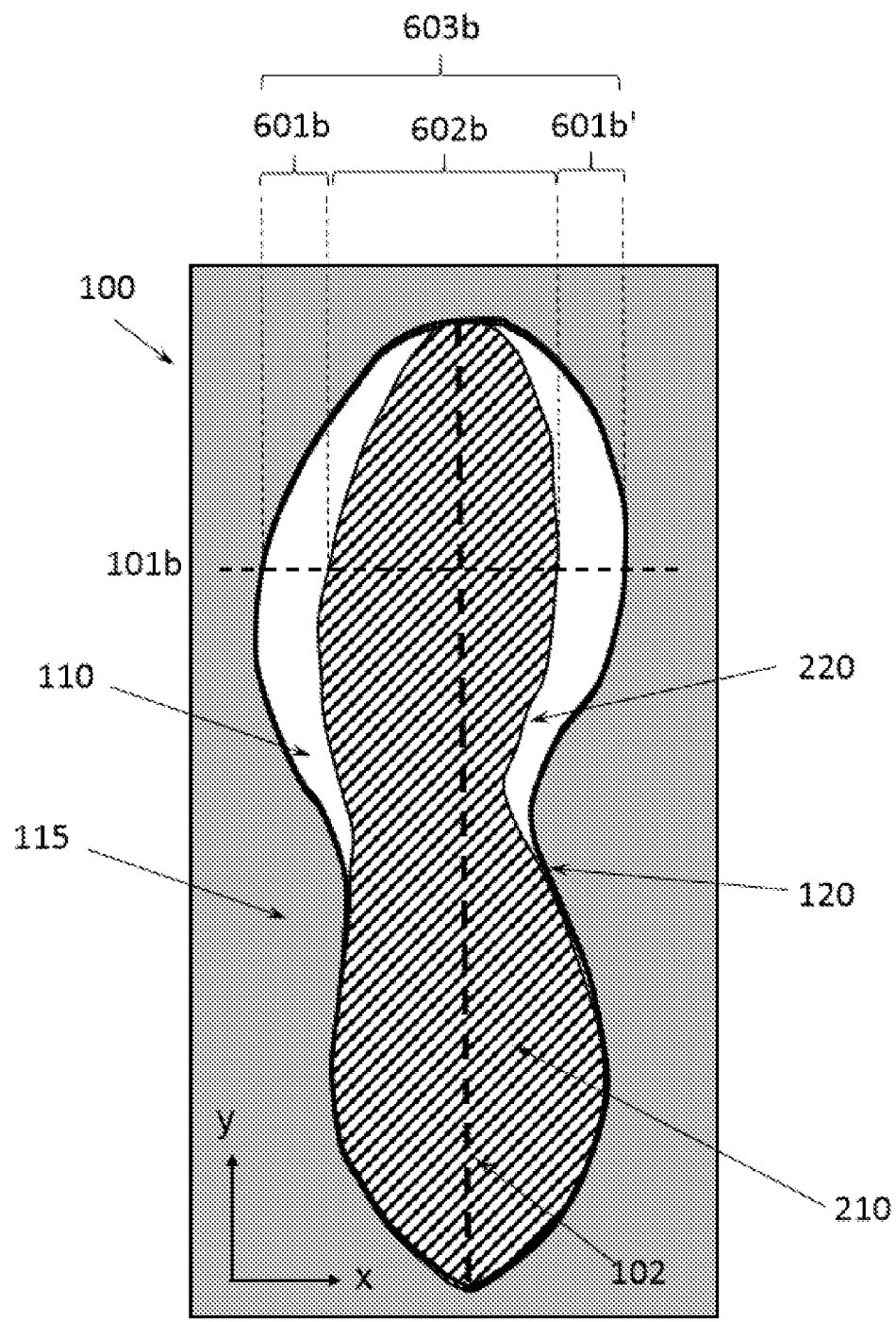

Referring to FIG. 5D, a top plan view width reference line 101*b* is shown at a particular position, $P_2$, along a longitudinal cavity dimension line 102. The longitudinal cavity dimension line 102 is parallel to the y-axis of the mold x-y plane as shown. As shown, the preform 210, prior to compression molding, has an initial preform width, $IPW_2$, 602*b* along the top plan view width reference line 101*b*. Further, as shown, the mold cavity 110 has mold cavity width, $CW_2$, 603*b* along the top plan view width reference line 101*b*. In this instance, the initial preform width, $IPW_2$, 602*b* is less than the mold cavity width, $CW_2$, 603*b* at the top plan view width reference line 101*a*. In FIG. 5O, the preform 210, prior to compression molding, is arranged in the mold cavity 110 such they are each co-aligned in the y-axis along the longitudinal cavity dimension line 102. That is, the preform 210, prior to compression molding, is approximately centered in the mold cavity 110 in the y-axis. As a result of the particular alignment of the preform 210, prior to compression molding, and the mold cavity 110, there exist two mold gaps, 601*b* and 601*b'*, along the top plan view width reference line 101*b* between the preform initial contoured perimeter 220 and the mold cavity contoured boundary 120 as shown. In some aspects, as shown, the mold gaps, 601*b* and 601*b'*, can have different dimensions. In other aspects, the mold gaps, 601*b* and 601*b'*, can be of equal dimensions. As shown in FIG. 5D, there are essentially no or negligible gaps between the foamed preform and the mold cavity contoured boundary 120 in the heel region of the foamed preform and the mold cavity.

In a further aspect, a plurality of mold gaps can exist between a foamed preform 210, prior to compression molding, and a mold cavity 110. That is, a plurality of initial preform widths comprise a number of individual initial preform width, such as $IPW_1$, $IPW_2$ ... $IPW_i$, where i is an integer less than 100, each associated with a particular position, $P_1$, $P_2$ ... $P_i$, along a longitudinal cavity dimension line 102. Corresponding to each individual initial preform width, such as $IPW_1$, $IPW_2$ ... $IPW_i$ is an associated individual cavity widths, such as $CW_1$, $CW_2$ ... $CW_j$, where j is an integer less than 100, each associated with a particular position, $P_1$, $P_2$ ... $P_i$, along a longitudinal cavity dimension line 102. The plurality of mold gaps comprise individual mold gaps, $MG_1$, $MG_2$ ... $MG_k$, where k is an integer less than 100, each associated with a particular position, $P_1$, $P_2$ ... $P_i$, along a longitudinal cavity dimension line 102. That is, each mold gap, $MG_k$, is obtained from the following equation:

$$MG_k = \frac{CW_j - IPW_i}{CW_j}$$

and wherein each mold gap is independently from about 0.1 to about 0.7. In a further aspect, each mold gap, $MG_k$, is independently about 0.125 to about 0.625, each mold gap, $MG_k$, is independently about 0.150 to about 0.625, each mold gap, $MG_k$, is independently about 0.200 to about 0.625, each mold gap, $MG_k$, is independently about 0.225 to about 0.625, each mold gap, $MG_k$, is independently about 0.250 to about 0.625, each mold gap, $MG_k$, is independently about 0.300 to about 0.625. each mold gap, $MG_k$, is independently about 0.325 to about 0.625, each mold gap, $MG_k$, is independently about 0.400 to about 0.625, each mold gap, $MG_k$, is independently about 0.500 to about 0.625, a value or combination of values within any of the foregoing ranges, or a sub-range of any of the foregoing ranges. In a still further aspect, the plurality of mold gaps comprise a mold gap, $MG_k$, having a value that is about equal to a value of a mold gap, $MG_{k+1}$, a value that is independently different from a value of a mold gap, $MG_{k+1}$, or combinations thereof. In a yet further aspect, the plurality of mold gaps comprise individual mold gaps that are independently different from one another, substantially equal to one another, or combinations thereof. In various aspects, each $MG_k$ can independently have a different value. In a further aspect, each $MG_k$ is about the same value.

In some instances, when the disclosed methods are used to prepare a midsole with anisotropic cell structure, that the mold gap can taper to essentially zero in regions proximal to the toe and heel area of the foamed preform and mold. That is, the mold gap is such that a limited portion (e.g., less than about 0.1 centimeter to about 1 centimeter) of the toe tip and the heel end of the preform contact the sides of the mold after the preform is placed in the mold.

In can be appreciated that the mold gap (MG) can be substantially around the entire perimeter of the preform. In some aspects, the mold gap (MG) that is substantially around the entire perimeter of the preform is about 0.1 centimeters, 0.2 centimeters, 0.3 centimeters, 0.4 centimeters, 0.5 centimeters, 0.6 centimeters, 0.7 centimeters, 0.8 centimeters, 0.9 centimeters, 1.0 centimeter; any combination of the foregoing gap values; or a range encompassed by any of the foregoing gap values. In a further aspect, the mold gap (MG) can be around about at least about 10 percent, 20 percent, 30 percent, 40 percent, 50 percent, 60 percent, 70 percent, 80 percent, or 90 percent of the perimeter of the preform. In a still further aspect, mold gap (MG) of about 0.5 cm can be around about at least about 10 percent, 20 percent, 30 percent, 40 percent, 50 percent, 60 percent, 70 percent, 80 percent, or 90 percent of the perimeter of the preform.

In other aspects, the gap is an internal gap as shown in FIG. 3G. That is, as shown in FIG. 3G, there can be a plurality of internal gaps located more or less uniformly within an x-y plane of a preform. Alternatively, the internal gaps can be located or clustered within a particular region of the x-y plane of the preform, e.g., clustered within the toe region or the heel region. It is understood that a single internal gap may be desired instead of a plurality of internal gaps. The one or more internal gaps can be associated with an internal gap volume, i.e., the gap is defined as having created a gap of a certain volume within the preform. The internal gap volume can be about at least about 0.1 cubic centimeters, 0.2 cubic centimeters, 0.3 cubic centimeters, 0.4 cubic centimeters, 0.5 cubic centimeters, 0.6 cubic centimeters, 0.7 cubic centimeters, 0.8 cubic centimeters, 0.9 cubic centimeters, 1.0 cubic centimeters; any combination of the foregoing internal gap volumes, or a range of internal gap volumes encompassed by any two of the foregoing internal gap volumes.

Figure 6A:
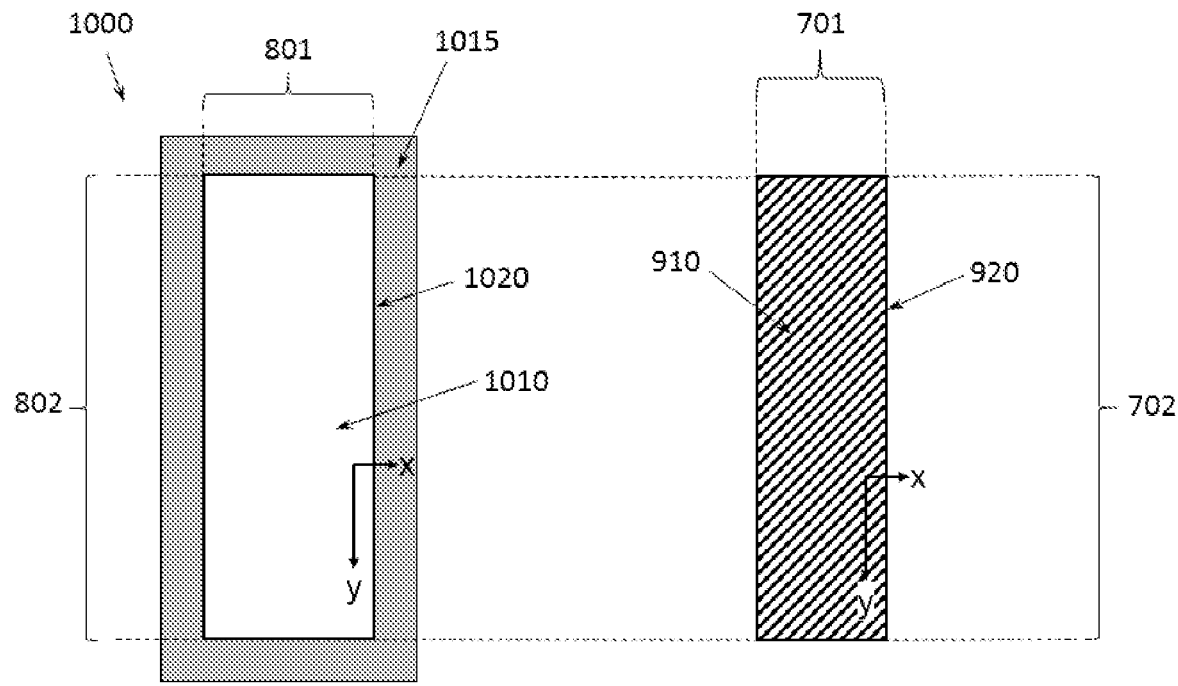
FIGS. 6A-6C are top plan views of a representative compression mold for an article with a rectangular shape, e.g., a sample plaque, in the top plan view with a regular gap width parallel to the y-axis with a foamed preform arranged therein prior to and after compression molding.
Figures 6B, 6C:
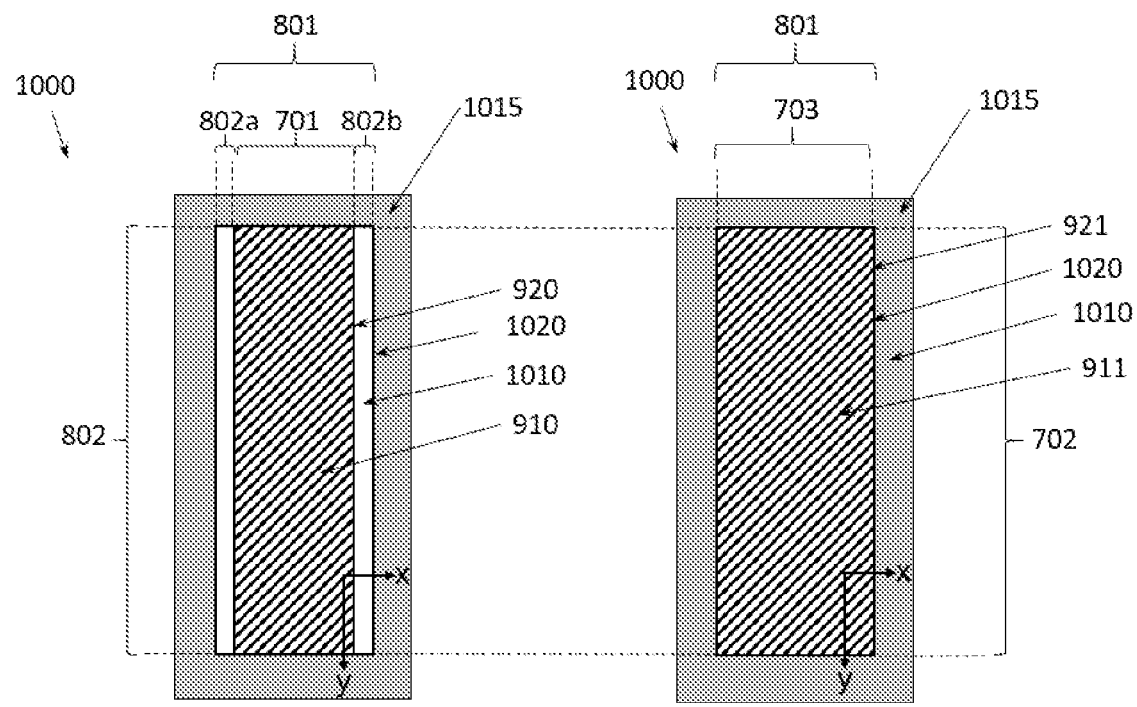

Referring now to FIGS. 6A and 6B, top plan views are provided of a compression mold 1000 and a foamed preform 910, e.g., a plaque mold and a plaque foamed preform, in the x-y plane. As shown in FIG. 6A, the preform 910, prior to compression molding, has a uniform initial preform width 701 and a uniform initial preform length 702. Further, as shown, the mold cavity 1010 has a uniform mold cavity width 801 and a uniform mold cavity length 802. The cavity 1010 is contained by a mold wall 1015. The foamed preform is associated with a preform initial contoured perimeter 920, and the mold cavity is associated with a mold cavity contoured boundary 1020. In FIG. 6B, the preform 910, prior to compression molding, is arranged in the mold cavity 1010 such they are each co-aligned in the y-axis along the longitudinal cavity dimension line 802. That is, the preform 910, prior to compression molding, is approximately centered in the mold cavity 1010 along the y-axis. As a result of the particular alignment of the preform 910, prior to compression molding, and the mold cavity 1010, there exist a uniform mold gap along the top plan view between the preform initial contoured perimeter 920 and the mold cavity contoured boundary 1020 as shown. In some aspects, as shown, the mold gaps, 802a and 802b, can have different dimensions. In other aspects, the mold gaps, 802a and 802b, can be of equal dimensions. Alternatively or additionally, the preform can include one or more apertures as described above (not illustrated). Alternatively or additionally, the preform can be a single piece of foam, or can be two or more separate pieces of foam, as described above (not illustrated). Referring to FIG. 6C, a top plan view is shown of the compression mold 1000 with a molded article 911 contained in the mold cavity 1010. The molded article 911 is associated with a molded article contoured perimeter 921 that is in contact or essentially in contact with the mold cavity contoured boundary 1020. As shown, the molded article width 703 of the molded article 911, after compression molding, is substantially the same as the mold cavity width 801.

In some examples, the compression molding process is conducted by heating the foam preform in a closed compression mold. The foam preform is heated to a temperature close to its softening temperature, to allow the foam to retain the shape of the compression mold. For example, the foam preform can be heated to a temperature within plus or minus 30 degrees Celsius of its softening temperature, or within plus or minus 20 degrees Celsius of its softening temperature, or within plus or minus 10 degrees Celsius of its softening temperature, or within plus or minus 5 degrees Celsius of its softening temperature. For example, the foam preform can be heated to a temperature of from about 100 degrees Celsius to about 250 degrees Celsius, from about 140 degrees Celsius to about 220 degrees Celsius, from about 100 degrees Celsius to about 180 degrees Celsius, from about 150 degrees Celsius to about 180 degrees Celsius, or from about 130 degrees Celsius to about 180 degrees Celsius The material used to form the compression mold can be any material which can withstand the temperatures used during the process, such as machined metals, including aluminum. The compression mold can be made using two pieces, such as a top and a bottom mold. Depending on the shape of the foam component to be molded, a multiple-piece mold may be used in order to more easily release the compression molded foam article from the mold.

The compression molding of the foam preform in the compression mold can result in a skin forming on the final compression molded foam component. However, care should be taken during the compression molding not to subject the foam preform to conditions such that more than a desired amount of the closed cell structures of the foam collapse. One way to avoid collapsing more than a desired amount of the closed cell structures is to control the temperature of the polymeric composition, for example, by controlling the temperature of the mold. For example, during the compression molding step, the heating of the foam preform in the compression mold can be conducted for time of from 100 seconds to 1,000 seconds, or of from 150 seconds to 700 seconds.

Once the foam preform has been heated in the compression mold at the appropriate temperature for the desired length of time to soften the preform to the desired level, the softened preform is cooled, for example, to a temperature at least 35 degrees Celsius below its softening temperature or below the highest temperature the preform reached in the closed mold (its maximum molding temperature), or at least 50 degrees Celsius below its softening or maximum molding temperature, or at least 80 degrees Celsius below its softening or maximum molding temperature, to re-solidify the softened foam or stabilize the molded foam, thereby forming the compression molded foam. Once cooled, the compression molded foam article is removed from the compression mold. Following the heating, the cooling of the molded foam in the compression mold can be conducted for a time of from 50 to 1,000 seconds, or for a time of from 100 to 400 seconds.

In various aspects, the disclosed methods directed to a compression molded foam article (e.g., articles used to make at least portions of footwear or athletic equipment) can further comprise a step of making a foamed preform. The foamed preform can be made using processes such as cutting the foam preform from foam sheet, or injection molding a foam material to form the foam preform, extruding a foam material to form the foam preform, expanding a material to form the foam perform, and the like.

In various aspects, a compression molded foam article can be a compression molded foam cushioning element, and can be used as a midsole component or as a midsole-outsole unit, e.g., a midsole component attached to a separate outsole if the foamed material used in the midsole is not suitable for use as a ground-contacting foam. Alternatively, a disclosed midsole component or midsole can be used can be used without an outsole if the foamed material of the side of the midsole that is configured to be ground-facing is suitable for use as a ground-contacting foam.

Also, a disclosed midsole or midsole component can be used as a core in a core-carrier midsole, or as a drop-in, i.e., in an article of footwear in which there is an outsole but there isn't a strobel separating the midsole from the foot cavity of the upper, and accordingly the midsole can be positioned into a cavity in the outsole through the foot cavity. For example, the present disclosure contemplates a sole assembly comprising a shell and an insert as generally described in U.S. Pat. No. 8,769,843, which is incorporated herein in its entirety. As such the shell, the insert, or both can be a compression molded foam article as described herein.

It is further contemplated herein, that when a disclosed midsole or midsole component is utilized in a core-carrier-type sole structure, optionally, the compression molding step of the method can be performed in the carrier. That is, instead of placing a foamed preform directly in contact with the bottom and sides of a mold cavity, a carrier can first be placed into the mold cavity and then the preform placed inside the carrier. Thus, in lieu of a mold gap there is a carrier gap between the inner sides of the carrier and the foamed preform. Accordingly, once the mold is closed (contacting the top of the preform), this variant of the disclosed methods compression molds the foamed preform to fill the carrier.

It may be desirable in some circumstances that the foamed preform used in the disclosed methods is aged. That is, following blowing of the foam, the foam is allowed to equilibrate at ambient temperature and pressure for a suitable period of time, e.g., about 12 hours to about 60 days. Without wishing to be bound by a particular theory, it is possible, for example, in circumstances such the foamed preform was prepared using a blowing agent that generated gas, aging the foam may allow some of the gas in the cells to partition out and other atmospheric gasses to partition in. Further, without wishing to be bound by a particular theory, it is possible, for example, that aging permits the pressure of the gas in the cells to partially dissipate. In certain aspects, the disclosed methods can further comprise subjecting the preform to an annealing step or a foam stabilization step or both prior to arranging the foam preform in the mold cavity. Similarly, in certain aspects, the disclosed methods can further comprise subjecting the compression molded foam article to an annealing step or a foam stabilization step or both.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Molded Foam Articles.

In various aspects, the disclosed molded foam articles exhibit anisotropic physical properties, such as energy return or stiffness. That is, the physical property can have a distinct property along one axis of the molded foam article compared to one or both of the other axes.

In some aspects, a physical property can be anisotropic in a disclosed molded foam article or a molded foam article made using the disclosed methods compared to the same physical property of a conventionally molded foam article having a closed cell structure having a substantially isotropic or isotropic closed cell foam structure. While molded foam articles formed from conventional methods may have satisfactory physical properties, the disclosed molded foam articles uniquely provide an anisotropic physical properties along one axis of the molded foam article compared to one or both of the other axes. In contrast, conventionally molded foam articles are characterized by properties that are generally isotropic along all three axes of the molded foam article.

In some aspects, the energy return of a disclosed molded foam article having anisotropic closed cell structure as disclosed herein or a molded foam article made using the disclosed methods can be can be greater than the energy return of the otherwise same molded foam article having a closed cell structure having a substantially isotropic or isotropic cell shape. While molded foam articles formed from conventional methods may have satisfactory stiffness, the disclosed molded foam articles uniquely provide an anisotropic energy return properties along one axis of the molded foam article compared to one or both of the other axes. In contrast, conventionally molded foam articles are characterized by energy return properties that are generally isotropic along all three axes of the molded foam article.

In some instances, the anisotropic physical property of a disclosed molded foam article can be changed, e.g., increased, compared to the preform within a particular portion of the molded foam article, e.g., within a region having a volume of at least 1 cubic centimeter, or at least 2 cubic centimeters, or at least 3 cubic centimeters; or at least 10 percent, 20 percent, 30 percent, 40 percent, or 50 percent of a total volume of the molded foam article. In a particular aspect, the anisotropic physical property is changed in the molded foam article compared to the preform within a within a region having a volume of at least 1 cubic centimeter.

It is known that molded foam articles, e.g., a compression molded foam article, can be associated with a skin localized to the portions of the molded article that are in direct contact with the mold wall. Such a skin has substantially no closed cell foam structure. In various aspects, disclosed molded foam articles have an anisotropic physical property in the non-skin portions of the molded foam article, e.g., a distance of about 0.1 millimeters to about 2 millimeters from the outside surface of the molded foam article. In some aspects, disclosed molded foam articles have an anisotropic physical property in the non-skin portions of the molded foam article a distance of about 1 millimeters from the outside surface of the molded foam article.

In various aspects, the disclosed molded foam articles and molded foam articles prepared by the disclosed methods can exhibit a difference along a first axis, e.g., the z-axis, compared to the same physical property determined along a second axis and/or a third axis, e.g., the x-axis and y-axis, respectively. In a further aspect, the difference in the physical property along the first axis can differ from the same physical property along the second axis and/or third axis by at least about 5 percent, 10 percent, 15 percent, or 20 percent.

The disclosed molded foam articles and molded foam articles prepared by the disclosed methods can exhibit a beneficial energy return, e.g., an energy return in the z-axis such as the energy return for a midsole component along a z-axis oriented as shown in FIG. 1A. In various aspects, the disclosed molded foam articles exhibit an energy return, when determined in accordance with Efficiency Test Method, in the z-axis of greater than about 60 percent, about 65 percent, about 70 percent, about 75 percent, about 80 percent, greater than about 82 percent, greater than about 84 percent, greater than about 86 percent, greater than about 88 percent, or greater than about 92 percent. In a further aspect, the disclosed molded foam articles exhibit an energy return, when determined in accordance with test referred to herein throughout as the Efficiency Test Method, in the z-axis of from about 80 percent to about 92 percent, of from about 82 percent to about 92 percent, of from about 84 percent to about 92 percent, of from about 86 percent to about 92 percent, of from about 88 percent to about 92 percent, a value or set of values within any of the foregoing ranges, or a sub-range of any of the foregoing ranges.

In various aspects, the disclosed molded foam articles and molded foam articles prepared by the disclosed methods can exhibit an energy return in the z-axis that is about 4 percent to about 100 percent higher than a reference foam article, wherein the reference foam article is a foam article having a substantially same density as the foam article; and wherein the reference foam article has a closed cell structure that is substantially isotropic.

In various aspects, the disclosed molded foam articles and molded foam articles prepared by the disclosed methods can exhibit an energy return in the z-axis that is about 4 percent to about 150 percent greater than the energy return in the x-axis and/or y-axis of the molded foam article.

In various aspects, the stiffness of the molded foam article can be less than the stiffness of a similar molded foam article comprising a plurality of cells having a substantially isotropic or isotropic cell shape.

The molded foam articles described herein can exhibit a beneficial stiffness, for example a stiffness for a midsole component along a z-axis oriented as shown in FIG. 1A. The stiffness can be measured as described herein. In some aspects, the disclosed molded foam article can have a stiffness value, when determined in accordance with Efficiency Test Method, in the z-axis of the molded foam article from about 300 kilopascals to about 2000 kilopascals, about 300 kilopascals to about 600 kilopascals, about 300 kilopascals to about 550 kilopascals, about 300 kilopascals to about 400 kilopascals, a value or group values within any of the foregoing ranges, or a sub-range of any of the foregoing ranges.

In a further aspect, the disclosed molded foam articles can be associated with additional physical properties. For example, split tear is an important physical property for a foam used as a cushioning element, such as in a component of an article of footwear or athletic equipment. In some aspects, the molded foam article can have a split tear value of from about 4.0 kilograms per centimeter to 10 kilograms per centimeter, from about 1.0 kilograms per centimeter to 4.5 kilograms per centimeter, about 1.6 kilograms per centimeter to 4.0 kilograms per centimeter, about 2.0 kilograms per centimeter to 4.0 kilograms per centimeter, about 2.0 kilograms per centimeter to 3.5 kilograms per centimeter, or about 2.5 kilograms per centimeter to 3.5 kilograms per centimeter. The split tear can be measured as described in the examples below. In some aspects, the molded foam article can have a split tear of about 0.08 kilograms per centimeter to 4.0 kilograms per centimeter, about 0.9 kilograms per centimeter to 3.0 kilograms per centimeter, about 1.0 to 2.0 kilograms per centimeter, about 1.0 kilograms per centimeter to 1.5 kilograms per centimeter, or about 2 kilograms per centimeter. In some aspects, the molded foam article can have a split tear of about 0.07 kilograms per centimeter to 2.0 kilograms per centimeter, or about 0.8 kilograms per centimeter to 1.5 kilograms per centimeter, or about 0.9 kilograms per centimeter to 1.2 kilograms per centimeter, about 1.5 kilograms per centimeter to 2.2 kilograms per centimeter.

Split tear for foam preforms and molded foam articles can be measured using ASTM D3574-95. Although this method is directed to bonded and molded urethane foams, it can be used on any foam material in accordance with the present disclosure. A sample of foam having a thickness of 10 millimeter plus or minus 1 millimeter is used. If the foam preform or molded foam article has an outer skin, the outer skin should not be present on the test sample. A 3 centimeter long cut is placed in the center of one end of the specimen, and marked in five successive 2 centimeter portions along the edge of the sample. The sample is tested as described in ASTM D3574-95.

In various aspects, the disclosed molded foam articles and molded foam articles made using the disclosed methods have an article density of from about 0.10 grams per cubic centimeter to about 0.35 grams per cubic centimeter, from about 0.11 grams per cubic centimeter to about 0.12 grams per cubic centimeter, or from about 0.10 grams per cubic centimeter to about 0.12 grams per cubic centimeter, from about 0.15 grams per cubic centimeter to about 0.20 grams per cubic centimeter; from about 0.15 grams per cubic centimeter to about 0.30 grams per cubic centimeter; a combination of the foregoing values; a value within the foregoing value; or a sub-range within the foregoing ranges.

Durometer is another important physical property of a foam. In accordance with the present disclosure, the molded foam article has a durometer of at least 20 Asker C, or at least 30 Asker C, or at least 40 Asker C, or at least 50 Asker C For example, the durometer of the molded foam article can be from 20 Asker C to 70 Asker C, or from 20 Asker C to 40 Asker C, or from 30 Asker C to 35 Asker C, or from 25 Asker C to 65 Asker C, or from 30 Asker C to 50 Asker C, or from 40 Asker C to 70 Asker C, or from 35 Asker C to 55 Asker C, or from 50 Asker C to 65 Asker C The foam preform can have a durometer of less than 40 Asker C, or less than 30 Asker C, or less than 20 Asker C. For example, the durometer of the foam preform can be from 15 Asker C to 50 Asker C, or from 20 Asker C to 50 Asker C, or from 20 Asker C to 40 Asker C, or from 20 Asker C to 30 Asker C. The durometer is measured on a flat area of foam, e.g., at least 6 millimeter thick, using an Asker C durometer.

Another physical property of the disclosed molded foam articles is its 300 percent elongation. The molded foam article can have an elongation of at least 125 kilograms per centimeter, or at least 150 kilograms per centimeter.

In various aspects, the disclosed molded foam articles comprise a closed cell foam structure. In a further aspect, the disclosed methods for forming the disclosed molded foam articles comprise a step of arranging a foamed preform in a compression mold. The preform arranged in the compression mold preform has a closed cell foam structure.

Polymeric Materials.

As such, the disclosed molded foam articles and the preform used in the disclosed methods of making comprise molded foam article comprise one or more polymers which have been foamed. In some aspects, the one or more polymers can be one or more elastomeric polymers. In further aspects, the one or more polymers can be one or more thermoplastic polymers. In still further aspects, the one or more polymers can be one or more thermoplastic elastomeric polymers. In yet further aspects, the one or more polymers can be one or more cross-linked polymers.

In various aspects, the polymer can be a polyolefin polymer, e.g., an ethylene-vinyl-acetate (EVA) polymer. The polyolefin polymer can be a polymer comprising styrene repeating units and non-styrenic repeating units; a $C_4$-$C_{100}$ unsaturated olefin; an ethylene vinyl acetate copolymer; an olefin block copolymer; and mixtures thereof. In some aspects, a polyolefin polymer is an A-B-A block copolymer, wherein each of the A blocks have styrenic repeat units, the B block is a random copolymer of ethylene and a first alpha-olefin having 3 to 8 carbon atoms (e.g. 3, 4, 5, 6, 7, or 8 carbon atoms), and wherein the A-B-A-block copolymer includes about 10 percent to 50 percent, about 10 percent to 40 percent, about 15 percent to 40 percent, or about 15 percent to 30 percent of the A blocks by weight based upon an entire weight of the A-B-A block copolymer; an olefinic block copolymer, wherein the olefinic block copolymer is a copolymer of ethylene and a second alpha-olefin having about 4 to 14, about 6 to 12, or about 6 to 10 carbon atoms, and wherein the olefinic block copolymer has one or more blocks rich in the ethylene and one or more blocks rich in the second alpha-olefin; and an ethylene-vinyl acetate copolymer.

Elastomeric ethylene-vinyl acetate copolymers can be prepared by free-radical emulsion polymerization of ethylene and up to about 50 percent by weight vinyl acetate. The vinyl acetate monomer is usually at least about 10 percent by weight, preferably at least about 25 percent by weight of the monomers used. The ethylene-vinyl acetate copolymer has a vinyl acetate content of preferably from about 25 weight percent to about 50 weight percent and more preferably from about 35 weight percent to about 50 weight percent. The ethylene-vinyl acetate (EVA) copolymer can have a vinyl acetate content of about 5 percent to 55 percent, about 5 percent to 50 percent, about 10 percent to 50 percent, about 10 percent to 45 percent, or about 15 percent to 40 percent by weight based upon the weight of the ethylene-vinyl acetate copolymer. The ethylene-vinyl acetate copolymers may have a melt flow index of from about 0.5 to about 50 grams/10 min. (at 190 degrees C., 2.16 kg), preferably 2.5 to 10 grams/10 min. (at 190 degrees C., 2.16 kg) as measured using the procedure of ASTM D1238. Nonlimiting examples of suitable commercially available ethylene-vinyl acetate copolymers include ELVAX 265, ELVAX 40L-3 from DuPont (Midland, Mich., USA) and LAVAPRENE 400 from Langxess (Cologne, Germany). The ethylene-vinyl acetate copolymers may be used in combination. In some aspects, the EVA may be formed of a combination of high melt index and low melt index material. For example, the EVA may have a melt index between approximately 1 and approximately 50.

In further aspects, the polyolefin polymers can be homopolymers of vinyl esters and olefin-vinyl ester copolymers, such as polyvinyl acetate, ethylene-vinyl acetatecopolymers and propylene-vinyl acetate copolymers, may be used as the vinyl ester polymer.

In various aspects, the polymer can be a block copolymer comprising a first block and a third block, each independently comprising a linear or branched chain aliphatic polymer having a plurality of aromatic groups attached pendantly thereto, a second block located between the first block and the third block and comprising an aliphatic polymer having a plurality of aliphatic side chains attached thereto, and a plurality of first ethylenically unsaturated group present on one or more of the first block, second block, and third block; wherein the block copolymer comprises about 60 percent to about 90 percent of the second blocks by weight based upon the weight of the block copolymer; an olefinic copolymer comprising a plurality of first olefinic segments and a plurality of second olefinic segments having a different chemical structure from the first olefinic segments; one or more linking polymers, each linking polymer comprising one or more third olefinic segments; and an ethylene-vinyl acetate (EVA) copolymer; wherein a sum of a ratio I, II, III, IV, and V is from about 1.00 to about 10.00; wherein the ratio I is a ratio of a total parts by weight of the olefinic copolymers present in the composition to a total parts by weight of the block copolymer present in the composition; wherein the ratio II is a ratio of a total parts by weight of the linking polymers present in the composition to a total parts by weight of the block copolymer present in the composition; wherein the ratio III is ratio of a total parts by weight of the EVA copolymers present in the composition to a total parts by weight of the block copolymer present in the composition; wherein the ratio IV is a ratio of the total parts by weight of the linking polymers present in the composition to a total parts by weight of the block copolymers present in the composition, and wherein the ratio V is a ratio of the total parts by weight of the one or more EVA copolymers present in the composition to a total parts by weight of the one or more olefinic copolymers present in the composition.

In various aspects, the polymer can be a block copolymer comprising a first block and a third block, each independently comprising a linear or branched chain aliphatic polymer having a plurality of aromatic groups attached pendantly thereto, a second block located between the first block and the third block and comprising an aliphatic polymer having a plurality of aliphatic side chains attached thereto, and a plurality of first ethylenically unsaturated group present on one or more of the first block, second block, and third block; wherein the block copolymer comprises about 60 percent to about 90 percent of the second blocks by weight based upon the weight of the block copolymer; an olefinic copolymer comprising a plurality of first olefinic segments and a plurality of second olefinic segments having a different chemical structure from the first olefinic segments; and one or more linking polymers, each linking polymer comprising one or more third olefinic segments.

In various aspects, the polymer can be a composition comprising an A-B-A block copolymer, wherein each of the A blocks comprise styrenic repeat units, the B block is a random copolymer of ethylene and an alpha-olefin having about 3 to 8 carbon atoms, and wherein the A-B-A-block copolymer comprises about 10 percent to about 40 percent of the A blocks by weight based upon the weight of the A-B-A block copolymer; an olefinic block copolymer, wherein the olefinic block copolymer is a copolymer of ethylene and an alpha-olefin having about 6 to 12 carbon atoms, and wherein the olefinic block copolymer has one or more blocks rich in the ethylene and one or more blocks rich in the alpha-olefin; an alpha-olefin linking polymer, wherein the alpha-olefin linking polymer is a copolymer of ethylene and an alpha-olefin having about 3 to 8 carbon atoms, and wherein the alpha-olefin linking polymer has an alpha-olefin monomer content of about 15 percent to about 40 percent by weight based upon the weight of the alpha-olefin linking polymer; and an ethylene-vinyl acetate copolymer having a vinyl acetate content of about 10 percent to about 40 percent by weight based upon the weight of the ethylene-vinyl acetate copolymer.

In various aspects, the polymer can be a composition comprising a partially hydrogenated thermoplastic elastomeric block copolymer, the partially hydrogenated thermoplastic elastomeric block copolymer comprising: one or more A blocks comprising aromatic repeat units, one or more B blocks comprising aliphatic repeat units, and one or more first ethylenically unsaturated groups present on one or both of the aromatic repeat units and the aliphatic repeat units; an olefinic block copolymer, wherein the olefinic block copolymer is a copolymer of a first alpha-olefin and a second alpha-olefin different from the first alpha-olefin, and wherein the olefinic block copolymer comprising one or more second ethylenically unsaturated groups; an alpha-olefin linking polymer, wherein the alpha-olefin linking polymer comprises one or more aliphatic sidechains; and an ethylene-vinyl acetate copolymer; wherein a sum of a ratio I, II, III, IV, and V is from about 1.00 to about 10.00; wherein the ratio I is a ratio of a total parts by weight of the olefinic copolymers present in the composition to a total parts by weight of the partially hydrogenated thermoplastic elastomeric block copolymer present in the composition; wherein the ratio II is a ratio of a total parts by weight of the alpha-olefin linking polymers present in the composition to a total parts by weight of the partially hydrogenated thermoplastic elastomeric block copolymer present in the composition; wherein the ratio III is ratio of a total parts by weight of the ethylene-vinyl acetate copolymers present in the composition to a total parts by weight of the partially hydrogenated thermoplastic elastomeric block copolymer present in the composition; wherein the ratio IV is a ratio of the total parts by weight of the alpha-olefin linking polymers present in the composition to a total parts by weight of the partially hydrogenated thermoplastic elastomeric block copolymer present in the composition, and wherein the ratio V is a ratio of the total parts by weight of the one or more ethylene-vinyl acetate copolymers present in the composition to a total parts by weight of the one or more olefinic copolymers present in the composition.

In various aspects, the polymer can be a composition comprising: a partially hydrogenated thermoplastic elastomeric block copolymer, the partially hydrogenated thermoplastic elastomeric block copolymer comprising: one or more A blocks comprising aromatic repeat units, one or more B blocks comprising aliphatic repeat units, and one or more first ethylenically unsaturated groups present on one or both of the aromatic repeat units and the aliphatic repeat units; an olefinic block copolymer, wherein the olefinic block copolymer is a copolymer of a first alpha-olefin and a second alpha-olefin different from the first alpha-olefin, and wherein the olefinic block copolymer comprising one or more second ethylenically unsaturated groups; an alpha-olefin linking polymer, wherein the alpha-olefin linking polymer comprises one or more aliphatic sidechains; and an ethylene-vinyl acetate copolymer.

In various aspects, the polymer can be a composition comprising one or more partially hydrogenated thermoplastic elastomeric block copolymers, each of the one or more partially hydrogenated thermoplastic elastomeric block copolymers independently comprising one or more aromatic blocks, one or more aliphatic blocks, and one or more first ethylenically unsaturated units; one or more olefinic block copolymers, each of the one or more olefinic block copolymers comprising second ethylenically unsaturated units; one or more alpha-olefin linking polymers; and one or more ethylene-vinyl acetate copolymers; wherein a sum of a ratio I, II, III, IV, and V is from about 1.00 to about 10.00; wherein the ratio I is a ratio of a total parts by weight of the olefinic block copolymers present in the composition to a total parts by weight of the partially hydrogenated thermoplastic elastomeric block copolymer present in the composition; wherein the ratio II is a ratio of a total parts by weight of the alpha-olefin linking polymers present in the composition to a total parts by weight of the partially hydrogenated thermoplastic elastomeric block copolymer present in the composition; wherein the ratio III is ratio of a total parts by weight of the ethylene-vinyl acetate copolymers present in the composition to a total parts by weight of the partially hydrogenated thermoplastic elastomeric block copolymer present in the composition; wherein the ratio IV is a ratio of the total parts by weight of the alpha-olefin linking polymers present in the composition to a total parts by weight of the partially hydrogenated thermoplastic elastomeric block copolymer present in the composition, and wherein the ratio V is a ratio of the total parts by weight of the one or more ethylene-vinyl acetate copolymers present in the composition to a total parts by weight of the one or more olefinic copolymers present in the composition.

In various aspects, the polymer can be a composition comprising one or more partially hydrogenated thermoplastic elastomeric block copolymers, each of the one or more partially hydrogenated thermoplastic elastomeric block copolymers independently comprising one or more aromatic blocks, one or more aliphatic blocks, and one or more first ethylenically unsaturated units; one or more olefinic block copolymers, each of the one or more olefinic block copolymers comprising second ethylenically unsaturated units; one or more alpha-olefin linking copolymers; and one or more ethylene-vinyl acetate copolymers.

In various aspects, the polymer can be a one or more thermoplastic copolyester elastomers. The thermoplastic copolyester elastomers can include chain units derived from one or more olefins and chain units derived from one or more ethylenically-unsaturated acid groups. The compositions can also include a plurality of cations ionically cross-linking anionic forms of the acid groups in the thermoplastic copolyester elastomers. In some aspects, the thermoplastic copolyester elastomers can have a melt flow index of about 30 or less, about 20 or less, about 15 or less, about 10 or less, or about 5 or less.

In some aspects, the thermoplastic copolyester elastomers are terpolymers of ethylene, acrylic acid, and methyl acrylate or butyl acrylate. In some aspects, a ratio III of a total parts by weight of the acrylic acid in the thermoplastic copolyester elastomers to a total weight of the thermoplastic copolyester elastomers is about 0.05 to about 0.6, about 0.1 to about 0.6, about 0.1 to about 0.5, about 0.15 to about 0.5, or about 0.2 to about 0.5.

The thermoplastic copolyester elastomer can comprise: (a) a plurality of first segments, each first segment derived from a dihydroxy-terminated polydiol; (b) a plurality of second segments, each second segment derived from a diol; and (c) a plurality of third segments, each third segment derived from an aromatic dicarboxylic acid. In various aspects, the thermoplastic copolyester elastomer is a block copolymer. In some aspects, the thermoplastic copolyester elastomer is a segmented copolymer. In further aspects, the thermoplastic copolyester elastomer is a random copolymer. In still further aspects, the thermoplastic copolyester elastomer is a condensation copolymer.

In a further aspect, the thermoplastic copolyester elastomer can have a weight average molecular weight of about 50,000 Daltons to about 1,000,000 Daltons; about 50,000 Daltons to about 500,000 Daltons; about 75,000 Daltons to about 300,000 Daltons; about 100,000 Daltons to about 200,000 Daltons; or a value or values of weight average molecular weight within any of the foregoing ranges or a weight average molecular weight range encompassing any sub-range of the foregoing ranges.

In a further aspect, the thermoplastic copolyester elastomer can have a ratio of first segments to third segments from about 1:1 to about 1:5 based on the weight of each of the first segments and the third segments; about 1:1 to about 1:3 based on the weight of each of the first segments and the third segments; about 1:1 to about 1:2 based on the weight of each of the first segments and the third segments; about 1:1 to about 1:3 based on the weight of each of the first segments and the third segments; or a value or values of have a ratio of first segments to third segments within any of the foregoing ranges or a have a range of ratio of first segments to third segments encompassing any sub-range of the foregoing ranges.

In a further aspect, the thermoplastic copolyester elastomer can a ratio of second segments to third segments from about 1:1 to about 1:2 based on the weight of each of the first segments and the third segments; about 1:1 to about 1:1.52 based on the weight of each of the first segments and the third segment; or a value or values of have a ratio of second segments to third segments within any of the foregoing ranges or a have a range of ratio of second segments to third segments encompassing any sub-range of the foregoing ranges.

In a further aspect, the thermoplastic copolyester elastomer can have first segments derived from a poly(alkylene oxide)diol having a number-average molecular weight of about 250 Daltons to about 6000 Daltons; about 400 Daltons to about 6,000 Daltons; about 350 Daltons to about 5,000 Daltons; about 500 Daltons to about 3,000 Daltons; or a value or values of weight average molecular weight within any of the foregoing ranges or a weight average molecular weight range encompassing any sub-range of the foregoing ranges.

In a further aspect, the thermoplastic copolyester elastomer can have first segments derived from a poly(alkylene oxide)diol such as poly(ethylene ether)diol; poly(propylene ether)diol; poly(tetramethylene ether)diol; poly(pentamethylene ether)diol; poly(hexamethylene ether)diol; poly(heptamethylene ether)diol; poly(octamethylene ether)diol; poly(nonamethylene ether)diol; poly(decamethylene ether)diol; or mixtures thereof. In a still further aspect, the thermoplastic copolyester elastomer can have first segments derived from a poly(alkylene oxide)diol such as poly(ethylene ether)diol; poly(propylene ether)diol; poly(tetramethylene ether)diol; poly(pentamethylene ether)diol; poly(hexamethylene ether)diol. In a yet further aspect, the thermoplastic copolyester elastomer can have first segments derived from a poly(tetramethylene ether)diol.

In a further aspect, the thermoplastic copolyester elastomer can have second segments derived from a diol having a molecular weight of less than about 250. The diol from which the second segments are derived can be a C2-C8 diol. In a still further aspect, the second segments can be derived from ethanediol; propanediol; butanediol; pentanediol; 2-methyl propanediol; 2,2-dimethyl propanediol; hexanediol; 1,2-dihydroxy cyclohexane; 1,3-dihydroxy cyclohexane; 1,4-dihydroxy cyclohexane; and mixtures thereof. In a yet further aspect, the second segments can be derived from 1,2-ethanediol, 1,3-propanediol, 1,4-butanediol, 1,6-hexanediol, and mixtures thereof. In an even further aspect, the second segments can be derived from 1,2-ethanediol. In a still further aspect, the second segments can be derived from 1,4-butanediol.

In a further aspect, the thermoplastic copolyester elastomer can have third segments derived from an aromatic C5-C16 dicarboxylic acid. The aromatic C5-C16 dicarboxylic acid can have a molecular weight less than about 300 Daltons; about 120 Daltons to about 200 Daltons; or a value or values of molecular weight within any of the foregoing ranges or a molecular weight range encompassing any sub-range of the foregoing ranges. In some instances, the aromatic C5-C16 dicarboxylic acid is terephthalic acid, phthalic acid, isophthalic acid, or a derivative thereof. In a still further aspect, the aromatic C5-C16 dicarboxylic acid is a diester derivative of the terephthalic acid, phthalic acid, or isophthalic acid. In a yet further aspect, the aromatic C5-C16 dicarboxylic acid is terephthalic acid or the dimethyl ester derivative thereof.

In some aspects, the thermoplastic copolyester elastomer used can comprise: (a) a plurality of first segments, each first segment derived from a dihydroxy-terminated polydiol; (b) a plurality of second segments, each second segment derived from a diol; and (c) a plurality of third segments, each third segment derived from an aromatic dicarboxylic acid.

In a further aspect, the thermoplastic copolyester elastomer used can comprise: (a) a plurality of first copolyester units, each first copolyester unit of the plurality comprising the first segment derived from a dihydroxy-terminated polydiol and the third segment derived from an aromatic dicarboxylic acid, wherein the first copolyester unit has a structure represented by a formula:

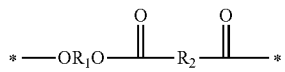

wherein $R_1$ is a group remaining after removal of terminal hydroxyl groups from the poly(alkylene oxide) diol of the first segment, wherein the poly(alkylene oxide) diol of the first segment is a poly(alkylene oxide) diol having a number-average molecular weight of about 400 to about 6000; and wherein $R_2$ is a group remaining after removal of carboxyl groups from the aromatic dicarboxylic acid of the third segment; and (b) a plurality of second copolyester units, each second copolyester unit of the plurality comprising the second segment derived from a diol and the third segment derived from an aromatic dicarboxylic acid, wherein the second copolyester unit has a structure represented by a formula:

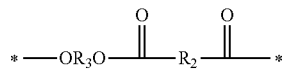

wherein $R_3$ is a group remaining after removal of hydroxyl groups from the diol of the second segment derived from a diol, wherein the diol is a diol having a molecular weight of less than about 250; and wherein $R_2$ is the group remaining after removal of carboxyl groups from the aromatic dicarboxylic acid of the third segment.

In some aspects, the first copolyester unit has a structure represented by a formula:

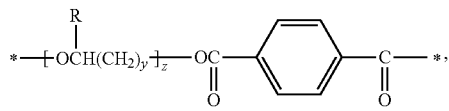

wherein R is H or methyl; wherein y is an integer having a value from 1 to 10; wherein z is an integer having a value from 2 to 60; and wherein a weight average molecular weight of each of the plurality of first copolyester units is from about 300 Daltons to about 7,000 Daltons. In the foregoing, y can an integer having a value of 1, 2, 3, 4, or 5. In some aspects, in the foregoing, R is hydrogen; R is methyl; R is hydrogen and y is an integer having a value of 1, 2, or 3; or R is methyl and y is an integer having a value of 1.

In some aspects, the first copolyester unit has a structure represented by a formula:

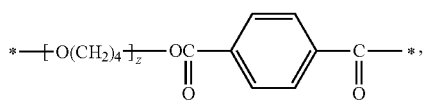

wherein z is an integer having a value from 2 to 60; and wherein a weight average molecular weight of each of the plurality of first copolyester units is from about 300 Daltons to about 7,000 Daltons. In the foregoing, z can be an integer having a value from 5 to 60. In some aspects, the weight average molecular weight of each of the plurality of first copolyester units is from about 400 Daltons to about 6,000 Daltons.

In some aspects, the second copolyester unit has a structure represented by a formula:

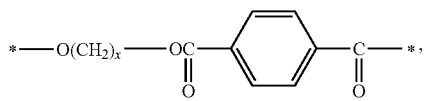

wherein x is an integer having a value from 1 to 20. In some aspects, x is an integer having a value from 2 to 18.

In various aspects, the thermoplastic copolyester elastomer comprises about 30 weight percent to about 80 weight percent of the plurality of first copolyester units based on total weight of the thermoplastic copolyester elastomer; or in alternative aspects, about 40 weight percent to about 65 weight percent of the plurality of second copolyester units based on total weight of the thermoplastic copolyester elastomer.

In an aspect, the thermoplastic copolyester elastomer has a ratio of first segments to third segments from about 1:1 to about 1:5 based on the weight of each of the first segments and the third segments; or wherein the thermoplastic copolyester elastomer has a ratio of second segments to third segments from about 1:1 to about 1:3 based on the weight of each of the first segments and the third segments.

In various aspects, the polymer can be a polyurethane elastomers, polyurea elastomers, polyamide elastomers (PEBA or polyether block polyamides), polyester elastomers, metallocene-catalyzed block copolymers of ethylene and α-olefins having 4 to about 8 carbon atoms, styrene block copolymers such as poly(styrene-butadiene-styrene), poly(styrene-ethylene-co-butylene-styrene), and poly(styrene-isoprene-styrene), and combinations thereof.

Polyurethane may be selected from polyester-polyurethanes, polyether-polyurethanes, and polycarbonate-polyurethanes, including, without limitation, polyurethanes polymerized using as polymeric diol reactants polyethers and polyesters including polycaprolactone polyesters. These polymeric diol-based polyurethanes are prepared by reaction of the polymeric diol (polyester diol, polyether diol, polycaprolactone diol, polytetrahydrofuran diol, or polycarbonate diol), one or more polyisocyanates, and, optionally, one or more chain extension compounds. Chain extension compounds, as the term is being used, are compounds having two or more functional groups reactive with isocyanate groups, such as the diols, amino alcohols, and diamines. Preferably the polymeric diol-based polyurethane is substantially linear (i.e., substantially all of the reactants are difunctional).

Diisocyanates used in making the polyurethane may be aromatic or aliphatic. Useful diisocyanate compounds used to prepare thermoplastic polyurethanes include, without limitation, isophorone diisocyanate (IPDI), methylene bis-4-cyclohexyl isocyanate ($H_{12}$MDI), cyclohexyl diisocyanate (CHDI), m-tetramethyl xylene diisocyanate (m-TMXDI), p-tetramethyl xylene diisocyanate (p-TMXDI), 4,4'-methylene diphenyl diisocyanate (MDI, also known as 4,4'-diphenylmethane diisocyanate), 2,4- or 2,6-toluene diisocyanate (TDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, meta-xylylenediioscyanate and para-xylylenediisocyanate, 4-chloro-1,3-phenylene diisocyanate, 1,5-tetrahydro-naphthalene diisocyanate, 4,4'-dibenzyl diisocyanate, and xylylene diisocyanate (XDI), and combinations of these. Nonlimiting examples of higher-functionality polyisocyanates that may be used in limited amounts to produce branched thermoplastic polyurethanes (optionally along with monofunctional alcohols or monofunctional isocyanates) include 1,2,4-benzene triisocyanate, 1,3,6-hexamethylene triisocyanate, 1,6,11-undecane triisocyanate, bicycloheptane triisocyanate, triphenylmethane-4,4',4''-triisocyanate, isocyanurates of diisocyanates, biurets of diisocyanates, allophanates of diisocyanates, and the like.

Nonlimiting examples of suitable diols that may be used as extenders include ethylene glycol and lower oligomers of ethylene glycol including diethylene glycol, triethylene glycol and tetraethylene glycol; propylene glycol and lower oligomers of propylene glycol including dipropylene glycol, tripropylene glycol and tetrapropylene glycol; cyclohexanedimethanol, 1,6-hexanediol, 2-ethyl-1,6-hexanediol, 1,4-butanediol, 2,3-butanediol, 1,5-pentanediol, 1,3-propanediol, butylene glycol, neopentyl glycol, dihydroxyalkylated aromatic compounds such as the bis (2-hydroxyethyl) ethers of hydroquinone and resorcinol; p-xylene-α,α'-diol; the bis (2-hydroxyethyl) ether of p-xylene-α,α'-diol; m-xylene-α,α'-diol and combinations of these. Thermoplastic polyurethanes may be made using small amounts of triols or higher functionality polyols, such as trimethylolpropane or pentaerythritol, optionally along with monomeric alcohols such as C2-C8 monools or monoisocyanates such as butyl isocyanate.

Useful active hydrogen-containing chain extension agents generally contain at least two active hydrogen groups, for example, diols, dithiols, diamines, or compounds having a mixture of hydroxyl, thiol, and amine groups, such as alkanolamines, aminoalkyl mercaptans, and hydroxyalkyl mercaptans, among others. The molecular weight of the chain extenders preferably range from about 60 to about 400. Alcohols and amines are preferred. Examples of useful diols include those diols already mentioned. Suitable diamine extenders include, without limitation, ethylene diamine, diethylene triamine, triethylene tetraamine, and combinations of these. Other typical chain extenders are amino alcohols such as ethanolamine, propanolamine, butanolamine, and combinations of these. The dithiol and diamine reactants may also be included in preparing polyurethanes that are not elastomeric.

In addition to difunctional extenders, a small amount of a trifunctional extender such as trimethylolpropane, 1,2,6-hexanetriol and glycerol, or monofunctional active hydrogen compounds such as butanol or dimethyl amine, may also be present. The amount of trifunctional extender or monofunctional compound employed may be, for example, 5.0 equivalent percent or less based on the total weight of the reaction product and active hydrogen containing groups used.

The polyester diols used in forming a polyurethane are in general prepared by the condensation polymerization of one or more polyacid compounds and one or more polyol compounds. Preferably, the polyacid compounds and polyol compounds are di-functional, i.e., diacid compounds and diols are used to prepare substantially linear polyester diols, although minor amounts of mono-functional, tri-functional, and higher functionality materials (perhaps up to 5 mole percent) can be included to provide a slightly branched, but uncrosslinked polyester polyol component. Suitable dicarboxylic acids include, without limitation, glutaric acid, succinic acid, malonic acid, oxalic acid, phthalic acid, hexahydrophthalic acid, adipic acid, maleic acid, suberic acid, azelaic acid, dodecanedioic acid, their anhydrides and polymerizable esters (e.g., methyl esters) and acid halides (e.g., acid chlorides), and mixtures of these. Suitable polyols include those already mentioned, especially the diols. In preferred aspects, the carboxylic acid component includes one or more of adipic acid, suberic acid, azelaic acid, phthalic acid, dodecanedioic acid, or maleic acid (or the anhydrides or polymerizable esters of these) and the diol component includes one or more of includes 1,4-butanediol, 1,6-hexanediol, 2,3-butanediol, or diethylene glycol. Typical catalysts for the esterification polymerization are protonic acids, Lewis acids, titanium alkoxides, and dialkyltin oxides.

A polymeric polyether or polycaprolactone diol reactant for preparing thermoplastic polyurethanes may be obtained by reacting a diol initiator, e.g., 1,3-propanediol or ethylene or propylene glycol, with a lactone or alkylene oxide chain-extension reagent. Lactones that can be ring opened by an active hydrogen are well-known in the art. Examples of suitable lactones include, without limitation, ε-caprolactone, γ-caprolactone, β-butyrolactone, β-propriolactone, γ-butyrolactone, α-methyl-γ-butyrolactone, β-methyl-γ-butyrolactone, γ-valerolactone, δ-valerolactone, γ-decanolactone, δ-decanolactone, γ-nonanoic lactone, γ-octanoic lactone, and combinations of these. In one preferred aspect, the lactone is ε-caprolactone. Useful catalysts include those mentioned above for polyester synthesis. Alternatively, the reaction can be initiated by forming a sodium salt of the hydroxyl group on the molecules that will react with the lactone ring.

In other aspects, a diol initiator may be reacted with an oxirane-containing compound to produce a polyether diol to be used in the polyurethane elastomer polymerization. Alkylene oxide polymer segments include, without limitation, the polymerization products of ethylene oxide, propylene oxide, 1,2-cyclohexene oxide, 1-butene oxide, 2-butene oxide, 1-hexene oxide, tert-butylethylene oxide, phenyl glycidyl ether, 1-decene oxide, isobutylene oxide, cyclopentene oxide, 1-pentene oxide, and combinations of these. The oxirane-containing compound is preferably selected from ethylene oxide, propylene oxide, butylene oxide, tetrahydrofuran, and combinations of these. The alkylene oxide polymerization is typically base-catalyzed. The polymerization may be carried out, for example, by charging the hydroxyl-functional initiator compound and a catalytic amount of caustic, such as potassium hydroxide, sodium methoxide, or potassium tert-butoxide, and adding the alkylene oxide at a sufficient rate to keep the monomer available for reaction. Two or more different alkylene oxide monomers may be randomly copolymerized by coincidental addition or polymerized in blocks by sequential addition. Homopolymers or copolymers of ethylene oxide or propylene oxide are preferred. Tetrahydrofuran may be polymerized by a cationic ring-opening reaction using such counterions as $SbF_6^-$, $AsF_6^-$, $PF_6^-$, $SbCl_6^-$, $BF_4^-$, $CF_3SO_3^-$, $FSO_3^-$, and $ClO_4^-$. Initiation is by formation of a tertiary oxonium ion. The polytetrahydrofuran segment can be prepared as a "living polymer" and terminated by reaction with the hydroxyl group of a diol such as any of those mentioned above. Polytetrahydrofuran is also known as polytetramethylene ether glycol (PTMEG).

Aliphatic polycarbonate diols that may be used in making a polyurethane are prepared by the reaction of diols with dialkyl carbonates (such as diethyl carbonate), diphenyl carbonate, or dioxolanones (such as cyclic carbonates having five- and six-member rings) in the presence of catalysts like alkali metal, tin catalysts, or titanium compounds. Useful diols include, without limitation, any of those already mentioned. Aromatic polycarbonates are usually prepared from reaction of bisphenols, e.g., bisphenol A, with phosgene or diphenyl carbonate.

In various aspects, the polymeric diol preferably has a weight average molecular weight of at least about 500, more preferably at least about 1000, and even more preferably at least about 1800 and a weight average molecular weight of up to about 10,000, but polymeric diols having weight average molecular weights of up to about 5000, especially up to about 4000, may also be preferred. The polymeric diol advantageously has a weight average molecular weight in the range from about 500 to about 10,000, preferably from about 1000 to about 5000, and more preferably from about 1500 to about 4000. The weight average molecular weights can be determined suitable methods such as those known in the art, e.g., by means of gel permeation chromatography, in accordance with ASTM D4001-13 (ASTM D4001-13, Standard Test Method for Determination of Weight-Average Molecular Weight of Polymers By Light Scattering, ASTM International, West Conshohocken, Pa., 2013), or per Schmitt, M. T., "Methods for Polymer Molecular Weight Measurement." (see MNL17-2ND-EB Paint and Coating Testing Manual: 15th. Edition of the Gardner-Sward Handbook, edited by Joseph Koleske, (pp. 908-913). West Conshohocken, Pa.: ASTM International, 2012. doi:10.1520/MNL12254M).

The reaction of the polyisocyanate, polymeric diol, and diol or other chain extension agent is typically carried out at an elevated temperature in the presence of a catalyst. Typical catalysts for this reaction include organotin catalysts such as stannous octoate, dibutyl tin dilaurate, dibutyl tin diacetate, dibutyl tin oxide, tertiary amines, zinc salts, and manganese salts. Generally, the ratio of polymeric diol, such as polyester diol, to extender can be varied within a relatively wide range depending largely on the desired hardness of the final polyurethane elastomer. For example, the equivalent proportion of polyester diol to extender may be within the range of 1:0 to 1:12 and, more preferably, from 1:1 to 1:8. Preferably, the diisocyanate(s) employed are proportioned such that the overall ratio of equivalents of isocyanate to equivalents of active hydrogen containing materials is within the range of 1:1 to 1:1.05, and more preferably, 1:1 to 1:1.02. The polymeric diol segments typically are from about 35 percent to about 65 percent by weight of the polyurethane polymer, and preferably from about 35 percent to about 50 percent by weight of the polyurethane polymer.

The selection of diisocyanate, extenders, polymeric diols, and the weight percent of the polymeric diols used takes into account the desired density and stability of the desired foam. In general, a greater content of a polymeric polyol that has a Hildenbrand solubility parameter closer to that of the supercritical fluid will permit higher absorption of the supercritical fluid that results in a lower density foam. Also in general, shorter polymeric diols provide foams that shrink less after they are first foamed. Use of higher number average molecular weight polymeric diols allow a higher degree of swelling, but a molecular weight that is too high may yield a less stable foam.

Suitable polyureas may be prepared by reaction of one or more polymeric diamines or polyols with one or more of the polyisocyanates already mentioned and one or more diamine extenders. Nonlimiting examples of suitable diamine extenders include ethylene diamine, 1,3-propylene diamine, 2-methyl-pentamethylene diamine, hexamethylene diamine, 2,2,4- and 2,4,4-trimethyl-1,6-hexane diamine, imino-bis (propylamine), imido-bis(propylamine), N-(3-aminopropyl)-N-methyl-1,3-propanediamine), 1,4-bis(3-aminopropoxy)butane, diethyleneglycol-di(aminopropyl)ether), 1-methyl-2,6-diamino-cyclohexane, 1,4-diamino-cyclohexane, 1,3- or 1,4-bis(methylamino)-cyclohexane, isophorone diamine, 1,2- or 1,4-bis(sec-butylamino)-cyclohexane, N,N'-diisopropyl-isophorone diamine, 4,4'-diamino-dicyclohexylmethane, 3,3'-dimethyl-4,4'-diamino-dicyclohexylmethane, N,N'-dialkylamino-dicyclohexylmethane, and 3,3'-diethyl-5,5'-dimethyl-4,4'-diamino-dicyclohexylmethane. Polymeric diamines include polyoxyethylene diamines, polyoxypropylene diamines, poly(oxyethylene-oxypropylene) diamines, and poly(tetramethylene ether) diamines. The amine- and hydroxyl-functional extenders already mentioned may be used as well. Generally, as before, trifunctional reactants are limited and may be used in conjunction with monofunctional reactants to prevent crosslinking.

Suitable polyamides may be obtained by: (1) polycondensation of (a) a dicarboxylic acid, such as oxalic acid, adipic acid, sebacic acid, terephthalic acid, isophthalic acid, 1,4-cyclohexanedicarboxylic acid, or any of the other dicarboxylic acids already mentioned with (b) a diamine, such as ethylenediamine, tetramethylenediamine, pentamethylenediamine, hexamethylenediamine, or decamethylenediamine, 1,4-cyclohexanediamine, m-xylylenediamine, or any of the other diamines already mentioned; (2) a ring-opening polymerization of a cyclic lactam, such as ε-caprolactam or ω-laurolactam; (3) polycondensation of an aminocarboxylic acid, such as 6-aminocaproic acid, 9-aminononanoic acid, 11-aminoundecanoic acid, or 12-aminododecanoic acid; or (4) copolymerization of a cyclic lactam with a dicarboxylic acid and a diamine to prepare a carboxylic acid-functional polyamide block, followed by reaction with a polymeric ether diol (polyoxyalkylene glycol) such as any of those already mentioned. Polymerization may be carried out, for example, at temperatures of from about 180 degrees Celsius to about 300 degrees Celsius Specific examples of suitable polyamide blocks include NYLON 6, NYLON 66, NYLON 610, NYLON 11, NYLON 12, copolymerized NYLON, NYLON MXD6, and NYLON 46.

The effects of the type and molecular weights of the soft segment polymeric polyols used in making thermoplastic polyurea elastomers and polyamide elastomers are analogous to the same effects in making thermoplastic polyurethane elastomers.

The polyesters can have blocks of monomer units with low chain length that form the crystalline regions and blocks of softening segments with monomer units having relatively higher chain lengths. In some aspects, the polyesters can be thermoplastic polyester elastomers such as those that are commercially available under the tradename HYTREL from DuPont.

Metallocene-catalyzed block copolymers of ethylene and α-olefins having 4 to about 8 carbon atoms are prepared by single-site metallocene catalysis of ethylene with a softening comonomer such as hexene-1 or octene-1, for example in a high pressure process in the presence of a catalyst system comprising a cyclopentadienyl-transition metal compound and an alumoxane. Octene-1 is a preferred comonomer to use. These materials are commercially available from ExxonMobil (Irving, Tex., USA) under the tradename EXACT and from the Dow Chemical Company (Midland, Mich., USA) under the tradename ENGAGE.

Styrene block copolymer such as poly(styrene-butadiene-styrene), poly(styrene-ethylene-co-butylene-styrene), and poly(styrene-isoprene-styrene) may be prepared may anionic polymerization in which the polymer segments are produced sequentially, first by reaction of an alkyl-lithium initiator with styrene, then continuing polymerization by adding the alkene monomer, then completing polymerization by again adding styrene. S-EB-S and S-EP-S block copolymers are produced by hydrogenation of S-B-S and S-I-S block copolymers, respectively.

Foamed Preform.

In various aspects, a foamed preform comprising a disclosed polymer can be formed by molding the polymer, e.g., compression molding or injection molding, to a desired shape as known to the skilled artisan. The preform can be foamed during or after the molding process. In various aspects, the foam structure of the foamed preform is a closed cell foam structure.

In a further aspect, foaming a foamed preform after the molding process can comprise infusion of a molded preform, preferably to saturation, with a supercritical fluid, which in some aspects is a supercritical carbon dioxide. Nonlimiting examples of suitable compounds that can be used as the supercritical fluid include carbon dioxide (critical temperature 31.1 degrees Celsius, critical pressure 7.38 MPa), nitrous oxide (critical temperature 36.5 degrees Celsius, critical pressure 7.24 MPa), ethane (critical temperature 32.3 degrees Celsius, critical pressure 4.88 MPa), ethylene (critical temperature 9.3 degrees Celsius, critical pressure 5.12 MPa), nitrogen (critical temperature −147 degrees Celsius, critical pressure 3.39 MPa), and oxygen (critical temperature −118.6 degrees Celsius, critical pressure 5.08 MPa).

Carbon dioxide is often used as a supercritical fluid in different processes. The supercritical carbon dioxide fluid can be made more compatible with the polar thermoplastic elastomers (particularly thermoplastic polyurethane, polyurea, and polyamide elastomers) by mixing it with a polar fluid such as methanol, ethanol, propanol, or isopropanol. The polar fluid that is used should have a Hildebrand solubility parameter equal to or greater than 9 $MPa^{-1/2}$. Increasing the weight fraction of the polar fluid increases the amount of carbon dioxide uptake, but the polar fluid is also taken up, and at some point there is a shift from a maximum amount of uptake of the supercritical carbon dioxide to an increasing amount of the non-foaming agent polar fluid being taken up by the thermoplastic elastomer article. In certain aspects, from about 0.1 mole percent to about 7 mole percent of the polar fluid is included in the supercritical fluid, based on total fluid, especially when used to infuse a polyurethane elastomer, polyurea elastomer, or a polyamide elastomer.

Supercritical fluids may be used in combination. In some cases, supercritical nitrogen may be used as a nucleating agent in a small weight percentage along with supercritical carbon dioxide or another supercritical fluid that acts as the blowing agent. Nano-sized particles such as nano clays, carbon black, crystalline, immiscible polymers, and inorganic crystals such as salts can be included as nucleating agents.

The preform can be placed in a vessel that can withstand high pressure. The vessel is closed and a foaming agent, e.g., carbon dioxide, nitrogen, mixtures of carbon dioxide and nitrogen, or other type of foaming agent is introduced. The vessel temperature and pressure are maintained above the critical temperature and pressure of the foaming agent. Once the preform is saturated with the foaming agent, the vessel is rapidly depressurized (the depressurizing process can last up to a minute or so). The preform is then removed from the vessel and heated to produce the foamed prefoam. When a co-solvent is used, it can be introduced along with the foaming agent, e.g., carbon dioxide, nitrogen, mixtures of carbon dioxide and nitrogen, or other type of foaming agent, to the vessel with the article before the vessel is closed.

The preform can be soaked in the supercritical fluid under conditions—temperature and pressure—and for a time to allow it to take up a desired amount of the supercritical fluid.

In various aspects, the preform can be soaked under conditions that result in it becoming saturated with the supercritical fluid. The preform is then removed from the chamber and immediately either heated to a temperature in a medium with suitable thermal characteristics for foaming to occur or is exposed to microwaves or infrared radiation in a tunnel or oven to cause the foaming to occur. In microwave heating, the material is exposed to an electromagnetic wave that causes the molecules in the material to oscillate, thereby generating heat. The system can be designed to work in batch or continuous process. In a batch process, the preform saturated with the supercritical fluid is placed in a microwave oven or a device equipped with an IR lamp or IR lamps. Preferably the preform is rotated or agitated, when their size is small enough, to ensure fast and uniform heating. When foaming is completed, the articles are removed from the system. The heating can also be done in the continuous process. The preform can be placed on a planar surface such as a belt that moves them through a tunnel or through a pipe. The system is designed so that the heating elements (IR lamp or microwave generator) can apply power to achieve rapid uniform heating. The time of heating is controlled by the speed by which the articles move through the tunnel or pipe.

Water is one suitable medium in which foaming readily occurs at an appropriate temperature because water has a high heat capacity and heat transfer rate. In certain preferred aspects, the thermoplastic elastomer article infused or saturated with supercritical fluid is submerged in water that is at a temperature at least about 80 degrees C. higher and, preferably, at least about 100 degrees C. higher than the elastomers (soft segment) glass transition temperature but less than the elastomers (hard segment) melting temperature. Other suitable mediums are steam or pressurized hot air.

Time, temperature, and pressure in the step of solvating the preform article with the supercritical fluid and the depressurization rate, temperature, and medium in the foaming step all affect the degree of foaming achieved. In general, a thicker article must be kept in the supercritical fluid for a longer time to become saturated with the supercritical fluid.

The preform may be annealed at an elevated temperature after the foaming process. While not wishing to be bound by theory, it is believed that annealing the article may allow phase segregation of the elastomers that are placed under strain, e.g. the mold, and stress, a partial pressure external to moderate internal pressure equilibration just after rapid foaming. Cooling under balanced forces allow the increased modulus to maintain shape once at room temperature and atmospheric pressure.

The preform may be annealed at a temperature from above ambient to just below the $T_m$ of the thermoplastic elastomer (which may be determine by the usual appropriate thermal methods, of which differential scanning calorimetry (DSC) may be mentioned) for a time sufficient to stabilize the foam.

Articles Comprising the Disclosed Compression Molded Foam Articles.

The present disclosure also pertains to articles comprising a disclosed molded foam article. For example, an article of the present disclose comprising a disclosed molded foam article can be an article of footwear, a component of an article of footwear, an article of apparel, a component of an article of apparel, an article of sporting equipment, or a component of an article of sporting equipment. That is, the disclosed molded foam articles can be utilized in the manufacture of a variety of articles or components, e.g., a component used in an article of footwear or a cushioning element, which can be utilized in the manufacture of an article.

In some aspects, the disclosed article can be an article of footwear, including, but not limited to, a shoe, a boot, or a sandal. In a particular aspect, the disclosed article is a shoe.

A shoe can be an athletic shoe, including, but not limited to, a baseball shoe, a basketball shoe, a soccer shoe, a football shoe, a running shoe, a cross-trainer shoe, a track shoe, or a golf shoe.

In a further aspect, the disclosed article is a component of an article of footwear. In particular aspects, the component of an article of footwear can be a midsole, an outsole, an insole, or an insert comprising a disclosed molded foam article. Additional components of an article of footwear comprising a disclosed molded foam article can include a tongue padding, a collar padding, and a combination thereof. As described above and detailed more completely below, the articles comprising the disclosed molded foam articles can exhibit a unique balance of beneficial physical properties such as high energy return or low stiffness in an anisotropic manner. For example, the disclosed molded foam articles can exhibit differences these properties along different axes of the molded foam article.

In some aspects, the component of an article of footwear is a cushioning element. In such contexts, the cushioning element is configured to have a majority of force applied in a first direction during use; and wherein the first axis is parallel to the first direction. The cushioning element in an article of footwear can be a midsole or a sockliner.

In various aspects, the disclosed molded foam articles and the molded foam article made using the disclosed methods can produce molded foam articles having physical properties which make these articles particularly advantageous for use as components in articles of footwear and athletic equipment. For example, the physical properties of these molded foam articles make them particularly useful for use as cushioning elements, such as midsoles. Moreover, the disclosed methods can be used to prepare molded foam articles comprising anisotropic cell structure that can be used generally in an article or application that can benefit from use of a foam material where directionality of foam properties is desirable, such as seat cushions, impact protection devices. In particular, the disclosed methods can be used to prepare molded foam articles comprising anisotropic cell structure that provide a foam that is characterized by a foam feel softer at least along certain axes.

As described above, the disclosed molded foam articles and the molded foam articles made using the disclosed methods described herein can exhibit sub-regions having different properties such as, but not limited to, efficiency. The sub-regions can be discrete regions having a property distributed more or less uniformly within the sub-region. In other aspects, the article manufactured by the disclosed methods may be characterized by a gradient distribution of the property along a particular axis, e.g., the z-axis of the article or component comprising a disclosed molded foam article.

In various aspects, the article is an article of sporting equipment or a component of an article of sporting equipment. In a particular aspect, the article is a component of an article of sporting equipment, e.g., a cushioning element. The cushioning element that is a component of an article of sporting equipment can be a hat, a component of a bag, a component of a ball, and a component of protective equipment.

The article of the present disclosure can be an article of apparel or a component of an article of apparel. In some aspects, the component of an article of apparel is a cushioning element such as a collar, a hem, a lapel, or other apparel elements that can benefit from directionality of foam properties for enhanced appearance, function, or both.

In some aspects, the article comprising a disclosed molded foam article can be a cushioning element in shinguards, shoulder pads, chest protectors, masks, helmets or other headgear, knee protectors, and other protective equipment; a component placed in an article of clothing between textile layers; or may be used for other known padding applications for protection or comfort, especially those for which weight of the padding is a concern. In some aspects, the article is a cushioning element used in a sports helmet, a backpack, apparel, sports uniform padding, or combat gear.

Efficiency Test Method.

A. Efficiency Test Method: Testing of a Plaque Specimen.

Figure 8:
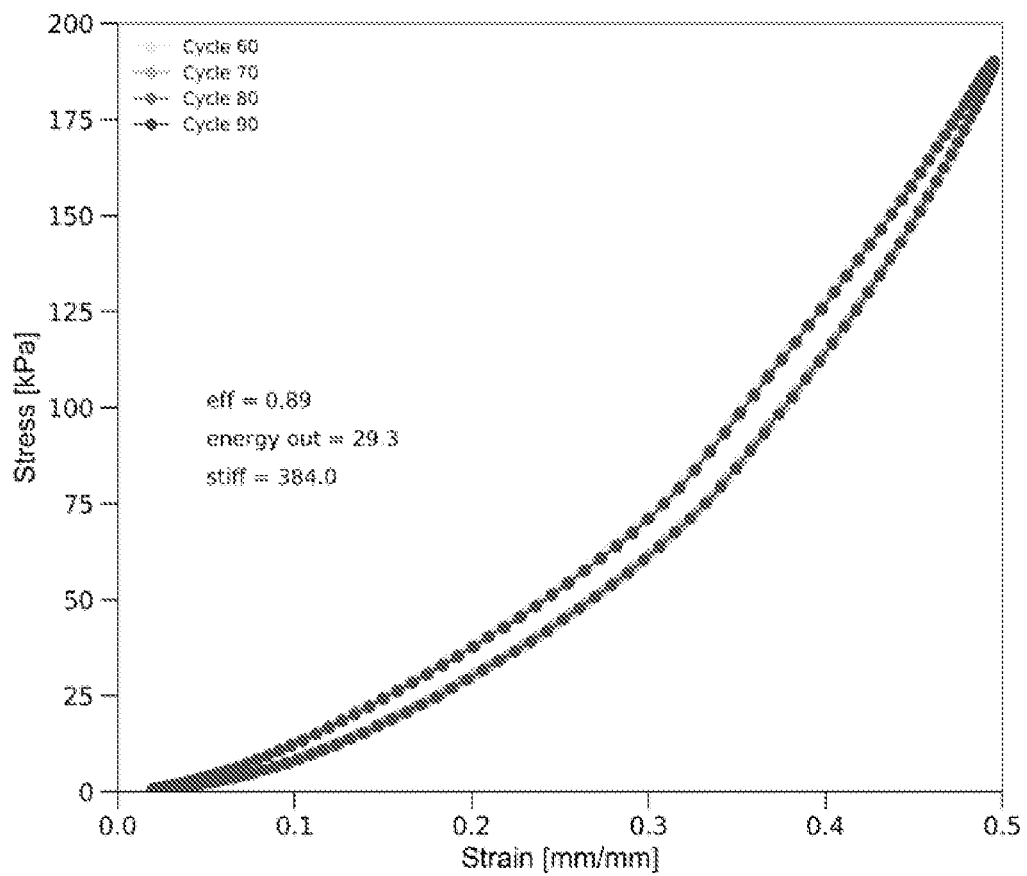
FIG. 8 shows representative cyclic loading data for a representative molded plaque specimen having anisotropic closed cell foam structure.

Testing of sample plaque specimens is performed on an Instron ElectroPuls E10000 dynamic testing system (Illinois Tool Works Inc., Norwood, Mass., USA), equipped with a cylindrical tupp where the contacting diameter is 44.86 millimeters. 500 sinusoidal compression cycles are performed with a frequency of 2 Hertz and are force controlled to 300 N. Compressive stiffness, efficiency, and energy return are measured from these tests. Compressive stiffness for each cycle corresponds to the peak stress normalized by the strain at max load where stress and strain are defined as force/area and deflection/thickness, respectively. Efficiency is the integral of the unloading load deflection curve normalized by the integral of loading load deflection curve. Energy return is the integral of the unloading load deflection curve. The metrics reported for an individual plaque specimen are the average of the $100^{th}$, $200^{th}$, $300^{th}$, and $400th^{th}$ cycles. A representative graph of data for a plaque specimen is shown in FIG. 8. In FIG. 8, the relevant metrics are indicated on the graph where where "stiff"=compressive stiffness [kilopascals] and "eff"=efficiency, and "energy out"=energy return.

B. Efficiency Test Method: Testing of a Midsole.

Efficiency Testing can also be used to test a foam preform or a molded foam article such as a midsole. Compression testing is performed on an Instron ElectroPuls E10000 dynamic testing system (Illinois Tool Works Inc., Norwood, Mass., USA) with a last-shaped tupp sized to correspond to the size of the midsole being tested. Testing of a midsole involves compressing the midsole in the heel and forefoot using a last pressure matched to a performance runner's running stride. Experiments are run in force control up to a maximum load of 600 N using 100 compressive cycles performed at approximately 1.1 hertz using a waveform for an athlete footstrike force profile, e.g. an athlete such as a long-distance runner. The waveform employs a half period of sine wave to apply an impulse. After the impulse is complete, the midsole is left unloaded for the remainder of the cycle. The load-rest cycle is repeated for the desired number of cycles. Waveform details: pulse amplitude=600 N; pulse width=0.2 seconds; pulse shape=half period of sine wave; and rest=0.8 seconds, repeat.

Figure 7:
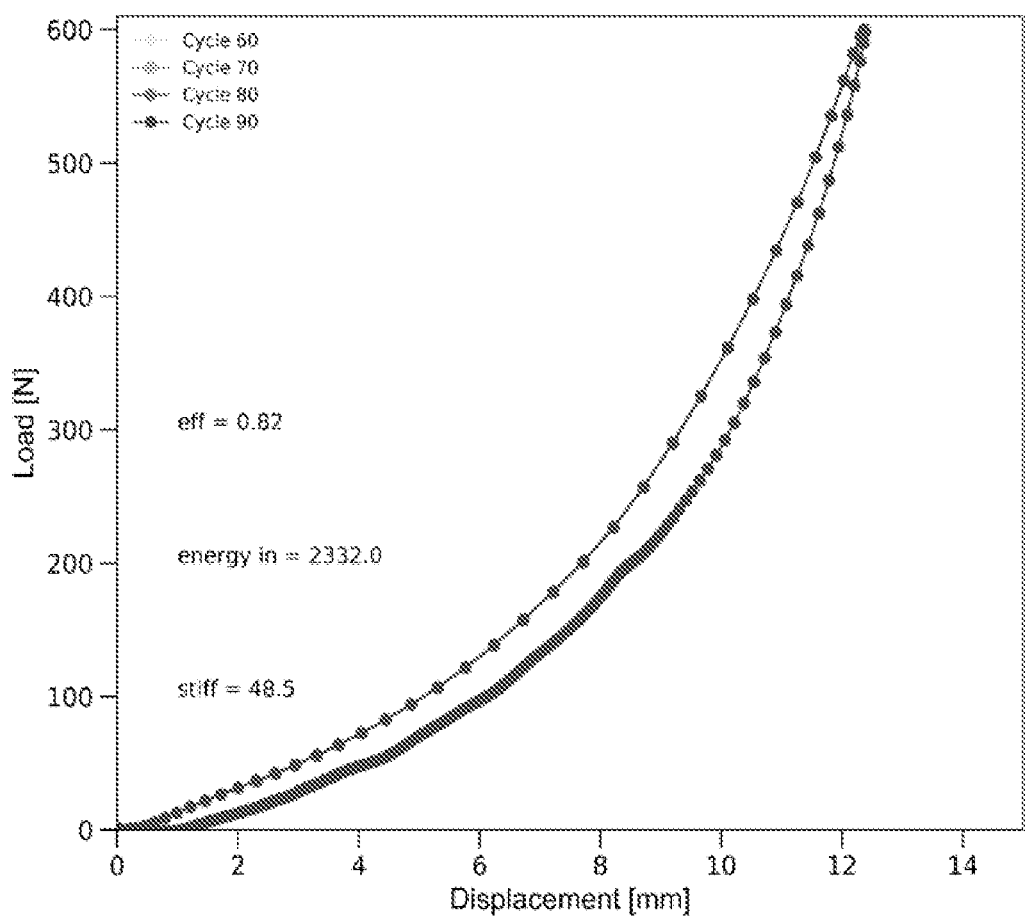
FIG. 7 shows representative cyclic loading data for a representative foam midsole (heel loading) having anisotropic closed cell foam structure.

Compressive stiffness, efficiency, and energy return are measured from these tests. Compressive stiffness for each cycle corresponds to the peak load normalized by the deflection at that max load. For molded foam articles such as midsoles (i.e., any non-plaque geometry) stiffness is reported in N/mm. Efficiency is the integral of the unloading load deflection curve normalized by the integral of loading load deflection curve. Energy return is the integral of the unloading load deflection curve. The metrics reported for an individual midsole are the average of the $60^{th}$, $70^{th}$, $80^{th}$ and $90^{th}$ cycles. A representative graph of data for a midsole is shown in FIG. 7. In FIG. 8, the relevant metrics are indicated on the graph where "stiff"=compressive stiffness [N/mm] "energy out"=energy return [mJ], and "eff"=efficiency.

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

As used in the specification and the appended claims, the singular forms "a," "an" and "the" include plural referents unless the context clearly dictates otherwise. Thus, for example, reference to "a polymer," "a mold," or "a foamed preform," including, but not limited to, two or more such polymers, molds, or preform, and the like.

Reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" polyamide is interpreted to include one or more polymer molecules of the polyamide, where the polymer molecules may or may not be identical (e.g., different molecular weights and/or isomers).

It should be noted that ratios, concentrations, amounts, and other numerical data can be expressed herein in a range format. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'". It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1 percent to 5 percent" should be interpreted to include not only the explicitly recited values of about 0.1 percent to about 5 percent, but also include individual values (e.g., 1 percent, 2 percent, 3 percent, and 4 percent) and the sub-ranges (e.g., 0.5 percent, 1.1 percent, 2.4 percent, 3.2 percent, and 4.4 percent) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated plus or minus 10 percent variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, "anisotropic" means having different properties or degrees of properties in different directions (or axes) or along different planes. An anisotropic property can be a mechanical property such as energy return, stiffness value, or elasticity. In this context, "such that energy return is an anisotropic property" would mean that the value of the energy return is different along one axis compared to a another axis. In some instances, the axes are perpendicular to one another and correspond to one of a x-, y- and z-axis such that the x- and y-axis define a plane defining a major plane such as a cross-sectional plan lengthwise through a midsole. For example, the energy return of a foam in length (y direction) may be different than in thickness (z direction) and/or in width (x direction).

As used herein, "substantially anisotropic property" or "having a substantially anisotropic property" means that at least one mechanical property, e.g., energy return ("having a substantially anisotropic energy return"), in an area, region, or volume of the foam having a substantially anisotropic property is at least about 5 percent different in a first axis compared to a second or a third axis perpendicular to the first axis, and such that the second and third axis are perpendicular to one another.

As used herein, "anisotropic cell shape" means that the cells in a closed cell foam have a shape which has different dimensions in different spatial directions, such as directions along the x-, y- and z-axis of the foam closed cell. The largest dimension of the cell can be referred to as "a direction". Anisotropic foam cell shapes can be, but are not limited to, ellipsoid, tri-axial ellipsoid, oblate spheroid, prolate spheroid, or mixtures thereof.

As used herein, "substantially anisotropic cell shape" or "having a substantially anisotropic cell shape" means that in a population of cells in a foam, at least about 60 percent of the cells have an anisotropic cell shape within an area, region or volume of the foam having a substantially anisotropic cell shape.

As used herein, "isotropic" means having similar properties or degrees of properties in different directions (or axes) or along different planes. An isotropic property can be a mechanical property such as energy return, stiffness value, or elasticity. In this context, "such that energy return is an isotropic property" would mean that the value of the energy return is similar or substantially the same along one axis compared to another axis.

As used herein, "substantially isotropic property" or "having a substantially isotropic property" means that at least one mechanical property, e.g., energy return ("having a substantially isotropic energy return"), in an area, region, or volume of the foam having a substantially isotropic property is less than 5 percent different in a first axis compared to a second or a third axis perpendicular to the first axis, and such that the second and third axis are perpendicular to one another.

As used herein, "isotropic cell shape" means that the cells in a closed cell foam have a shape which has similar or the same dimensions in different spatial directions, such as directions along the x-, y- and z-axis of the foam closed cell.

As used herein, "substantially isotropic cell shape" or "having a substantially isotropic cell shape" means that in a population of cells in a foam, at least about 60 percent of the cells have an isotropic cell shape within an area, region or volume of the foam having a substantially isotropic cell shape.

As used herein, the terms "optional" or "optionally" means that the subsequently described event or circumstance can or cannot occur, and that the description includes instances where said event or circumstance occurs and instances where it does not.

As used herein, the term "units" can be used to refer to individual (co)monomer units such that, for example, styrenic repeat units refers to individual styrene (co)monomer units in the polymer. In addition, the term "units" can be used to refer to polymeric block units such that, for example, "styrene repeating units" can also refer to polystyrene blocks; "units of polyethylene" refers to block units of polyethylene; "units of polypropylene" refers to block units of polypropylene; "units of polybutylene" refers to block units of polybutylene, and so on. Such use will be clear from the context.

The term "copolymer" refers to a polymer having two or more monomer species, and includes terpolymers (i.e., copolymers having three monomer species).

Unless otherwise specified, temperatures referred to herein are based on atmospheric pressure (i.e. one atmosphere).

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

As used herein the terms "weight percent," "wt percent," and "wt. percent," which can be used interchangeably, indicate the percent by weight of a given component based on the total weight of the composition, unless otherwise specified. That is, unless otherwise specified, all wt percent values are based on the total weight of the composition. It should be understood that the sum of wt percent values for all components in a disclosed composition or formulation are equal to 100.

Compounds are described using standard nomenclature. For example, any position not substituted by any indicated group is understood to have its valence filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs.

The term "alkyl group" as used herein is a branched or unbranched saturated hydrocarbon group of 1 to 24 carbon atoms, such as methyl, ethyl, n propyl, isopropyl, n butyl, isobutyl, t butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

Aspects.

The following listing of exemplary aspects supports and is supported by the disclosure provided herein.

Aspect 1. A foam article comprising: an elastomeric material having a closed cell foam structure comprising a plurality of cells having an anisotropic cell shape; wherein the foam article comprises a first axis, a second axis and a third axis; wherein the first axis is perpendicular to the second axis and the third axis; wherein the second axis and the third axis are each perpendicular to each other; wherein the second and the third axis define a plane parallel to a major surface of the foam article; and wherein a physical property determined along the first axis is different from the physical property determined along the second axis, the third axis, or both the second and third axis.

Aspect 2. The foam article of Aspect 1, wherein the foam article is a compression molded foam article.

Aspect 3. The foam article of Aspect 2, wherein the first axis is parallel to a direction in which compression is applied during a compression molding process.

Aspect 4. The foam article of any one of Aspect 1-Aspect 3, wherein the physical property determined along the first axis differs from the physical property determined along the second axis, the third axis, or both the second and third axes by at least 5 percent, or at least 10 percent, or at least 20 percent.

Aspect 5. The foam article of any one of Aspect 1-Aspect 4, wherein the plurality of cells have an average aspect ratio that is an average ratio of the second axis to the first axis; wherein a major axis is parallel to the second axis; wherein a minor axis is parallel to the first axis; and wherein the average aspect ratio is from about 1.5 to about 15; or is from about 2 to about 15; or is from about 2.5 to about 15; or is from about 5 to about 15; or is from about 7.5 to about 15; or is from about 10 to about 15; or is from about 2 to about 10; or is from about 2.5 to about 10; or is from about 5 to about 10; or is from about 7.5 to about 10.

Aspect 6. The foam article of any one of Aspect 1-Aspect 5, wherein the plurality of cells are aligned in an orientation along the second axis within a range of a solid angle of about plus or minus 20 degrees; or about plus or minus 15 degrees; or of about plus or minus 10 degrees; or of about plus or minus 5 degrees.

Aspect 7. The foam article of any one of Aspect 1-Aspect 6, wherein the plurality of cells having an anisotropic cell shape are dispersed throughout the foam article.

Aspect 8. The foam article of Aspect 7, wherein dispersed throughout the closed cell foam structure is distributed substantially throughout an entire height of the foam article as determined along a dimension parallel to the first axis.

Aspect 9. The foam article of Aspect 7, wherein the plurality of cells having the anisotropic cell shape are present in a region of the foam article that does not include an external skin of the foam article, and the region occupies at least 1 cubic centimeter, or at least 3 cubic centimeters, or at least 5 cubic centimeters of a total volume of the foam article.

Aspect 10. The foam article of Aspect 7, wherein dispersed throughout the closed cell foam structure is distributed substantially uniformly throughout a height of the foam article.

Aspect 11. The foam article of any one of Aspect 1-Aspect 10, wherein the foam article has a foam article volume; and wherein the plurality of cells having an anisotropic cell shape comprising a percent of the foam article volume that is from about 10 percent to about 100 percent; or about 20 percent to about 100 percent; or about 30 percent to about 100 percent; or about 40 percent to about 100 percent; or about 50 percent to about 100 percent; or about 60 percent to about 100 percent; or about 70 percent to about 100 percent; or about 80 percent to about 100 percent; or about 90 percent to about 100 percent; or 10 percent to about 90 percent; or about 20 percent to about 90 percent; or about 30 percent to about 90 percent; or about 40 percent to about 90 percent; or about 50 percent to about 90 percent; or about 60 percent to about 90 percent; or 70 percent to about 90 percent; or about 80 percent to about 90 percent.

Aspect 12. The foam article of any one of Aspect 1-Aspect 10, wherein the foam article has a foam article weight; and wherein the plurality of cells having an anisotropic cell shape comprising a percent of the foam article weight that is from about 10 percent to about 100 percent; or about 20 percent to about 100 percent; or about 30 percent to about 100 percent; or about 40 percent to about 100 percent; or about 50 percent to about 100 percent; or about 60 percent to about 100 percent; or about 70 percent to about 100 percent; or about 80 percent to about 100 percent; or about 90 percent to about 100 percent; or about 10 percent to about 90 percent; or about 20 percent to about 90 percent; or about 30 percent to about 90 percent; or about 40 percent to about 90 percent; or about 50 percent to about 90 percent; or about 60 percent to about 90 percent; or about 70 percent to about 90 percent; or about 80 percent to about 90 percent.

Aspect 13. The foam article of any one of Aspect 1-Aspect 10, wherein the foam article has a foam article cell number representing a total number of closed cells contained within the foam article; and wherein the plurality of cells having an anisotropic cell shape comprise a percent of the foam article cell number that is from about 10 percent to about 100 percent; or about 30 percent to about 100 percent; about 40 percent to about 100 percent; or about 50 percent to about 100 percent; or about 60 percent to about 100 percent; or about 70 percent to about 100 percent; or about 80 percent to about 100 percent; or about 90 percent to about 100 percent; or about 10 percent to about 90 percent; or about 20 percent to about 90 percent; or about 30 percent to about 90 percent; or about 40 percent to about 90 percent; or about 50 percent to about 90 percent; or about 60 percent to about 90 percent; or about 70 percent to about 90 percent; or about 80 percent to about 90 percent.

Aspect 14. The foam article of any one of Aspect 1-Aspect 13, wherein the foam article has a foam article average height along an axis parallel to the first axis; wherein the plurality of cells having an anisotropic shape are distributed along a percent of the foam article average height that is at least about 10 percent; or at least about 20 percent; or at least about 30 percent; or at least about 40 percent; or at least about 50 percent; or at least about 60 percent; or at least about 70 percent; or at least about 80 percent; or at least about 90 percent.

Aspect 15. The foam article of any one of Aspect 1-Aspect 14, wherein the anisotropic cell shape is ellipsoid.

Aspect 16. The foam article of Aspect 15, wherein the anisotropic cell shape is tri-axial ellipsoid, oblate spheroid, prolate spheroid, or mixtures thereof.

Aspect 17. The foam article of any one of Aspect 1-Aspect 16, wherein the physical property is at least one physical property.

Aspect 18. The foam article of any one of Aspect 1-Aspect 17, wherein the physical property is efficiency.

Aspect 19. The foam article of Aspect 18, wherein the efficiency in the first axis of the foam article, when determined in accordance with Efficiency Test Method, is greater than or equal to about 5 percent; or about 15 percent; or about 20 percent; or about 25 percent; or about 30 percent; or about 35 percent; or about 40 percent; or about 45 percent; or about 50 percent; or about 55 percent; or about 60 percent; or about 65 percent; or about 65 percent; or about 70 percent; or about 75 percent; or about 80 percent; or about 82 percent; or about 84 percent; or about 86 percent; or about 88 percent; or about 89 percent; or about 90 percent; or about 91 percent; or about 92 percent; or about 93 percent; or about 94 percent; or about 95 percent; or about 96 percent; or about 97 percent; or about 98 percent; or about 99 percent; or about 100 percent; or about 150 percent; or about 200 percent; or about 250 percent; or about 300 percent; or about 350 percent; or about 400 percent; or about 450 percent; or about 500 percent; or about 600 percent; or about 700 percent; or about 800 percent; or about 900 percent; or about 1000 percent; or about 1500 percent; or about 2000 percent; or about 2100 percent; or about 2200 percent.

Aspect 20. The foam article of Aspect 18, wherein the efficiency in the first axis of the foam article, when determined in accordance with Efficiency Test Method, is from about 60 percent to about 99 percent; or about 65 percent to about 99 percent; or about 70 percent to about 99 percent; or about 75 percent to about 99 percent; or about 80 percent to about 99 percent; or about 82 percent to about 99 percent; or about 84 percent to about 99 percent; or about 86 percent to about 99 percent; or about 88 percent to about 99 percent.

Aspect 21. The foam article of any one of Aspect 19 or Aspect 20, wherein the efficiency of the foam article determined along the second axis, the third axis, or both the second and third axes is less than or equal to an efficiency determined along the first axis of the foam article.

Aspect 22. The foam article of Aspect 21, wherein the efficiency of the foam article determined along the first axis is at least 5 percent greater, or at least 10 percent greater, or at least 20 percent greater than the efficiency of the foam article determined along the second axis, the third axis, or both the second and third axes of the foam article.

Aspect 23. The foam article of Aspect 18, wherein a reference foam article is compression molded and comprises essentially the same polymeric material and has substantially the same density as the foam article; wherein the reference foam article has a closed cell structure that is substantially isotropic; and wherein the foam article exhibits an efficiency determined along the first axis of the foam article greater than the reference foam article, when determined in accordance with Efficiency Test Method, by about 1.0 percent to about 50 percent; or about 2.5 percent to about 50 percent; or about 5 percent to about 50 percent; or about 7.5 percent to about 50 percent; or about 10 percent to about 50 percent; or about 12.5 percent to about 50 percent; or about 15 percent to about 50 percent; or about 17.5 percent to about 50 percent; or about 20 percent to about 50 percent greater; or about 2.5 percent to about 25 percent; or about 5 percent to about 25 percent; or about 7.5 percent to about 25 percent; or about 10 percent to about 25 percent; or about 12.5 percent to about 25 percent; or about 15 percent to about 25 percent; or about 17.5 percent to about 25 percent; or about 20 percent to about 25 percent; or about 2.5 percent to about 22.5 percent; or about 2.5 percent to about 20 percent; or about 2.5 percent to about 17.5 percent; or about 2.5 percent to about 15 percent; or about 2.5 percent to about 10 percent; or about 2.5 percent to about 7.5 percent; or about 1 percent to about 5 percent; or about 1 percent to about 7.5 percent; or about 1 percent to about 10 percent.

Aspect 24. The foam article of Aspect 23, wherein there is substantially no change in an efficiency determined along the second axis, the third axis, or both the second and third axes of the foam article compared to an efficiency determined along the second axis, third axis, or both the second and third axes of the reference foam article.

Aspect 25. The foam article of Aspect 23 or Aspect 24, wherein there is a decrease in an efficiency determined along the second axis, the third axis, or both the second and third axes of the foam article compared to an efficiency determined along the second axis, third axis, or both the second and third axes of the reference foam article.

Aspect 26. The foam article of any one of Aspect 23-Aspect 25, wherein an efficiency of the foam article determined along the second axis, the third axis, or both the second and third axes is less than or equal to an efficiency determined along the first axis of the foam article.

Aspect 27. The foam article of article of Aspect 26, wherein the efficiency of the foam article determined along the first axis is at least about 5 percent greater, or at least about 10 percent greater, or at least about 20 percent greater than the efficiency of the foam article determined along the second axis, the third axis, or both the second and third axes of the foam article.

Aspect 28. The foam article of any one of Aspect 1-Aspect 17, wherein the physical property is energy return.

Aspect 29. The foam article of Aspect 28, wherein a reference foam article is compression molded and comprises essentially the same polymeric material and has substantially the same density as the foam article; wherein the reference foam article has a closed cell structure that is substantially isotropic; and wherein the foam article exhibits an energy return determined along the first axis of the foam article greater than the reference foam article, when determined in accordance with Efficiency Test Method, by from about 1.0 percent to about 70 percent; or about 2.5 percent to about 60 percent; or about 5 percent to about 50 percent; or about 7.5 percent to about 50 percent; or about 10 percent to about 50 percent; or about 12.5 percent to about 50 percent; or about 15 percent to about 50 percent; or about 17.5 percent to about 50 percent; or about 20 percent to about 50 percent; or about 2.5 percent to about 40 percent; or about 2.5 percent to about 30 percent; or about 2.5 percent to about 25 percent; or about 2.5 percent to about 20 percent; or about 2.5 percent to about 17.5 percent; or about 2.5 percent to about 15 percent; or about 1 percent to about 40 percent; or about 1 percent to about 30 percent; or about 1 percent to about 20 percent.

Aspect 30. The foam article of article of Aspect 29, wherein an energy return of the foam article determined along the second axis, the third axis, or both the second and third axes is less than or equal to an energy return determined along the first axis of the foam article.

Aspect 31. The foam article of article of Aspect 30, wherein the energy return of the foam article determined along the first axis is at least about 5 percent greater, or at least about 10 percent greater, or at least about 20 percent greater than the energy return of the foam article determined along the second axis, the third axis, or both the second and third axes of the foam article.

Aspect 32. The foam article of Aspect 28, wherein a reference foam article is compression molded and comprises essentially the same polymeric material and has substantially the same density as the foam article; wherein the reference foam article has a closed cell structure that is substantially isotropic; and wherein the foam article exhibits an energy return determined along the first axis of the foam article having a change from an energy return in a first axis of the reference foam article, when determined in accordance with Efficiency Test Method, from about 1.0 percent to about 70 percent; or about 2.5 percent to about 65 percent; or about 5 percent to about 55 percent; or about 7.5 percent to about 50 percent; or about 10 percent to about 45 percent; or about 12.5 percent to about 45 percent; or about 15 percent to about 45 percent; or about 17.5 percent to about 45 percent; or about 20 percent to about 45 percent; or about 2.5 percent to about 55; or about 2.5 percent to about 45 percent; or about 2.5 percent to about 40 percent; or about 2.5 percent to about 35 percent; or about 2.5 percent to about 30 percent; or about 2.5 percent to about 25 percent; or about 1 percent to about 50 percent; or about 1 percent to about 45 percent; or about 1 percent to about 40 percent.

Aspect 33. The foam article of article of Aspect 32, wherein there is substantially no change in an energy return determined along the second axis, the third axis, or both the second and third axes of the foam article compared to an energy return determined along the second axis, third axis, or both the second and third axes of the reference foam article.

Aspect 34. The foam article of article of Aspect 32 or Aspect 33, wherein there is a decrease in an energy return determined along the second axis, the third axis, or both the second and third axes of the foam article compared to an energy return determined along the second axis, third axis, or both the second and third axes of the reference foam article.

Aspect 35. The foam article of article of any one of Aspect 32-Aspect 34, wherein an energy return of the foam article determined along the second axis, the third axis, or both the second and third axes is less than or equal to an energy return determined along the first axis of the foam article.

Aspect 36. The foam article of article of Aspect 35, wherein the energy return of the foam article determined along the first axis is at least about 5 percent greater, or at least about 10 percent greater, or at least about 20 percent greater than the energy return of the foam article determined along the second axis, the third axis, or both the second and third axes of the foam article.

Aspect 37. The foam article of any one of Aspect 1-Aspect 17, wherein the physical property is stiffness.

Aspect 38. The foam article of Aspect 37, wherein a plaque sample prepared from the foam article exhibits a stiffness value in the first axis of the foam article when determined in accordance with Efficiency Test Method is from about 300 kilopascals to about 2000 kilopascals; or about 300 kilopascals to about 1500 kilopascal; or about 300 kilopascals to about 1000 kilopascal; or about 300 kilopascals to about 750 kilopascal.

Aspect 39. The foam article of Aspect 37, wherein the foam article exhibits a stiffness value in the first axis of the foam article, when determined in accordance with Efficiency Test Method, is from about 30 newtons per millimeter to about 300 newtons per millimeter; or about 50 newtons per millimeter to about 300 newtons per millimeter; or about 100 newtons per millimeter to about 300 newtons per millimeter; or about 150 newtons per millimeter to about 300 newtons per millimeter.

Aspect 40. The foam article of any one of Aspect 37-Aspect 39, wherein a reference foam article is compression molded and comprises essentially the same polymeric material and has substantially the same density as the foam article; and wherein the reference foam article has a substantially isotropic cell shape; and wherein the foam article exhibits a stiffness value that is that is lower than a reference foam article, when determined in accordance with Efficiency Test Method, by about 5 percent; or about 10 percent; or about 15 percent; or about 20 percent; or about 25 percent; or about 30 percent; or about 35 percent; or about 40 percent; or about 45 percent; or about 50 percent.

Aspect 41. The foam article of any one of Aspects 1-Aspect 40, wherein the elastomeric material comprises one or more polymers.

Aspect 42. The foam article of Aspect 41, wherein the one or more polymers comprise one or more aliphatic polymers, aromatic polymers, or mixture of both.

Aspect 43. The foam article of Aspect 41 or Aspect 42, wherein the one or more polymers comprise a homopolymer, a copolymer, a terpolymer, or mixtures of thereof.

Aspect 44. The foam article of any one of Aspect 41-Aspect 43, wherein the one or more polymers comprise a random copolymer, a block copolymers, an alternating copolymer, a periodic copolymer, or a graft copolymer.

Aspect 45. The foam article of any one of Aspect 41-Aspect 44, wherein the one or more polymers comprise an elastomer.

Aspect 46. The foam article of any one of Aspect 41-Aspect 45, wherein the one or more polymers comprise an olefinic polymer.

Aspect 47. The foam article of Aspect 46, wherein the olefinic polymer is an olefinic homopolymer, an olefinic copolymer, or mixtures thereof.

Aspect 48. The foam article of Aspect 46 or Aspect 47, wherein the olefinic polymer comprises a polyethylene, a polypropylene, or combinations thereof.

Aspect 49. The foam article of any one of Aspect 46-Aspect 48, wherein the olefinic polymer comprises a polyethylene homopolymer.

Aspect 50. The foam article of Aspect 49, wherein the polyethylene comprises a low density polyethylene, a high density polyethylene, a low molecular weight polyethylene, an ultra-high molecular weight polyethylene, a linear polyethylene, a branched chain polyethylene, or combinations thereof.

Aspect 51. The foam article of Aspect 49 or Aspect 50, wherein the polyethylene comprises an ethylene copolymer.

Aspect 52. The foam article of any one of Aspect 49-Aspect 51, wherein the polyethylene comprises an ethylene-vinyl acetate (EVA) copolymer, an ethylene-vinyl alcohol (EVOH) copolymer, an ethylene-ethyl acrylate copolymer, an ethylene-unsaturated mono-fatty acid copolymer, or combinations thereof.

Aspect 53. The foam article of any one of Aspect 41-Aspect 52, wherein the one or more polymers comprise a polyacrylate.

Aspect 54. The foam article of Aspect 53, wherein the polyacrylate comprises a polyacrylic acid, an ester of a polyacrylic acid, a polyacrylonitrile, a polyacrylic acetate, a polymethyl acrylate, a polyethyl acrylate, a polybutyl acrylate, a polymethyl methacrylate, a polyvinyl acetate, derivatives thereof, copolymers thereof, or any mixture thereof.

Aspect 55. The foam article of any one of Aspect 41-Aspect 54, wherein the one or more polymers comprise an ionomeric polymer.

Aspect 56. The foam article of Aspect 55, wherein the ionomeric polymer comprises a polycarboxylic acid or a derivative of a polycarboxylic acid.

Aspect 57. The foam article of Aspect 55 or Aspect 56, wherein the ionomeric polymer is a sodium salt, a magnesium salt, a potassium salt, or a salt of another metallic ion.

Aspect 58. The foam article of any one of Aspect 55-Aspect 57, wherein the ionomeric polymer comprises a fatty acid modified ionomeric polymer.

Aspect 59. The foam article of Aspect 55, wherein the ionomeric polymer comprises a polystyrene sulfonate, an ethylene-methacrylic acid copolymer, or mixtures thereof.

Aspect 60. The foam article of any one of Aspect 41-Aspect 59, wherein the one or more polymers comprise a polycarbonate.

Aspect 61. The foam article of any one of Aspect 41-Aspect 60, wherein the one or more polymers comprise a fluoropolymer.

Aspect 62. The foam article of any one of Aspect 41-Aspect 61, wherein the one or more polymers comprise a polysiloxane.

Aspect 63. The foam article of any one of Aspect 41-Aspect 62, wherein the one or more polymers comprise a vinyl polymer.

Aspect 64. The foam article of Aspect 63, wherein the vinyl polymer is a polyvinyl chloride (PVC), a polyvinyl acetate, a polyvinyl alcohol, or combinations thereof.

Aspect 65. The foam article of any one of Aspect 41-Aspect 64, wherein the one or more polymers comprise a polystyrene.

Aspect 66. The foam article of Aspect 65, wherein the polystyrene comprises a styrene copolymer.

Aspect 67. The foam article of Aspect 66, wherein the styrene copolymer comprises a acrylonitrile butadiene styrene (ABS) copolymer, a styrene acrylonitrile (SAN) copolymer, a styrene butadiene styrene (SBS) copolymer, a styrene ethylene butadiene styrene (SEBS) copolymer, a styrene ethylene propylene styrene (SEPS) copolymer, or combinations thereof.

Aspect 68. The foam article of any one of Aspect 41-Aspect 67, wherein the one or more polymers comprise a polyamide (PA).

Aspect 69. The foam article of Aspect 68, wherein the polyamide comprises a PA 6, PA 66, PA 11, a copolymer thereof, or mixtures thereof.

Aspect 70. The foam article of any one of Aspect 41-Aspect 69, wherein the one or more polymers comprise a polyester.

Aspect 71. The foam article of Aspect 70, wherein the polyester comprises an aliphatic polyester homopolymer, an aliphatic polyester copolymer, or mixtures thereof.

Aspect 72. The foam article of Aspect 71, wherein the polyester comprises a polyglycolic acid, a polylactic acid, a polycaprolactone, a polyhydroxybutyrate, a derivative thereof, or mixtures thereof.

Aspect 73. The foam article of Aspect 72, wherein the polyester comprises a semi-aromatic copolymer.

Aspect 74. The foam article of Aspect 73, wherein the semi-aromatic copolymer comprises a polyethylene terephthalate (PET), a polybutylene terephthalate (PBT), a derivative thereof, or mixtures thereof.

Aspect 75. The foam article of any one of Aspect 41-Aspect 74, wherein the one or more polymers comprise a polyether.

Aspect 76. The foam article of Aspect 75, wherein the polyether comprises a polyethylene glycol, a polypropylene glycol, copolymers thereof, derivatives thereof, or mixtures thereof.

Aspect 77. The foam article of any one of Aspect 41-Aspect 76, wherein the one or more polymers comprise a polyurethane.

Aspect 78. The foam article of Aspect 77, wherein the polyurethane comprises an aromatic polyurethane derived from an aromatic isocyanate.

Aspect 79. The foam article of Aspect 78, wherein the aromatic isocyanate comprises a diphenylmethane diisocyanate (MDI), a toluene diisocyanate (TDI), or mixtures thereof.

Aspect 80. The foam article of Aspect 77, wherein the polyurethane comprises an aliphatic polyurethane derived from an aliphatic isocyanate.

Aspect 81. The foam article of Aspect 80, wherein the aliphatic isocyanate comprises a hexamethylene diisocyanate (HDI), isophone diisocyanate (IPDI), or mixtures thereof.

Aspect 82. The foam article of any one Aspect 78-Aspect 81, wherein the polyurethane comprises a mixture of an aromatic polyurethane and an aliphatic polyurethane.

Aspect 83. The foam article of any one of Aspect 41-Aspect 82, wherein the one or more polymers comprise an epoxy polymer.

Aspect 84. The foam article of any one of Aspect 41-Aspect 83, wherein the one or more polymers comprise one or more elastomeric polymers.

Aspect 85. The foam article of any one of Aspect 41-Aspect 84, wherein the one or more polymers comprise one or more thermoplastic polymers.

Aspect 86. The foam article of any one of Aspect 41-Aspect 85, wherein the one or more polymers comprise one or more thermoplastic elastomeric polymers.

Aspect 87. The foam article of any one of Aspect 41-Aspect 86, wherein the elastomeric material comprises cross-linked polymers.

Aspect 88. The foam article of any one of Aspect 41-Aspect 87, wherein the elastomeric material further comprises one or more fillers.

Aspect 89. The foam article of Aspect 88, wherein the filler comprises glass fibers, powdered glass, modified silica, natural silica, calcium carbonate, mica, paper, cellulosic material, wood chips, modified clays, natural clays, modified synthetic clays, unmodified synthetic clays, talc, or combinations thereof.

Aspect 90. The foam article of any one of Aspect 1-Aspect 89, wherein the foam article has a density of about 0.10 grams per cubic centimeter to about 0.35 grams per cubic centimeter; or about 0.15 grams per cubic centimeter to about 0.30 grams per cubic centimeter; or about 0.15 grams per cubic centimeter to about 0.25 grams per cubic centimeter; or about 0.15 grams per cubic centimeter to about 0.20 grams per cubic centimeter; or about 0.20 grams per cubic centimeter to about 0.30 grams per cubic centimeter.

Aspect 91. The foam article of any one of Aspect 1-Aspect 90, wherein the foam article comprise cells having an average length in the longest dimension of about 10 micrometer to about 2000 micrometer.

Aspect 92. The foam article of any one of Aspect 1-Aspect 91, wherein the foam article is a cushioning element.

Aspect 93. The foam article of Aspect 92, wherein the cushioning element is configured to have a majority of force applied in a first direction during use; and wherein the first axis is parallel to the first direction.

Aspect 94. The foam article of Aspect 92 or Aspect 93, wherein the cushioning element is for apparel, footwear, or sporting equipment.

Aspect 95. The foam article of any one of Aspect 92-Aspect 94, wherein the cushioning element is for footwear.

Aspect 96. The foam article of Aspect 95, wherein the cushioning element for footwear comprises a midsole.

Aspect 97. The foam article of Aspect 95, wherein the cushioning element for footwear comprises a sockliner.

Aspect 98. The foam article of article of Aspect 92, wherein an x-y plane comprises a plane comprising the second axis and the third axis; wherein the second axis is oriented from a heel edge to a toe edge of the midsole and the third axis is oriented from a left lateral edge to a right lateral edge of the midsole; wherein the first axis is oriented perpendicular to a ground-facing portion of the midsole; and wherein the x-y plane is parallel to the ground-facing portion of the midsole.

Aspect 99. An article comprising the foam article of any one of Aspect 1-Aspect 98.

Aspect 100. The article of Aspect 99, wherein the article is an article of footwear, a component of an article of footwear, an article of apparel, a component of an article of apparel, an article of sporting equipment, or a component of an article of sporting equipment.

Aspect 101. The article of Aspect 100, wherein the article is an article of footwear.

Aspect 102. The article of Aspect 101, wherein the article of footwear is a shoe, a boot, or a sandal.

Aspect 103. The article of Aspect 102, wherein the article of footwear is a shoe.

Aspect 104. The article of Aspect 103, wherein the shoe is an athletic shoe.

Aspect 105. The article of Aspect 104, wherein the athletic shoe is a baseball shoe, a basketball shoe, a soccer shoe, a football shoe, a running shoe, a cross-trainer shoe, a track shoe, or a golf shoe.

Aspect 106. The article of Aspect 100, wherein the article is a component of an article of footwear.

Aspect 107. The article of Aspect 106, wherein the component of an article of footwear is a cushioning element.

Aspect 108. The article of Aspect 107, wherein the cushioning element is configured to have a majority of force applied in a first direction during use; and wherein the first axis is parallel to the first direction.

Aspect 109. The article of Aspect 107 or Aspect 108, wherein the cushioning element for footwear comprises a midsole.

Aspect 110. The article of Aspect 107 or Aspect 108, wherein the cushioning element for footwear comprises a sockliner.

Aspect 111. The article of Aspect 100, wherein the article is an article of sporting equipment or a component of an article of sporting equipment.

Aspect 112. The article of Aspect 111, wherein the article is a component of an article of sporting equipment.

Aspect 113. The article of Aspect 112, where the component of an article of sporting equipment is a cushioning element.

Aspect 114. The article of Aspect 112 or Aspect 113, wherein the component of an article of sporting equipment selected from the group including a component of a hat, a component of a bag, a component of a ball, and a component of protective equipment.

Aspect 115. The article of Aspect 100, wherein the article is a component of an article of apparel.

Aspect 116. The article of Aspect 115, wherein the component of an article of apparel is a cushioning element.

Aspect 117. A method of making a compression molded foam article, the method comprising: arranging a preform in a compression mold; wherein the preform comprises a polymeric foam material having a closed cell foam structure; wherein the preform is associated with a preform x-axis, y-axis, and z-axis such that each axis is perpendicular to the other two; wherein the preform has a preform longitudinal dimension parallel to the preform y-axis of a preform x-y plan; wherein the preform z-axis is parallel to the direction of compression applied to the compression mold; wherein the preform has a preform height that is a dimension parallel to the preform z-axis; wherein the preform has an initial preform height equal to the preform height prior to compression molding; wherein the preform has a preform area comprising an area of a preform x-y plane; and wherein the preform has an initial preform area that is the preform area prior to compression molding; wherein the compression mold comprises a mold cavity; and wherein the mold cavity is associated with a mold cavity x-axis, y-axis, and z-axis such that each axis is perpendicular to the other two; wherein the mold cavity has a mold cavity longitudinal dimension parallel to the mold cavity y-axis of a mold cavity x-y plane; wherein the mold cavity z-axis is parallel to the direction of compression applied to the compression mold; wherein the mold cavity has a mold cavity height that is a dimension parallel to the preform z-axis when the mold is closed;

wherein the mold cavity has a mold cavity area corresponding to an area of a mold cavity bottom; and wherein the mold cavity bottom is a mold cavity x-y plane opposite a mold cavity opening; wherein the initial preform area is less than about 95 percent the mold cavity area; wherein the arranging comprises aligning the preform x-axis, y-axis, and z-axis with the mold cavity x-axis, y-axis, and z-axis; and wherein the initial preform height is from about 1.1- to about 5-fold greater than the mold cavity height; closing the compression mold and compressing the preform into a closed mold cavity; applying heat, pressure, or a combination of both to the closed mold cavity for a duration of time to: (a) alter at least one preform dimension in the preform x-axis, y-axis, and z-axis; and (b) alter the closed cell foam structure to a closed cell foam structure having a greater proportion of anisotropic cell shapes; opening the compression mold after the least one preform dimension in the preform x-axis, y-axis, and z-axis and the closed cell foam structure are altered; removing the compression molded foam article from the compression mold; and forming the compression molded foam article; wherein the compression molded foam article retains dimensions of the closed mold cavity within about plus or minus 50 percent; and wherein the compression molded foam article has a closed cell foam structure having a greater proportion of closed cells with anisotropic cell shapes as compared to the preform closed cell foam structure, or having substantially the same proportion of closed cells with the anisotropic cells shapes as compared to the preform, where an average aspect ratio of the proportion of the closed cells with the anisotropic cell shapes is greater as comparted to the preform, or both the proportion and the aspect ratio of closed cells with the anisotropic cell shapes are greater in the foam structure of the compression molded foam article as compared to the foam structure of the preform.

Aspect 118. The method of Aspect 116, wherein a region of the compression molded foam article includes the greater proportion of closed cells with the anisotropic cell shapes, or includes the closed cells with the greater aspect ratio, or both, and the region occupies at least 1 cubic centimeter, or at least 3 cubic centimeters, or at least 5 cubic centimeters of a total volume of the compression molded foam article, and wherein the region does not include an external skin of foam article.

Aspect 119. The method of Aspect 116 or Aspect 118, wherein the initial preform area is a percent of the cavity area that is less than about 90 percent; or about 85 percent; or about 75 percent; or than about 70 percent; or about 65 percent; or about 60 percent; or about 50 percent; or about 40 percent.

Aspect 120. The method of any of one of Aspect 116-Aspect 119 wherein the compression molded foam article retains dimensions of the closed mold cavity within about plus or minus 45 percent; or about plus or minus 30 percent; or about plus or minus 25 percent; or about plus or minus 20 percent; or about plus or minus 15 percent; or about plus or minus 10 percent.

Aspect 121. The method of any of one of Aspect 116-Aspect 120, wherein the compressing the preform into the closed mold cavity comprises compressing the preform until a final preform height and a final preform area are reached; wherein the final preform height is the preform height when it is about equal to the mold cavity height; and wherein the final preform area is the preform area when it is about equal to the mold cavity area.

Aspect 122. The method of any of one of Aspect 116-Aspect 121, wherein the mold cavity area is an average mold cavity area representing an average of a first mold cavity area, a second mold cavity area, and a third mold cavity area; wherein the first mold cavity area, the second mold cavity area, and the third mold cavity area are each an area of an independent x-y plane located perpendicular to an axis parallel to a direction in which the compression is applied during compression molding; and wherein the x-y planes are distributed evenly the axis parallel to a direction in which the compression is applied during compression molding.

Aspect 123. The method of any of one of Aspect 116-Aspect 122, wherein the initial preform area is an average initial preform area representing an average of a first initial preform area, a second initial preform area, and a third initial preform area; and wherein the first initial preform area, the second initial preform area, and the third initial preform cavity area are each an area of an independent x-y plane located perpendicular to an axis parallel to a direction in which the compression is applied during compression molding; and wherein the x-y planes are distributed evenly the axis parallel to a direction in which the compression is applied during compression molding.

Aspect 124. The method of any of one of Aspect 116-Aspect 123, wherein the final preform area is an average final preform area representing an average of a first final preform area, a second final preform area, and a third final preform area; and wherein the first final preform area, the second final preform area, and the third final preform cavity area are each an area of an independent x-y plane located perpendicular to an axis parallel to a direction in which the compression is applied during compression molding; and wherein the x-y planes are distributed evenly the axis parallel to a direction in which the compression is applied during compression molding.

Aspect 125. The method of any of one of Aspect 116-Aspect 124, further comprising compressing the preform until a compression ratio of about 1.2 to about 4.0 is achieved; wherein the compression ratio is a ratio of initial preform height to mold cavity depth; wherein the initial preform height is an average height of the preform determined along an axis oriented parallel to the direction in which the compression is applied during compression molding before compression molding; wherein the initial preform height is determined prior to compression molding; and wherein the mold cavity depth is the average depth of the cavity determined along an axis oriented parallel to the direction in which the compression is applied during compression molding.

Aspect 126. The method of any of one of Aspect 116-Aspect 125, wherein the polymeric material of the preform comprises an elastomeric material.

Aspect 127. The method of any of one of Aspect 116-Aspect 126, wherein the preform has a closed cell foam structure that is substantially isotropic.

Aspect 128. The method of any of one of Aspect 116-Aspect 126, wherein the preform has a closed cell foam structure that is less than about 30% anisotropic.

Aspect 129. The method of Aspect 128, wherein the preform has a closed cell foam structure that is less than about 20% anisotropic.

Aspect 130. The method of Aspect 128, wherein the preform has a closed cell foam structure that is less than about 10% anisotropic.

Aspect 131. The method of any of one of Aspect 116-Aspect 130, wherein the compression molded foam article has a closed cell foam structure that is substantially anisotropic.

Aspect 132. The method of any of one of Aspect 116-Aspect 131, further comprising crosslinking the polymeric material of the preform while the preform is in the closed mold.

Aspect 133. The method of Aspect 132, wherein the crosslinking the polymeric material of the preform comprises adding a crosslinking agent prior to the closing the compression mold and compressing the preform into a closed mold cavity.

Aspect 134. The method of any of one of Aspect 116-Aspect 131, further comprising increasing crosslinking of the polymeric material of the preform while the preform is in the closed mold.

Aspect 135. The method of any of one of Aspect 116-Aspect 132, wherein the compression molded foam article comprises an elastomeric material.

Aspect 136. The method of Aspect 135, wherein the elastomeric material of the compression molded foam article and the polymeric material of the foam preform are compositionally the same.

Aspect 137. A method of making a compression molded foam article, the method comprising: arranging a preform in a compression mold; wherein the preform comprises a polymeric material having a closed cell foam structure; wherein the preform is associated with a preform x-axis, y-axis, and z-axis such that each axis is perpendicular to the other two; wherein the preform has a preform longitudinal dimension parallel to the preform y-axis of a preform x-y plan; wherein the preform z-axis is parallel to the direction of compression applied to the compression mold; wherein the preform has a plurality of initial preform widths; wherein each initial preform width of the plurality of initial preform widths is designated as $IPW_1$; wherein i is an integer having a value of 1 to 100; and wherein each $IPW_1$ has a dimension parallel to the preform x-axis of the preform x-y plane at a position, $Y_i$, along the preform longitudinal dimension prior to compression molding; wherein the preform has a preform height; wherein the preform height is a dimension parallel to the preform z-axis; and wherein the initial preform height is the preform height prior to compression molding; wherein the compression mold comprises a mold cavity associated with a mold cavity x-axis, y-axis, and z-axis such that each axis is perpendicular to the other two; wherein the mold cavity has a longitudinal dimension parallel to the mold cavity y-axis of a mold cavity x-y plane; wherein the mold cavity z-axis is parallel to the direction of compression applied to the compression mold; wherein the mold cavity has a plurality of mold cavity widths; wherein each mold cavity width of the plurality of mold cavity widths is designated as CM wherein j is an integer having a value of 1 to 100; wherein each $CW_1$ has a dimension parallel to the mold cavity x-axis of the mold cavity x-y plane of the preform at a position, $P_j$, along the mold cavity longitudinal dimension; wherein the mold cavity has a mold cavity height that is a dimension parallel to the preform z-axis when the mold is closed; wherein the arranging comprises aligning the preform x-axis, y-axis, and z-axis with the mold cavity x-axis, y-axis, and z-axis; wherein each $P_i$ is associated with a corresponding position of the preform longitudinal dimension when the preform y-axis and the mold cavity y-axis are aligned; wherein the initial preform height is from about 1.1- to about 5-fold greater than the mold cavity height; wherein the preform and the mold cavity are associated with a plurality of mold gaps; wherein each mold gap of the plurality of mold gaps is designated as $MG_k$; wherein k is an integer having a value of 1 to 100; wherein each $MG_k$ is obtained from the following equation:

$$MG_k = \frac{CW_j - IPW_i}{CW_j}$$

and wherein each mold gap is independently from about 0.1 to about 0.7; closing the compression mold and compressing the preform into a closed mold cavity; applying heat, pressure, or a combination of both to the closed mold cavity for a duration of time to: (a) alter at least one preform dimension in the preform x-axis, y-axis, and z-axis; and (b) alter the closed cell foam structure of the preform to having a greater proportion of anisotropic cell shape; opening the compression mold after the least one preform dimension in the preform x-axis, y-axis, and z-axis and the closed cell foam structure are altered; removing the compression molded foam article from the compression mold; and forming a compression molded foam article; wherein the compression molded foam article retains dimensions of the closed mold cavity within about plus or minus 50 percent; and wherein the compression molded foam article has a closed cell foam structure having a greater proportion of closed cells with anisotropic cell shapes as compared to the preform closed cell foam structure, or having substantially the same proportion of closed cells with the anisotropic cells shapes as compared to the preform, where an average aspect ratio of the proportion of the closed cells with the anisotropic cell shapes is greater as comparted to the preform, or both the proportion and the aspect ratio of closed cells with the anisotropic cell shapes are greater in the foam structure of the compression molded foam article as compared to the foam structure of the preform.

Aspect 138. The method of Aspect 137, wherein a region of the compression molded foam article includes the greater proportion of closed cells with the anisotropic cell shapes, or includes the closed cells with the greater aspect ratio, or both, and the region occupies at least 1 cubic centimeter, or at least 3 cubic centimeters, or at least 5 cubic centimeters of a total volume of the compression molded foam article, and wherein the region does not include an external skin of foam article.

Aspect 139. The method of Aspect 137, wherein each mold gap, MGk, is independently from about 0.125 to about 0.625; or about 0.150 to about 0.625; 0.200 to about 0.625; 0.225 to about 0.625; or 0.250 to about 0.625; or 0.300 to about 0.625; or 0.325 to about 0.625; or 0.400 to about 0.625; or 0.500 to about 0.625.

Aspect 140. The method of any of one of Aspect 137-Aspect 139, wherein the plurality of mold gaps comprise a mold gap, MGk, having a value that is about equal to a value of a mold gap, MGk+1, a value that is independently different from a value of a mold gap, MGk+1, or combinations thereof.

Aspect 141. The method of any of one of Aspect 137-Aspect 140, wherein the plurality of mold gaps comprise individual mold gaps that are independently different from one another, substantially equal to one another, or combinations thereof.

Aspect 142. The method of any of one of Aspect 137-Aspect 141, wherein each MGk can independently have a different value.

Aspect 143. The method of any of one of Aspect 137-Aspect 142, wherein each MGk is about the same value.

Aspect 144. The method of any of one of Aspect 137-Aspect 143, wherein the compressing the preform into the closed mold cavity comprises compressing the preform until a final preform height and a plurality of final preform widths is reached; wherein the final preform height is the preform height when it is about equal to the mold cavity height; wherein each final preform width of the plurality of final preform widths is designated as FPWi; wherein i is an integer having a value of 1 to m; wherein each FPWi has a dimension parallel to an x-axis of the x-y plane of the preform at a position, Yi, along the preform longitudinal dimension; and wherein the plurality of final preform widths is reached when each FPWi is about equal to each corresponding $CW_1$.

Aspect 145. The method of any of one of Aspect 137-Aspect 144, further comprising compressing the preform until a compression ratio of about 1.2 to about 4.0 is achieved; wherein the compression ratio is a ratio of average initial preform height to average mold cavity depth; wherein the average initial preform height is an average height of the preform determined along an axis oriented parallel to the direction in which the compression is applied during compression molding before compression molding; wherein the average initial preform height is determined prior to compression molding; and wherein the mold cavity depth is the average depth of the cavity determined along an axis oriented parallel to the direction in which the compression is applied during compression molding.

Aspect 146. The method of any of one of Aspect 137-Aspect 145, wherein the polymeric material of the preform comprises an elastomeric material.

Aspect 147. The method of any of one of Aspect 137-Aspect 146, wherein the preform has a closed cell foam structure that is substantially isotropic.

Aspect 148. The method of any of one of Aspect 137-Aspect 147, wherein the compression molded foam article has a closed cell foam structure that is a substantially anisotropic.

Aspect 149. The method of any of one of Aspect 137-Aspect 148, further comprising crosslinking the polymeric material of the preform while the preform is in the closed mold.

Aspect 150. The method of Aspect 149, wherein the crosslinking the polymeric material of the preform comprises adding a crosslinking agent prior to the closing the compression mold and compressing the preform into a closed mold cavity.

Aspect 151. The method of any of one of Aspect 137-Aspect 150, further comprising increasing crosslinking of the polymeric material of the preform while the preform is in the closed mold.

Aspect 152. The method of any of one of Aspect 137-Aspect 151, wherein the compression molded foam article comprises an elastomeric material.

Aspect 153. The method of Aspect 152, wherein the elastomeric material of the compression molded foam article and the polymeric material of the foam preform are compositionally the same.

Aspect 154. A method of making a compression molded foam article, the method comprising: arranging a preform in a compression mold; wherein the preform comprises a polymeric material having a closed cell foam structure; wherein the preform is associated with a preform x-axis, y-axis, and z-axis such that each axis is perpendicular to the other two; wherein the preform has a preform longitudinal dimension parallel to the preform y-axis of a preform x-y plan; wherein the preform z-axis is parallel to the direction of compression applied to the compression mold; wherein the preform has a preform height that is a dimension parallel to the preform z-axis; wherein the preform has an initial preform height equal to the preform height prior to compression molding; wherein the preform has a preform volume; and wherein the preform has an initial preform volume that is the preform volume prior to compression molding; wherein the compression mold comprises a mold cavity; and wherein the mold cavity is associated with a mold cavity x-axis, y-axis, and z-axis such that each axis is perpendicular to the other two; wherein the mold cavity has a longitudinal dimension parallel to the mold cavity y-axis of a mold cavity x-y plane; wherein the mold cavity z-axis is parallel to the direction of compression applied to the compression mold; wherein the mold cavity has a mold cavity height that is a dimension parallel to the preform z-axis when the mold is closed; wherein the mold cavity has a mold cavity volume associated with the mold when it is closed; wherein the arranging comprises aligning the preform x-axis, y-axis, and z-axis with the mold cavity x-axis, y-axis, and z-axis; wherein the initial preform height is from about 1.1- to about 5-fold greater than the mold cavity height; wherein less than about 90 percent of the mold cavity volume is occupied by the preform; and wherein at least 30 percent of the initial preform volume is positioned outside the mold cavity; closing the compression mold and compressing the preform into a closed mold cavity; applying heat, pressure, or a combination of both to the closed mold cavity for a duration of time to: (a) alter at least one preform dimension in the preform x-axis, y-axis, and z-axis; and (b) alter the closed cell foam structure of the preform to having a greater proportion of anisotropic cell shape; opening the compression mold after the least one preform dimension in the preform x-axis, y-axis, and z-axis and the closed cell foam structure are altered; removing the compression molded foam article from the compression mold; and forming a compression molded foam article; wherein the compression molded foam article retains dimensions of the closed mold cavity within about plus or minus 50 percent; and wherein the compression molded foam article has a closed cell foam structure having a greater proportion of closed cells with anisotropic cell shapes as compared to the preform closed cell foam structure, or having substantially the same proportion of closed cells with the anisotropic cells shapes as compared to the preform, where an average aspect ratio of the proportion of the closed cells with the anisotropic cell shapes is greater as comparted to the preform, or both the proportion and the aspect ratio of closed cells with the anisotropic cell shapes are greater in the foam structure of the compression molded foam article as compared to the foam structure of the preform.

Aspect 155. The method of Aspect 153, wherein a region of the compression molded foam article includes the greater proportion of closed cells with the anisotropic cell shapes, or includes the closed cells with the greater aspect ratio, or both, and the region occupies at least 1 cubic centimeter, or at least 3 cubic centimeters, or at least 5 cubic centimeters of a total volume of the compression molded foam article, and wherein the region does not include an external skin of foam article.

Aspect 156. The method of Aspect 154 or Aspect 155, wherein the polymeric material of the preform comprises an elastomeric material.

Aspect 157. The method of any of Aspect 154-Aspect 157, wherein the preform has a closed cell foam structure that is substantially isotropic.

Aspect 158. The method of any of one of Aspect 154-Aspect 157, wherein the compression molded foam article has a closed cell foam structure that is a substantially anisotropic.

Aspect 159. The method of any of one of Aspect 154-Aspect 158, further comprising crosslinking the polymeric material of the preform while the preform is in the closed mold.

Aspect 160. The method of Aspect 159, wherein the crosslinking the polymeric material of the preform comprises adding a crosslinking agent prior to the closing the compression mold and compressing the preform into a closed mold cavity.

Aspect 161. The method of any of one of Aspect 154-Aspect 160, further comprising increasing crosslinking of the polymeric material of the preform while the preform is in the closed mold.

Aspect 162. The method of any of one of Aspect 154-Aspect 161, wherein the compression molded foam article comprises an elastomeric material.

Aspect 163. The method of any of one of Aspect 154-Aspect 162, wherein less than about 85 percent of the mold cavity volume is occupied by the preform; and wherein at least 45 percent of the initial preform volume is positioned outside the mold cavity.

Aspect 164. The method of any of one of Aspect 154-Aspect 162, wherein less than about 80 percent of the mold cavity volume is occupied by the preform; and wherein at least 50 percent of the initial preform volume is positioned outside the mold cavity.

Aspect 165. The method of any of one of Aspect 154-Aspect 162, wherein less than about 70 percent of the mold cavity volume is occupied by the preform; and wherein at least 55 percent of the initial preform volume is positioned outside the mold cavity.

Aspect 166. The method of any of one of Aspect 154-Aspect 162, wherein less than about 65 percent of the mold cavity volume is occupied by the preform; and wherein at least 60 percent of the initial preform volume is positioned outside the mold cavity.

Aspect 167. The method of any of one of Aspect 154-Aspect 162, wherein less than about 50 percent of the mold cavity volume is occupied by the preform; and wherein at least 65 percent of the initial preform volume is positioned outside the mold cavity.

Aspect 168. The method of any of one of Aspect 154-Aspect 162, wherein less than about 40 percent of the mold cavity volume is occupied by the preform; and wherein at least 75 percent of the initial preform volume is positioned outside the mold cavity.

Aspect 169. The method of any of one of Aspect 154-Aspect 168, wherein the compressing the preform into the closed mold cavity comprises compressing the preform until a final preform height and a final preform volume are reached; wherein the final preform height is the preform height when it is about equal to the mold cavity height; and wherein the final preform volume is the preform volume when it is about equal to the mold cavity volume.

Aspect 170. The method of any of one of Aspect 154-Aspect 169, wherein the applying heat comprises monitoring a core temperature of the preform and a side temperature of the preform; wherein the core temperature of the preform is a temperature determined at a geometric center plus or minus 20 percent of the preform; wherein the side temperature is a temperature of the preform determined at an outer edge plus or minus 20 percent of the preform; wherein the applying heat is continued until a target core temperature is reached; and wherein the target core temperature is the core temperature of the preform is plus or minus 35 degrees Celsius of the side temperature of the preform.

Aspect 171. The method of Aspect 170, wherein the target core temperature is the core temperature of the preform is plus or minus 30 degrees Celsius; or plus or minus 25 degrees Celsius; or plus or minus 20 degrees Celsius; or plus or minus 15 degrees Celsius; or is plus or minus 10 degrees Celsius of the side temperature of the preform.

Aspect 172. The method of any of one of Aspect 154-Aspect 171, wherein the target core temperature is about 100 degrees Celsius to about 250 degrees Celsius; or about 100 degrees Celsius to about 180 degrees Celsius; or about 125 degrees Celsius to about 180 degrees Celsius; or about 150 degrees Celsius to about 180 degrees Celsius; or about 110 degrees Celsius to about 170 degrees Celsius; or about 115 degrees Celsius to about 165 degrees Celsius; or about 120 degrees Celsius to about 160 degrees Celsius; or about 125 degrees Celsius to about 155 degrees Celsius; or about 125 degrees Celsius to about 150 degrees Celsius; or about 125 degrees Celsius to about 145 degrees Celsius.

Aspect 173. The method of any of one of Aspect 153-Aspect 172, wherein the applying the heat comprises maintaining the target core temperature for a target core temperature time.

Aspect 174. The method of Aspect 173, wherein the target core temperature time is sufficient that the polymeric material is flowable; and wherein the compression molded foam article retains dimensions of the closed mold cavity within about plus or minus 50 percent.

Aspect 175. The method of Aspect 173, wherein the target core temperature time is sufficient that the polymeric material to flow and fill the mold cavity; and wherein the compression molded foam article retains dimensions of the closed mold cavity within about plus or minus 50 percent.

Aspect 176. The method of Aspect 173, wherein the target core temperature time is from about 1 sec to about 100 minutes.

Aspect 177. The method of Aspect 176, wherein the target core temperature is from about 130 degrees Celsius to about 180 degrees Celsius; and wherein the target core temperature time is from about 1 minutes to about 10 minutes; or about 2 minutes to about 9 minutes; or about 2 minutes to about 8 minutes; or about 3 minutes to about 10 minutes; or about 3 minutes to about 9 minutes; or about 3 minutes to about 8 minutes.

Aspect 178. The method of any one of Aspect 170-Aspect 177, further comprising cooling the mold after applying heat, pressure, or a combination of both to the closed mold cavity.

Aspect 179. The method of Aspect 178, wherein cooling comprises lowering the target core temperature until the finished compression molded foam article retains the dimensions of the mold when it is closed to about plus or minus 10 percent.

Aspect 180. The method of Aspect 178, wherein cooling comprises lowering the target core temperature by at least about 10 degrees Celsius; or at least about 20 degrees Celsius; or at least about 30 degrees Celsius.

Aspect 181. The method of Aspect 178, wherein cooling comprises lowering the target core temperature from about 10 degrees Celsius to about 100 degrees Celsius; or about 30 degrees Celsius to about 100 degrees Celsius; or about 50 degrees Celsius to about 100 degrees Celsius; or about 10 degrees Celsius to about 20 degrees Celsius; or about 10 degrees Celsius to about 30 degrees Celsius; or about 10 degrees Celsius to about 50 degrees Celsius.

Aspect 182. The method of any of one of Aspect 117-Aspect 181, wherein the greater proportion of cells having an anisotropic cell shape compared to the preform is based on weight.

Aspect 183. The method of Aspect 182, wherein the compression molded foam article has a compression molded foam article weight; and wherein the greater proportion of cells having an anisotropic cell shape comprise a percent of the compression molded foam article weight that is from about 10 percent to about 100 percent; or about 20 percent to about 100 percent; or about 30 percent to about 100 percent; or about 40 percent to about 100 percent; or about 50 percent to about 100 percent; or about 60 percent to about 100 percent; or about 70 percent to about 100 percent; or about 80 percent to about 100 percent; or about 90 percent to about 100 percent; or about 10 percent to about 90 percent; or about 20 percent to about 90 percent; or about 30 percent to about 90 percent; or about 40 percent to about 90 percent; or about 50 percent to about 90 percent; or about 60 percent to about 90 percent; or about 70 percent to about 90 percent; or about 80 percent to about 90 percent.

Aspect 184. The method of any of one of Aspect 117-Aspect 181, wherein the greater proportion of cells having an anisotropic cell shape compared to the preform is based on volume.

Aspect 185. The method of Aspect 184, wherein the compression molded foam article has a compression molded foam article volume; and wherein the greater proportion of cells having an anisotropic cell shape comprise a percent of the compression molded foam article volume that is from about 10 percent to about 100 percent; or about 20 percent to about 100 percent; or about 30 percent to about 100 percent; or about 40 percent to about 100 percent; or about 50 percent to about 100 percent; or about 60 percent to about 100 percent; or about 70 percent to about 100 percent; or about 80 percent to about 100 percent; or about 90 percent to about 100 percent; or 10 percent to about 90 percent; or about 20 percent to about 90 percent; or about 30 percent to about 90 percent; or about 40 percent to about 90 percent; or about 50 percent to about 90 percent; or about 60 percent to about 90 percent; or 70 percent to about 90 percent; or about 80 percent to about 90 percent.

Aspect 186. The method of any of one of Aspect 117-Aspect 181, wherein the greater proportion of cells having an anisotropic cell shape compared to the preform is based on cell number.

Aspect 187. The method of Aspect 186, wherein the compression molded foam article has a compression molded foam article cell number representing a total number of closed cells contained within the compression molded foam article; and wherein the greater proportion of cells having an anisotropic cell shape comprise a percent of the compression molded foam article cell number that is from about 10 percent to about 100 percent; or about 30 percent to about 100 percent; about 40 percent to about 100 percent; or about 50 percent to about 100 percent; or about 60 percent to about 100 percent; or about 70 percent to about 100 percent; or about 80 percent to about 100 percent; or about 90 percent to about 100 percent; or about 10 percent to about 90 percent; or about 20 percent to about 90 percent; or about 30 percent to about 90 percent; or about 40 percent to about 90 percent; or about 50 percent to about 90 percent; or about 60 percent to about 90 percent; or about 70 percent to about 90 percent; or about 80 percent to about 90 percent.

Aspect 188. The method of any of one of Aspect 117-Aspect 181, wherein the compression molded foam article has a compression molded foam article average height along an axis parallel to the z-axis; wherein a plurality of cells having an anisotropic shape are distributed along a percent of the foam article average height that is at least about 10 percent; or at least about 20 percent; or at least about 30 percent; or at least about 40 percent; or at least about 50 percent; or at least about 60 percent; or at least about 70 percent; or at least about 80 percent; or at least about 90 percent.

Aspect 189. The method of any of one of Aspect 117-Aspect 188, wherein the closed cell foam comprises one or more polymers.

Aspect 190. The method of Aspect 189, wherein the one or more polymers comprise one or more aliphatic polymers, aromatic polymers, or mixture of both.

Aspect 191. The method of Aspect 189 or Aspect 190, wherein the one or more polymers comprise a homopolymer, a copolymer, a terpolymer, or mixtures of thereof.

Aspect 192. The method of any one of Aspect 189-Aspect 191, wherein the one or more polymers comprise a random copolymer, a block copolymers, an alternating copolymer, a periodic copolymer, or a graft copolymer.

Aspect 193. The method of any one of Aspect 189-Aspect 192, wherein the one or more polymers comprise an elastomer.

Aspect 194. The method of any one of Aspect 189-Aspect 193, wherein the one or more polymers comprise an olefinic polymer.

Aspect 195. The method of Aspect 194, wherein the olefinic polymer is an olefinic homopolymer, an olefinic copolymer, or mixtures thereof.

Aspect 196. The method of Aspect 194 or Aspect 195, wherein the olefinic polymer comprises a polyethylene, a polypropylene, or combinations thereof.

Aspect 197. The method of any one of Aspect 194-Aspect 196, wherein the olefinic polymer comprises a polyethylene homopolymer.

Aspect 198. The method of Aspect 197, wherein the PE comprises a low density polyethylene, a high density polyethylene, a low molecular weight polyethylene, an ultra-high molecular weight polyethylene, a linear polyethylene, a branched chain polyethylene, or combinations thereof.

Aspect 199. The method of Aspect 197 or Aspect 198, wherein the polyethylene comprises an ethylene copolymer.

Aspect 200. The method of any one of Aspect 197-Aspect 199, wherein the polyethylene comprises an ethylene-vinyl acetate (EVA) copolymer, an ethylene-vinyl alcohol (EVOH) copolymer, an ethylene-ethyl acrylate copolymer, an ethylene-unsaturated mono-fatty acid copolymer, or combinations thereof.

Aspect 201. The method of any one of Aspect 189-Aspect 200, wherein the one or more polymers comprise a polyacrylate.

Aspect 202. The method of Aspect 201, wherein the polyacrylate comprises a polyacrylic acid, an ester of a polyacrylic acid, a polyacrylonitrile, a polyacrylic acetate, a polymethyl acrylate, a polyethyl acrylate, a polybutyl acrylate, a polymethyl methacrylate, a polyvinyl acetate, derivatives thereof, copolymers thereof, or any mixture thereof.

Aspect 203. The method of any one of Aspect 189-Aspect 202, wherein the one or more polymers comprise an ionomeric polymer.

Aspect 204. The method of Aspect 203, wherein the ionomeric polymer comprises a polycarboxylic acid or a derivative of a polycarboxylic acid.

Aspect 205. The method of Aspect 203 or Aspect 204, wherein the ionomeric polymer is a sodium salt, a magnesium salt, a potassium salt, or a salt of another metallic ion.

Aspect 206. The method of any one of Aspect 203-Aspect 205, wherein the ionomeric polymer comprises a fatty acid modified ionomeric polymer.

Aspect 207. The method of Aspect 203, wherein the ionomeric polymer comprises a polystyrene sulfonate, an ethylene-methacrylic acid copolymer, or mixtures thereof.

Aspect 208. The method of any one of Aspect 189-Aspect 207, wherein the one or more polymers comprise a polycarbonate.

Aspect 209. The method of any one of Aspect 189-Aspect 208, wherein the one or more polymers comprise a fluoropolymer.

Aspect 210. The method of any one of Aspect 189-Aspect 209, wherein the one or more polymers comprise a polysiloxane.

Aspect 211. The method of any one of Aspect 189-Aspect 210, wherein the one or more polymers comprise a vinyl polymer.

Aspect 212. The method of Aspect 211, wherein the vinyl polymer is a polyvinyl chloride (PVC), a polyvinyl acetate, a polyvinyl alcohol, or combinations thereof.

Aspect 213. The method of any one of Aspect 189-Aspect 212, wherein the one or more polymers comprise a polystyrene.

Aspect 214. The method of Aspect 213, wherein the polystyrene comprises a styrene copolymer.

Aspect 215. The method of Aspect 214, wherein the styrene copolymer comprises a acrylonitrile butadiene styrene (ABS) copolymer, a styrene acrylonitrile (SAN) copolymer, a styrene butadiene styrene (SBS) copolymer, a styrene ethylene butadiene styrene (SEBS) copolymer, a styrene ethylene propylene styrene (SEPS) copolymer, or combinations thereof.

Aspect 216. The method of any one of Aspect 189-Aspect 215, wherein the one or more polymers comprise a polyamide (PA).

Aspect 217. The method of Aspect 216, wherein the polyamide comprises a PA 6, PA 66, PA 11, a copolymer thereof, or mixtures thereof.

Aspect 218. The method of any one of Aspect 189-Aspect 217, wherein the one or more polymers comprise a polyester.

Aspect 219. The method of Aspect 218, wherein the polyester comprises an aliphatic polyester homopolymer, an aliphatic polyester copolymer, or mixtures thereof.

Aspect 220. The method of Aspect 219, wherein the polyester comprises a polyglycolic acid, a polylactic acid, a polycaprolactone, a polyhydroxybutyrate, a derivative thereof, or mixtures thereof.

Aspect 221. The method of Aspect 220, wherein the polyester comprises a semi-aromatic copolymer.

Aspect 222. The method of Aspect 221, wherein the semi-aromatic copolymer comprises a polyethylene terephthalate (PET), a polybutylene terephthalate (PBT), a derivative thereof, or mixtures thereof.

Aspect 223. The method of any one of Aspect 189-Aspect 222, wherein the one or more polymers comprise a polyether.

Aspect 224. The method of Aspect 223, wherein the polyether comprises a polyethylene glycol, a polypropylene glycol, copolymers thereof, derivatives thereof, or mixtures thereof.

Aspect 225. The method of any one of Aspect 189-Aspect 224, wherein the one or more polymers comprise a polyurethane.

Aspect 226. The method of Aspect 225, wherein the polyurethane comprises an aromatic polyurethane derived from an aromatic isocyanate.

Aspect 227. The method of Aspect 226, wherein the aromatic isocyanate comprises a diphenylmethane diisocyanate (MDI), a toluene diisocyanate (TDI), or mixtures thereof.

Aspect 228. The method of Aspect 225, wherein the polyurethane comprises an aliphatic polyurethane derived from an aliphatic isocyanate.

Aspect 229. The method of Aspect 228, wherein the aliphatic isocyanate comprises a hexamethylene diisocyanate (HDI), isophone diisocyanate (IPDI), or mixtures thereof.

Aspect 230. The method of Aspect 226-Aspect 229, wherein the polyurethane comprises a mixture of an aromatic polyurethane and an aliphatic polyurethane.

Aspect 231. The method of any one of Aspect 189-Aspect 230, wherein the one or more polymers comprise an epoxy polymer.

Aspect 232. The method of any one of Aspect 189-Aspect 231, wherein the one or more polymers comprise one or more elastomeric polymers.

Aspect 233. The method of any one of Aspect 189-Aspect 232, wherein the one or more polymers comprise one or more thermoplastic polymers.

Aspect 234. The method of any one of Aspect 189-Aspect 233, wherein the one or more polymers comprise one or more thermoplastic elastomeric polymers.

Aspect 235. The method of any one of Aspect 189-Aspect 234, wherein the one or more polymers further comprise cross-links.

Aspect 236. The method of any one of Aspect 189-Aspect 235, wherein the elastomeric foam cell further comprises one or more filler.

Aspect 237. The method of Aspect 236, wherein the filler comprises glass fibers, powdered glass, modified silica, natural silica, calcium carbonate, mica, paper, cellulosic material, wood chips, modified clays, natural clays, modified synthetic clays, unmodified synthetic clays, talc, or combinations thereof.

Aspect 238. The method of any one of Aspect 117-Aspect 237, wherein the initial preform height is greater than the mold cavity height by from about 1.1- to about 4-fold; or about 1.5- to about 4-fold; or about 2.0- to about 4-fold; or about 2.5- to about 4-fold; or about 3.0- to about 4-fold; or about 1.5- to about 5-fold; or about 2.0- to about 5-fold; or about 2.5- to about 5-fold; or about 3.0- to about 5-fold; or about 3.5- to about 5-fold; or about 4.0- to about 5-fold.

Aspect 239. The method of any one of Aspect 117-Aspect 238, wherein the compression molded foam article is associated with a compression molded foam article x-axis, y-axis, and z-axis such that each axis is perpendicular to the other two; wherein z-axis is parallel to a direction in which compression is applied during the compressing; wherein the x-axis and the y-axis define a plane parallel to a major surface of the compression molded foam article; wherein a physical property determined along the z-axis is different from the physical property determined along the x-axis, the y-axis, or both the x-axis and the y-axis; and wherein having an anisotropic cell shape have an average aspect ratio that is an average ratio of the y-axis to the z-axis; wherein a major axis is parallel to the y-axis; wherein a minor axis is parallel to the x-axis; and wherein the average aspect ratio is from about 1.5 to about 15.

Aspect 240. The method of Aspect 239, wherein the aspect ratio is from about 2 to about 15; or about 2.5 to about 15; or about 5 to about 15; or about 7.5 to about 15; or about 10 to about 15; or about 2 to about 10; or about 2.5 to about 10; or about 5 to about 10; or about 7.5 to about 10.

Aspect 241. The method of Aspect 239, wherein the plurality of cells having an anisotropic cell shape are aligned in an orientation along the second axis within a range of a solid angle of about plus or minus 20 degrees; or about plus or minus 15 degrees; or about plus or minus 10 degrees; or about plus or minus 5 degrees.

Aspect 242. The method of any one of Aspect 239-Aspect 241, wherein the physical property is at least one physical property.

Aspect 243. The method of any one of Aspect 239-Aspect 242, wherein the physical property is efficiency.

Aspect 244. The method of Aspect 243, wherein the efficiency in the z-axis of the compression molded foam article, when determined in accordance with Efficiency Test Method, is greater than or equal to about 5 percent; or about 15 percent; or about 20 percent; or about 25 percent; or about 30 percent; or about 35 percent; or about 40 percent; or about 45 percent; or about 50 percent; or about 55 percent; or about 60 percent; or about 65 percent; or about 65 percent; or about 70 percent; or about 75 percent; or about 80 percent; or about 82 percent; or about 84 percent; or about 86 percent; or about 88 percent; or about 89 percent; or about 90 percent; or about 91 percent; or about 92 percent; or about 93 percent; or about 94 percent; or about 95 percent; or about 96 percent; or about 97 percent; or about 98 percent; or about 99 percent; or about 100 percent; or about 150 percent; or about 200 percent; or about 250 percent; or about 300 percent; or about 350 percent; or about 400 percent; or about 450 percent; or about 500 percent; or about 600 percent; or about 700 percent; or about 800 percent; or about 900 percent; or about 1000 percent; or about 1500 percent; or about 2000 percent; or about 2100 percent; or about 2200 percent.

Aspect 245. The method of Aspect 243, wherein the efficiency in the z-axis of the compression molded foam article, when determined in accordance with Efficiency Test Method, is from about 60 percent to about 99 percent; or about 65 percent to about 99 percent; or about 70 percent to about 99 percent; or about 75 percent to about 99 percent; or about 80 percent to about 99 percent; or about 82 percent to about 99 percent; or about 84 percent to about 99 percent; or about 86 percent to about 99 percent; or about 88 percent to about 99 percent.

Aspect 246. The method of any one of Aspect 243-Aspect 245, wherein the efficiency of the compression molded foam article determined along the x-axis, the y-axis, or both the x-axis and y-axis is less than or equal to an efficiency determined along the z-axis of the compression molded foam article.

Aspect 247. The method of Aspect 246, wherein the efficiency of the compression molded foam article determined along the z-axis is at least 5 percent greater, or at least 10 percent greater, or at least 20 percent greater than the efficiency of the compression molded foam article determined along the x-axis, the y-axis, or both the x-axis and y-axis of the compression molded foam article.

Aspect 248. The method of Aspect 243, wherein a reference foam article is compression molded and comprises essentially the same polymeric material and has substantially the same density as the compression molded foam article; wherein the reference foam article has a closed cell structure that is substantially isotropic; and wherein the compression molded foam article exhibits an efficiency determined along the z-axis of the foam article greater than the reference foam article, when determined in accordance with Efficiency Test Method, by about 1.0 percent to about 50 percent; or about 2.5 percent to about 50 percent; or about 5 percent to about 50 percent; or about 7.5 percent to about 50 percent; or about 10 percent to about 50 percent; or about 12.5 percent to about 50 percent; or about 15 percent to about 50 percent; or about 17.5 percent to about 50 percent; or about 20 percent to about 50 percent greater; or about 2.5 percent to about 25 percent; or about 5 percent to about 25 percent; or about 7.5 percent to about 25 percent; or about 10 percent to about 25 percent; or about 12.5 percent to about 25 percent; or about 15 percent to about 25 percent; or about 17.5 percent to about 25 percent; or about 20 percent to about 25 percent; or about 2.5 percent to about 22.5 percent; or about 2.5 percent to about 20 percent; or about 2.5 percent to about 17.5 percent; or about 2.5 percent to about 15 percent; or about 2.5 percent to about 10 percent; or about 2.5 percent to about 7.5 percent; or about 1 percent to about 5 percent; or about 1 percent to about 7.5 percent; or about 1 percent to about 10 percent.

Aspect 249. The method of Aspect 248, wherein there is substantially no change in an efficiency determined along the x-axis, the y-axis, or both the x-axis and y-axis of the compression molded foam article compared to an efficiency determined along the x-axis, y-axis, or both the second and third axes of the reference foam article.

Aspect 250. The method of any one of Aspect 248 or Aspect 249, wherein there is a decrease in an efficiency determined along the x-axis, the y-axis, or both the x-axis and y-axis of the compression molded foam article compared to an efficiency determined along the x-axis, y-axis, or both the second and third axes of the reference foam article.

Aspect 251. The method of any one of Aspect 248-Aspect 250, wherein an efficiency of the compression molded foam article determined along the x-axis, the y-axis, or both the x-axis and y-axis is less than or equal to an efficiency determined along the z-axis of the compression molded foam article.

Aspect 252. The method of Aspect 251, wherein the efficiency of the compression molded foam article determined along the z-axis is at least 5 percent greater, or at least 10 percent greater, or at least 20 percent greater than the efficiency of the compression molded foam article determined along the x-axis, the y-axis, or both the x-axis and y-axis of the compression molded foam article.

Aspect 253. The method of any one of Aspect 239-Aspect 252, wherein the physical property is energy return.

Aspect 254. The method of any one of Aspect 253, wherein a reference foam article is compression molded and comprising essentially the same polymeric material and has substantially the same density as the compression molded foam article; wherein the reference foam article has a closed cell structure that is substantially isotropic; and wherein the compression molded foam article exhibits an energy return determined along the z-axis of the foam article greater than the reference foam article, when determined in accordance with Efficiency Test Method, by from about 1.0 percent to about 70 percent; or about 2.5 percent to about 60 percent; or about 5 percent to about 50 percent; or about 7.5 percent to about 50 percent; or about 10 percent to about 50 percent; or about 12.5 percent to about 50 percent; or about 15 percent to about 50 percent; or about 17.5 percent to about 50 percent; or about 20 percent to about 50 percent; or about 2.5 percent to about 40 percent; or about 2.5 percent to about 30 percent; or about 2.5 percent to about 25 percent; or about 2.5 percent to about 20 percent; or about 2.5 percent to about 17.5 percent; or about 2.5 percent to about 15 percent; or about 1 percent to about 40 percent; or about 1 percent to about 30 percent; or about 1 percent to about 20 percent.

Aspect 255. The method of Aspect 254, wherein an energy return of the compression molded foam article determined along the x-axis, the y-axis, or both the x-axis and y-axis is less than or equal to an energy return determined along the z-axis of the compression molded foam article.

Aspect 256. The method of Aspect 255, wherein the energy return of the compression molded foam article determined along the z-axis is at least 5 percent greater, or at least 10 percent greater, or at least 20 percent greater than the energy return of the compression molded foam article determined along the x-axis, the y-axis, or both the x-axis and y-axis of the compression molded foam article.

Aspect 257. The method of any one of Aspect 253, wherein a reference foam article is compression molded foam article and comprises essentially the same polymeric material and has substantially the same density as the compression molded foam article; wherein the reference foam article has a closed cell structure that is substantially isotropic; and wherein the compression molded foam article exhibits an energy return determined along the z-axis of the compression molded foam article having a change from an energy return in a z-axis of the reference foam article, when determined in accordance with Efficiency Test Method, from about 1.0 percent to about 70 percent; or about 2.5 percent to about 65 percent; or about 5 percent to about 55 percent; or about 7.5 percent to about 50 percent; or about 10 percent to about 45 percent; or about 12.5 percent to about 45 percent; or about 15 percent to about 45 percent; or about 17.5 percent to about 45 percent; or about 20 percent to about 45 percent; or about 2.5 percent to about 55; or about 2.5 percent to about 45 percent; or about 2.5 percent to about 40 percent; or about 2.5 percent to about 35 percent; or about 2.5 percent to about 30 percent; or about 2.5 percent to about 25 percent; or about 1 percent to about 50 percent; or about 1 percent to about 45 percent; or about 1 percent to about 40 percent.

Aspect 258. The method of Aspect 257, wherein there is substantially no change in an energy return determined along the x-axis, the y-axis, or both the x-axis and y-axis of the compression molded foam article compared to an energy return determined along the x-axis, y-axis, or both the second and third axes of the reference foam article.

Aspect 259. The method of Aspect 258, wherein there is a decrease in an energy return determined along the x-axis, the y-axis, or both the x-axis and y-axis of the compression molded foam article compared to an energy return determined along the x-axis, y-axis, or both the second and third axes of the reference foam article.

Aspect 260. The method of any one of Aspect 257-Aspect 259, wherein an energy return of the compression molded foam article determined along the x-axis, the y-axis, or both the x-axis and y-axis is less than or equal to an energy return determined along the z-axis of the compression molded foam article.

Aspect 261. The method of Aspect 260, wherein the energy return of the compression molded foam article determined along the z-axis is at least 5 percent greater, or at least 10 percent greater, or at least 20 percent greater than the energy return of the compression molded foam article determined along the x-axis, the y-axis, or both the x-axis and y-axis of the compression molded foam article.

Aspect 262. The method of any one of Aspect 239-Aspect 252, wherein the physical property is stiffness.

Aspect 263. The method of Aspect 262, wherein a plaque sample prepared from the compression molded foam article exhibits a stiffness value in the z-axis of the compression molded foam article, when determined in accordance with Efficiency Test Method, is from about 300 kilopascals to about 2000 kilopascals; or about 300 kilopascals to about 1500 kilopascal; or about 300 kilopascals to about 1000 kilopascal; or about 300 kilopascals to about 750 kilopascal.

Aspect 264. The method of Aspect 262, wherein the compression molded foam article exhibits a stiffness value in the z-axis of the foam article, when determined in accordance with Efficiency Test Method, is from about 30 newtons per millimeter to about 300 newtons per millimeter; or about 50 newtons per millimeter to about 300 newtons per millimeter; or about 100 newtons per millimeter to about 300 newtons per millimeter; or about 150 newtons per millimeter to about 300 newtons per millimeter.

Aspect 265. The method of any one of Aspect 262-Aspect 264, wherein a reference foam article is a compression molded and comprises essentially the same polymeric material and has a density that is substantially the same as the compression molded foam article; wherein the reference foam article has a substantially isotropic cell shape; and wherein the compression molded foam article exhibits a stiffness value that is that is lower than a reference foam article, when determined in accordance with Efficiency Test Method, by about 5 percent; or about 10 percent; or about 15 percent; or about 20 percent; or about 25 percent; or about 30 percent; or about 35 percent; or about 40 percent; or about 45 percent; or about 50 percent.

Aspect 266. The method of any one of Aspect 116-Aspect 265, wherein the anisotropic cell shape has an average aspect ratio that is an average ratio of the x-axis to the z-axis; wherein a major axis is parallel to the x-axis; wherein a minor axis is parallel to the z-axis; and wherein the average aspect ratio is from about 1.5 to about 15; or is from about 2 to about 15; or is from about 2.5 to about 15; or is from about 5 to about 15; or is from about 7.5 to about 15; or is from about 10 to about 15; or is from about 2 to about 10; or is from about 2.5 to about 10; or is from about 5 to about 10; or is from about 7.5 to about 10.

Aspect 267. The method of any one of Aspect 116-Aspect 266, wherein about 40 percent to about 100 percent; about 50 percent to about 90 percent; or about 60 percent to about 90 percent; or about 70 percent to about 90 percent; or about 80 percent to about 90 percent; about 90 percent to about 100 percent of the compression molded foam article comprises the anisotropic cell shape.

Aspect 268. The method of any one of Aspect 116-Aspect 267, wherein the anisotropic cell shape is ellipsoid.

Aspect 269. The method of Aspect 268, wherein the anisotropic cell shape is tri-axial ellipsoid, oblate spheroid, prolate spheroid, or mixtures thereof.

Aspect 270. The method of any one of Aspect 116-Aspect 269, wherein the foam article has a density of about 0.10 grams per cubic centimeter to about 0.35 grams per cubic centimeter; or about 0.15 grams per cubic centimeter to about 0.30 grams per cubic centimeter; or about 0.15 grams per cubic centimeter to about 0.25 grams per cubic centimeter; or about 0.15 grams per cubic centimeter to about 0.20 grams per cubic centimeter; or about 0.20 grams per cubic centimeter to about 0.30 grams per cubic centimeter.

Aspect 271. The method of any one of Aspect 116-Aspect 270, wherein the foam article comprise cells having a length in the longest dimension of about 10 micrometer to about 500 micrometer.

Aspect 272. An article comprising the foam article made by the method of any one of Aspects Aspect 116-Aspect 271.

Aspect 273. The article of Aspect 272, wherein the article is an article of footwear, a component of an article of footwear, an article of apparel, a component of an article of apparel, an article of sporting equipment, or a component of an article of sporting equipment.

Aspect 274. The article of Aspect 273, wherein the article is an article of footwear.

Aspect 275. The article of Aspect 274, wherein the article of footwear is a shoe, a boot, or a sandal.

Aspect 276. The article of Aspect 275, wherein the article of footwear is a shoe.

Aspect 277. The article of Aspect 276, wherein the shoe is an athletic shoe.

Aspect 278. The article of Aspect 277, wherein the athletic shoe is a baseball shoe, a basketball shoe, a soccer shoe, a football shoe, a running shoe, a cross-trainer shoe, a track shoe, or a golf shoe.

Aspect 279. The article of Aspect 273, wherein the article is a component of an article of footwear.

Aspect 280. The article of Aspect 279, wherein the component of an article of footwear is a cushioning element.

Aspect 281. The article of Aspect 280, wherein the cushioning element is configured to have a majority of force applied in a first direction during use; and wherein the first axis is parallel to the first direction.

Aspect 282. The article of Aspect 280 or Aspect 281, wherein the cushioning element for footwear comprises a midsole.

Aspect 283. The article of Aspect 280 or Aspect 281, wherein the cushioning element for footwear comprises a sockliner.

Aspect 284. The article of Aspect 273, wherein the article is an article of sporting equipment or a component of an article of sporting equipment.

Aspect 285. The article of Aspect 284, wherein the article is a component of an article of sporting equipment.

Aspect 286. The article of Aspect 285, where the component of an article of sporting equipment is a cushioning element.

Aspect 287. The article of Aspect 284 or Aspect 286, wherein the component of an article of sporting equipment selected from the group including a component of a hat, a component of a bag, a component of a ball, and a component of protective equipment.

Aspect 288. The article of Aspect 273, wherein the article is a component of an article of apparel.

Aspect 289. The article of Aspect 288, wherein the component of an article of apparel is a cushioning element.

Aspect 290. A foam midsole comprising: an elastomeric material having a closed cell foam structure comprising a plurality of cells having an anisotropic cell shape; wherein the plurality of cells having the anisotropic cell shape are present in a region of the foam midsole that does not include an external skin of the foam midsole, and the region occupies at least 1 cubic centimeter of a total volume of the foam midsole; wherein the foam midsole comprises a first axis, a second axis and a third axis; wherein the first axis is perpendicular to the second axis and the third axis; wherein the second axis and the third axis are each perpendicular to each other; and wherein the second and the third axis define a plane parallel to a major surface of the foam article; and wherein an efficiency of the foam midsole determined along the first axis is greater than or equal to about 60 percent when determined in accordance with Efficiency Test Method, and is at least 2 percent greater than an efficiency of the foam midsole determined along the second axis, the third axis, or both the second and third axes.

Aspect 291. The foam midsole of Aspect 290, wherein the foam midsole is a compression molded foam midsole, and the first axis is parallel to a direction in which compression is applied during a compression molding process.

Aspect 292. The foam midsole of Aspect 290 or Aspect 291, wherein the plurality of cells have an average aspect ratio that is an average ratio of the second axis to the first axis; wherein a major axis is parallel to the second axis; wherein a minor axis is parallel to the first axis; and wherein the average aspect ratio is from about 1.5 to about 15.

Aspect 293. The foam midsole of Aspect 292, wherein the average aspect ratio is from about 2 to about 10.

Aspect 294. The foam midsole of any one of Aspect 290-Aspect 293, wherein the plurality of cells having an anisotropic cell shape are dispersed throughout the foam midsole.

Aspect 295. The foam midsole of Aspect 294, wherein the plurality of cells having an anisotropic cell shape are dispersed substantially uniformly throughout a height of the foam midsole.

Aspect 296. The foam midsole of Aspect 295, wherein the foam midsole has a foam midsole average height along an axis parallel to the first axis; wherein the plurality of cells having an anisotropic shape are distributed along at least 10 percent of the foam midsole average height.

Aspect 297. The foam midsole of any one of Aspect 290-Aspect 296, wherein the plurality of cells having an anisotropic cell shape comprises from about 10 percent to about 100 percent of the foam midsole volume.

Aspect 298. The foam midsole of any one of Aspect 290-Aspect 296, wherein the plurality of cells having an anisotropic cell shape comprises from about 10 percent to about 100 percent of the foam midsole weight.

Aspect 299. The foam midsole of any one of Aspect 290-Aspect 296, wherein the plurality of cells having an anisotropic cell shape comprises from about 10 percent to about 100 percent of the foam midsole cell number.

Aspect 300. The foam midsole of any one of Aspect 290-Aspect 299, wherein the foam midsole exhibits an efficiency as determined along the first axis of the foam article of from about 1.0 percent to about 30 percent greater than a reference foam article when determined in accordance with Efficiency Test Method; wherein the reference foam article is a compression molded foam article comprising essentially the same polymeric material and having a substantially same density as the foam midsole; and wherein the reference foam article has a closed cell structure that is substantially isotropic.

Aspect 301. The foam midsole of any one of Aspect 290-Aspect 299, wherein the foam midsole exhibits an energy return as determined along the first axis of from about 1.0 percent to about 70 percent greater than a reference foam article when determined in accordance with Efficiency Test Method; wherein the reference foam article is a compression molded foam article comprising essentially the same polymeric material and having a density that is substantially the same as the foam midsole; and wherein the reference foam article has a closed cell structure that is substantially isotropic.

Aspect 302. The foam midsole of any one of Aspect 290-Aspect 301, wherein a plaque sample prepared from the foam midsole exhibits a stiffness value in the first axis of the foam article from about 300 kilopascals to about 2000 kilopascals when determined in accordance with Efficiency Test Method.

Aspect 303. The foam midsole of any one of Aspect 290-Aspect 302, wherein the foam midsole exhibits a stiffness value that is about 5 percent lower than a reference foam article when determined in accordance with Efficiency Test Method; wherein the reference foam article is a compression molded foam article comprising essentially the same polymeric material and having a density that is substantially the same as the foam midsole; and wherein the reference foam article has a substantially isotropic cell shape.

Aspect 304. The foam midsole of any one of Aspect 290-Aspect 303, wherein the polymeric material comprises one or more elastomers.

Aspect 305. The foam midsole of any one of Aspect 290-Aspect 304, wherein the polymeric material comprises one or more polyolefins.

Aspect 306. The foam midsole of any one of Aspect 290-Aspect 305, wherein the polymeric material includes an ethylene-vinyl acetate (EVA) copolymer, or a styrene polymer, or both.

Aspect 307. The foam midsole of any one of Aspect 290-Aspect 306, wherein the foam midsole has a density of about 0.10 grams per cubic centimeter to about 0.35 grams per cubic centimeter.

Aspect 308. The foam midsole of any one of Aspect 290-Aspect 307, wherein the foam midsole has an efficiency of at least 70 percent, or an energy return of at least 20 millijoules, or both, when determined in accordance with Efficiency Test Method.

Aspect 309. An article of footwear comprising the foam midsole of any one of Aspect 290-Aspect 308.

From the foregoing, it will be seen that aspects herein are well adapted to attain all the ends and objects hereinabove set forth together with other advantages which are obvious and which are inherent to the structure.

While specific elements and steps are discussed in connection to one another, it is understood that any element and/or steps provided herein is contemplated as being combinable with any other elements and/or steps regardless of explicit provision of the same while still being within the scope provided herein.

It will be understood that certain features and subcombinations are of utility and may be employed without reference to other features and subcombinations. This is contemplated by and is within the scope of the claims.

Since many possible aspects may be made without departing from the scope thereof, it is to be understood that all matter herein set forth or shown in the accompanying drawings and detailed description is to be interpreted as illustrative and not in a limiting sense.

It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

EXAMPLES

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

Example 1. Compression Testing of an Exemplary Midsole

Figure 9A:
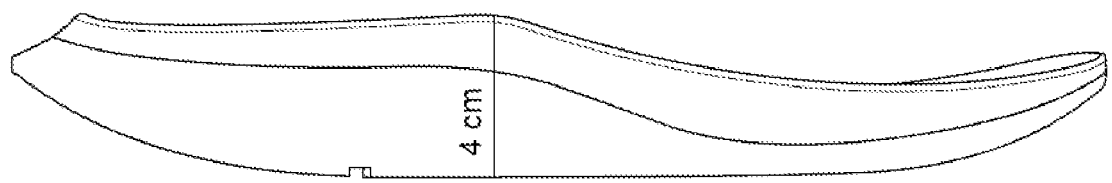
FIG. 9A shows a representative side view of a midsole such as that used to obtain the data in FIG. 7.

A Nike Pegasus 35 running shoe having a midsole comprising Nike React foam material was prepared. FIG. 9A shows a representative side view of the midsole used to obtain the data in this example. The same mold was used to mold the control midsole and the exemplary midsole. A control midsole was prepared from a foam preform which was compression molded by conventional compression molding techniques such that there was substantially no gap between the preform and mold wall and no internal gaps within the preform prior to compression molding. The exemplary midsole was prepared from a foam preform having a modified shape such that it had the same total volume as the control preform but was narrower than the control preform. The exemplary preform did not include any internal gaps. When the exemplary preform was placed in the mold cavity, a uniform mold gap was present along the midsole perimeter on both the outer and inner lateral edges. The shape of the exemplary preform was such that the mold gap was essentially ⅜ at any point along the length of the midsole perimeter and essentially no mold gap at the heel and toe ends of the preform when the exemplary preform was arranged in the mold cavity. The mold gap was calculated for any given point as follows:

$$MG = \frac{(\text{Midsole mold width} - \text{Midsole } preform \text{ width})}{(\text{Midsole mold width})}$$

The preforms were arranged in the mold cavity, the mold was closed with compression, and compression molding was carried out on the preforms in the closed mold by heating the closed mold with a platen placed in contact with the top of the mold. To monitor the temperature of the preform during the molding, a thermocouple was inserted into the center of the preform at the thickest part. Once the internal temperature reached 160 degrees C., the foam preforms were at that temperature for an additional 4 minutes. Following the molding, the closed mold was cooled before the mold was opened and the compression molded midsole removed. The compression mold machine settings were as follows: (a) temperature set to 170 degrees C.; and (b) pressure (for both hot and cold sides) set to 2000 psi. Compression molding times were as follows: (a) platen (at 160 degrees C. platen temperature) was 1410 seconds; (b) internal part (at 160 degrees C. internal temperature) was 2070 seconds; and (c) 35 degrees C. (cool down temperature, required minimum), first 1236 seconds/second 1157 seconds. Temperatures: (a) internal part at the completion of hot press cycle, first 169 degrees C./second 168.2 degrees C.; (b) machine reading at the completion of the press cycle, 174.5 degrees C. (overshoot); and (c) machine reading at the completion of cold press cycle, 7.9 degrees C.

Figure 9B:
FIG. 9B shows a photographic image showing the representative geometry and testing of a portion of the testing apparatus that contacts a midsole. The testing method and apparatus are as further described herein below and were used to obtain the data in FIG. 7.

For efficiency testing, the control and exemplary compression midsoles were compressed in the heel and forefoot using a last pressure matched to a performance runner's running stride. Compression testing was performed on an ElectroPuls E10000 using a last-shaped tupp sized to correspond to the size of the midsole being tested. Experiments were run in force control mode up to a maximum load of 600 newtons using a waveform which mirrors performance runner's footstrike force profile. The waveform employed a half period of sine wave to apply an impulse. After the impulse was complete, the midsole was left unloaded for the remainder of the cycle. The load-rest cycle was repeated for the desired number of cycles. Waveform details: pulse amplitude=600 N; pulse width=0.2 seconds; pulse shape=half period of sine wave; and rest=0.8 seconds, repeat. FIG. 9B shows a photographic image showing the testing setup used.

Briefly, 100 compressive cycles were performed at −1.1 hertz. Compressive stiffness, efficiency, and energy return are measured from these tests. Compressive stiffness for each cycle corresponds to the peak load normalized by the deflection at that max load. For foam articles such as midsoles (i.e., any non-plaque geometry) stiffness is reported in N/mm. Efficiency is the integral of the unloading load deflection curve divided by the integral of loading load deflection curve. Energy return is the integral of the unloading load deflection curve. The values reported for an individual midsole are the average of the $60^{th}$, $70^{th}$, $80^{th}$ and $90^{th}$ cycles. An example loading series of curves for one midsole are shown below. The relevant metrics are indicated on the graph where "stiff"=compressive stiffness [N/mm] "energy out"=energy return [mJ], and "eff"=efficiency. The data shown in Table 1 are the average of at least two midsoles for each condition. Representative cyclic loading for the midsole is shown in FIG. 7 (heel testing).

TABLE 1

|  | Heel |  | Forefoot |  |
| --- | --- | --- | --- | --- |
|  | Control* | MG** | Control | MG** |
| Stiffness [N/mm] | 61 | 48 | 105 | 87 |
| Energy Return [mJ] | 1420 | 1960 | 841 | 1100 |
| Efficiency | 0.735 | 0.83 | 0.73 | 0.80 |

*Control sample is a midsole prepared by conventional compression molding methods with substantially no gap between the preform and mold wall.
**MG refers to mold gap, which in the test sample was ⅜; and these data refer to the exemplary midsole of Example 1 in which the midsole was prepared with anisotropic closed cell foam structure.

Example 2. Compression Testing of an Exemplary Plaque

Compression molded foam plaques were prepared using the disclosed compression molding methods using the same mold to form a plaque foam preform comprising Nike React foam materials, e.g., foam materials as used in the midsole of a Nike Epic React Flyknit shoe. Six plaque preforms (R2-R7) were prepared having the dimensions described in Table 2 below. In particular, as listed in Table 2, each preform plaque had dimensions such that there was the indicated mold gap between each of the outside long edges of the plaque and the mold. None of the preform plaques included internal gaps, and all of the preforms had substantially the same total volume. Accordingly, specimen R2 having no gap between the plaque preform and the mold represented a control plaque sample for conventional compression molding techniques. Briefly, compression molding conditions for the plaques were as follows: (a) platen set temperature (hot side): 170 degrees Celsius; (b) plate set temperature (cold side): 8 degrees Celsius; and (c) pressure: 2000 psi (on each of the hot and cold sides). Plaques were loaded into the mold, the mold was closed, and the platens were heated to their set point. After the platens reached their setpoint, the closed mold with the plaque was left in the hot press for 4 minutes. The temperature of the center of the foam plaque when the platens reached their set point was 160 degrees Celsius. At the end of the 4 minutes, the center temperature of the foams was 172 degrees Celsius. These temperatures were read by a thermocouple that was inserted inside of the foam plaque. At the end of the 4 minutes, the closed mold was moved to the cold press and cooled until the foam temperature was less than 10° C. This typically took between 7-9 minutes. After cooling, the closed mold was opened and the compression molded plaque was removed.

TABLE 2

| Specimen | Preform Width [millimeter] | Preform Height [millimeter] | Preform Length [millimeter] | Absolute Gap on Each side [millimeter] | Dimensionless Gap [MG] |
| --- | --- | --- | --- | --- | --- |
| R2 | 80 | 16 | 180 | 0 | 0 |
| R3 | 70 | 18.3 |  | 5 | 0.125 |
| R4 | 60 | 21.3 |  | 10 | 0.25 |
| R5 | 50 | 25.6 |  | 15 | 0.375 |
| R6 | 40 | 32 |  | 20 | 0.5 |
| R7 | 30 | 42.7 |  | 25 | 0.625 |

All plaques were tested following compression molding described above using an ElectroPuls E10000 equipped with a cylindrical tupp where the contacting diameter was 44.86 millimeter. A total of 500 sinusoidal compression cycles were performed with a frequency of 2 Hertz and were force controlled to 300 N. Compressive stiffness, energy return, and efficiency were measured from these tests. Compressive stiffness for each cycle corresponds to the peak stress normalized by the strain at max load where stress and strain are defined as force/area and deflection/thickness, respectively. Efficiency was the integral of the unloading load deflection curve divided by the integral of the loading load deflection curve. Energy return was the integral of the unloading load deflection curve. The metrics reported for an individual plaque are the average of the $100^{th}$, $200^{th}$, $300^{th}$, and $400th^{th}$ cycles. An example loading series of curves for one midsole are shown below. The relevant data are indicated on the graph where "stiff"=compressive stiffness [kilopascals] and "eff"=efficiency, and "energy out"=energy return. Data are shown below for individual plaques.

TABLE 3

| Specimen | Volume Fraction Above Fill Line | Efficiency | Stiffness [kilopascals] | Energy Return [mJ] |
| --- | --- | --- | --- | --- |
| R2 | 0.375 | 0.80 | 753 | 18.8 |
| R3 | 0.453 | 0.82 | 697 | 20.5 |
| R4 | 0.531 | 0.84 | 660 | 21.5 |
| R5 | 0.609 | 0.86 | 565 | 26.4 |
| R6 | 0.688 | 0.90 | 544 | 27.1 |
| R7 | 0.766 | 0.89 | 382 | 29.3 |

Example 3. Imaging of Cell Structure in Exemplary Foam Materials

Plaque samples were prepared as described above using plaque preforms comprising various ethylene vinyl-acetate foam materials as follows: (a) Foam 1 is a compression molded plaque prepared using a plaque foam preform comprising an ethylene-vinyl acetate copolymer (EVA) foam material utilized in the midsole of Nike Epic Lunar Control Models 3 and 4 marketed in 2015 and 2016; (b) Foam 2 is compression molded plaque prepared using a plaque foam preform comprising an EVA foam material utilized in the midsole of Nike Lunartempo Lunartempo 2 shoe models marketed in 2016 and 2017; (c) Foam 3 is compression molded plaque prepared using a plaque foam preform comprising an EVA foam material utilized in footwear midsoles; and (d) Foam 4 is compression molded plaque prepared using a plaque foam preform comprising Nike React foam material as described above. The samples were compression molded as described above. The control sample was molded with no gap between preform and the mold, having the dimensions described above for specimen $R_2$ (MG is essentially 0). A representative sample of an exemplary foam material was compression molded with the dimensions and gap between the preform and molded as described above for specimen $R_5$ (MG=0.375).

Figure 10A:
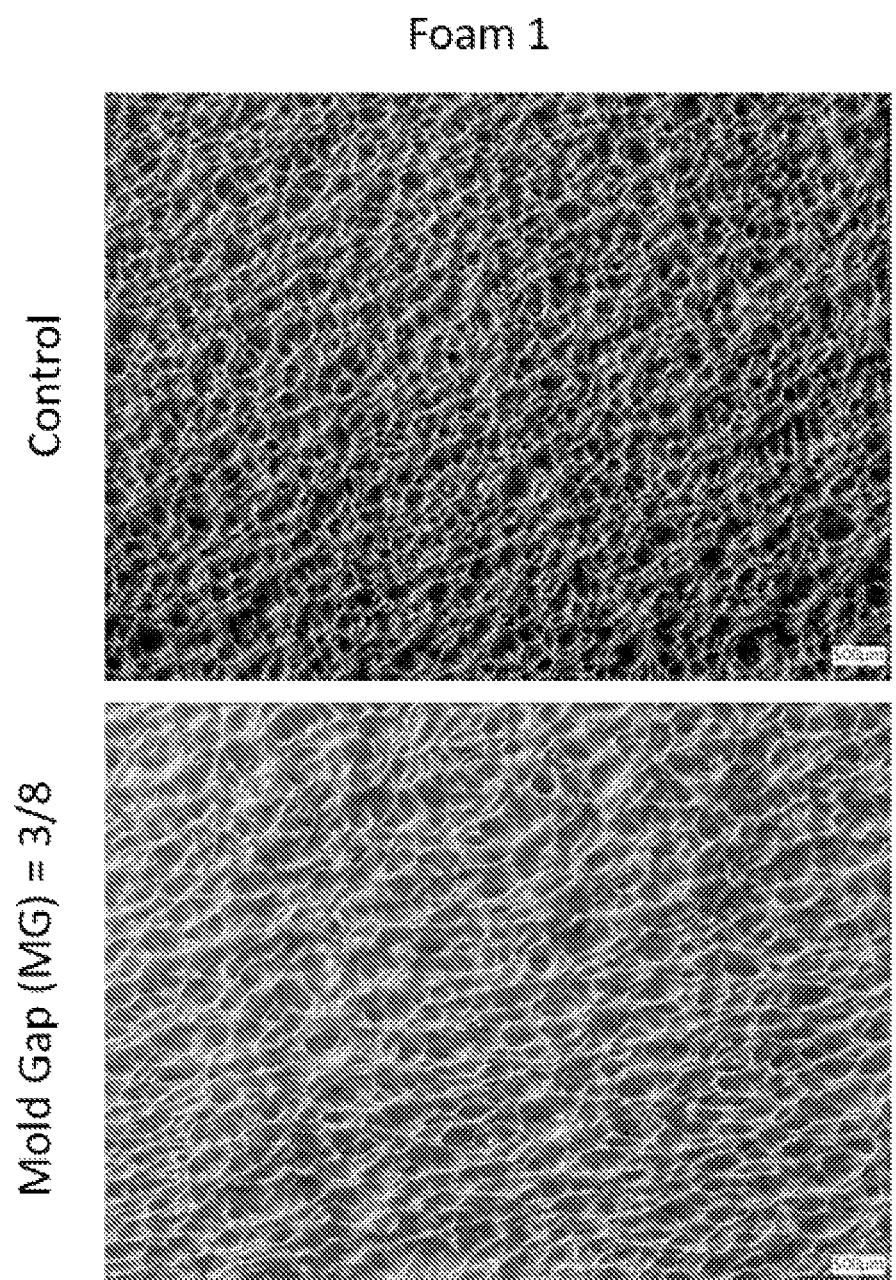
FIGS. 10A-10D show representative high contrast optical micrographs of representative foam plaque specimen cross-sections made using the disclosed methods. The scale bar shown in the lower right of each image is 500 micrometers.
Figure 10B:
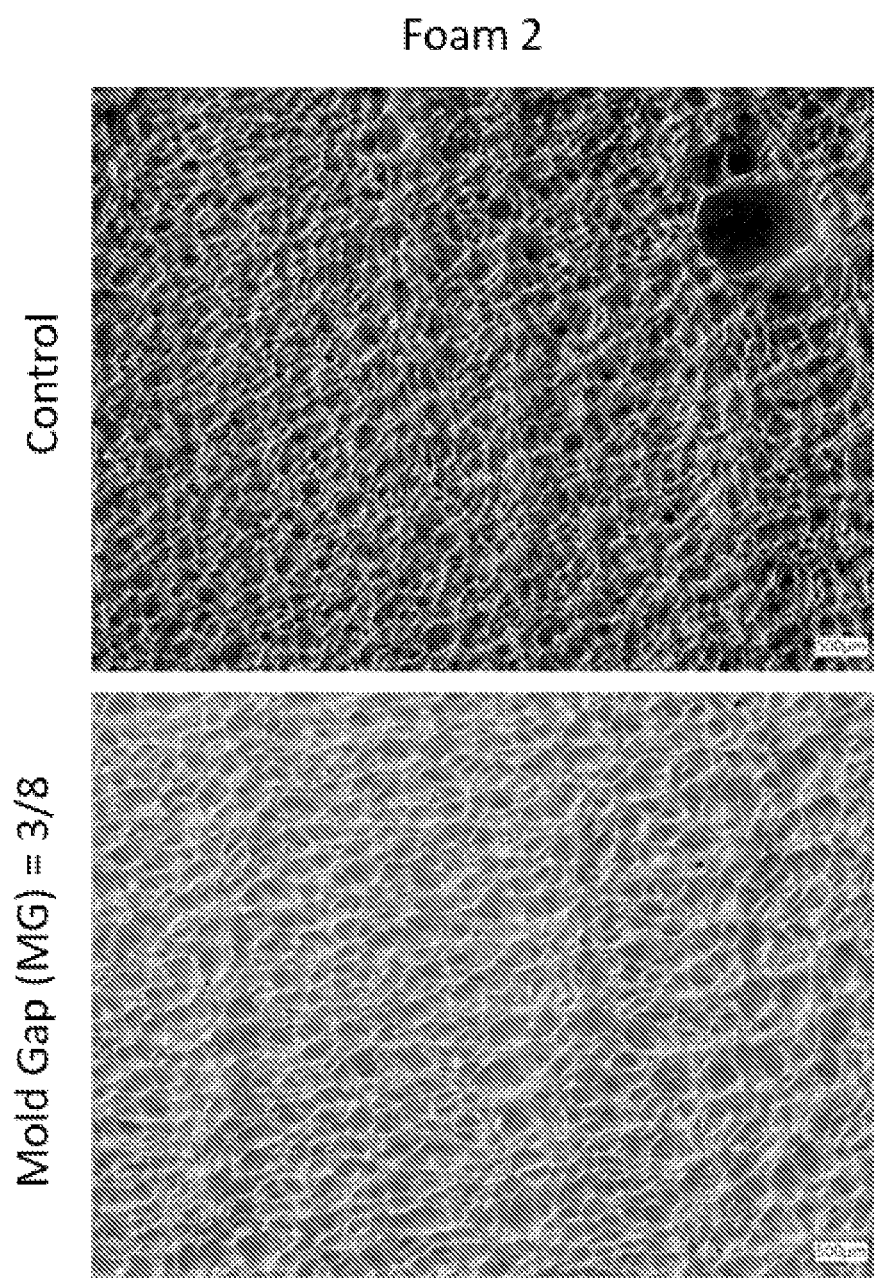
Figure 10C:
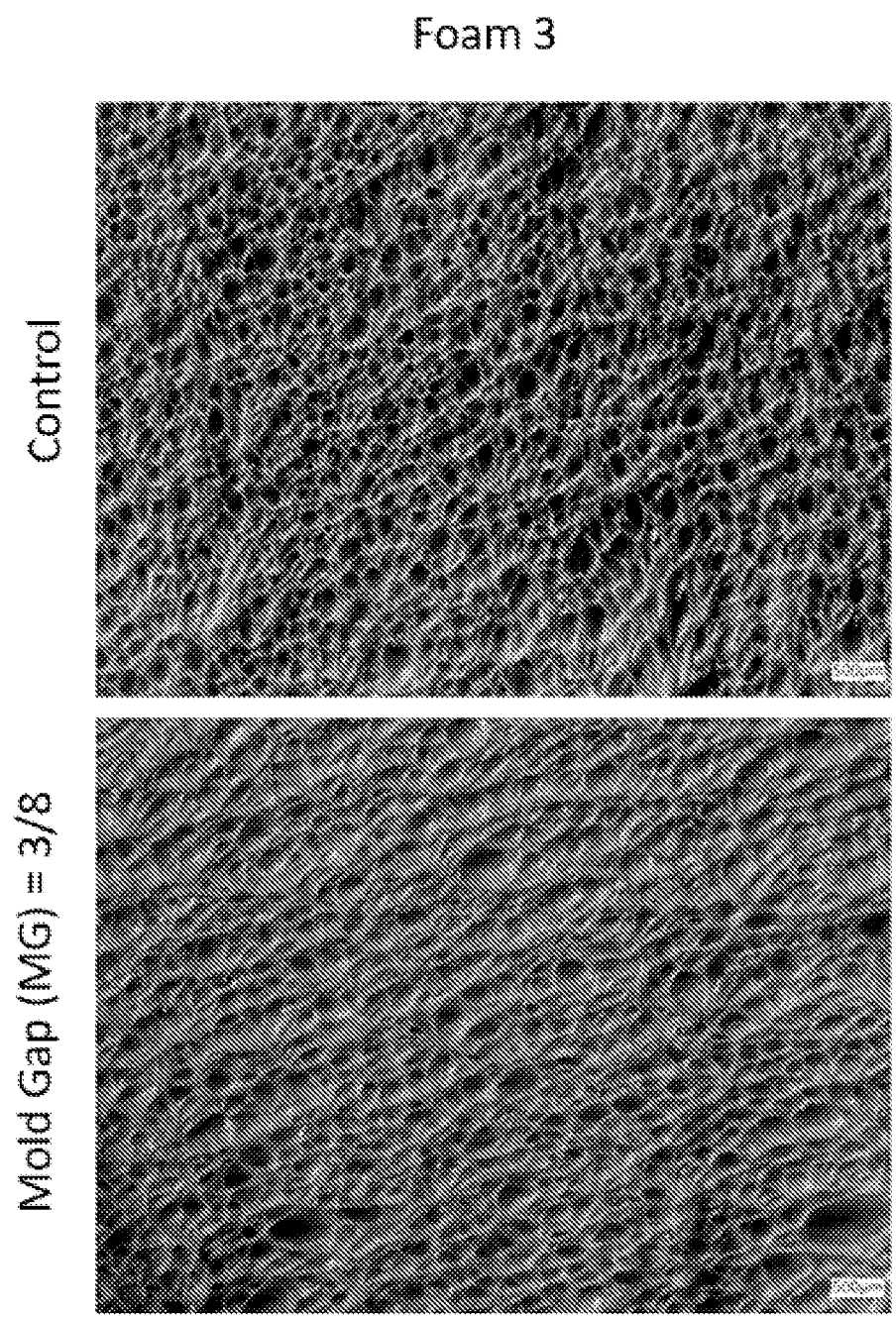
Figure 10D:
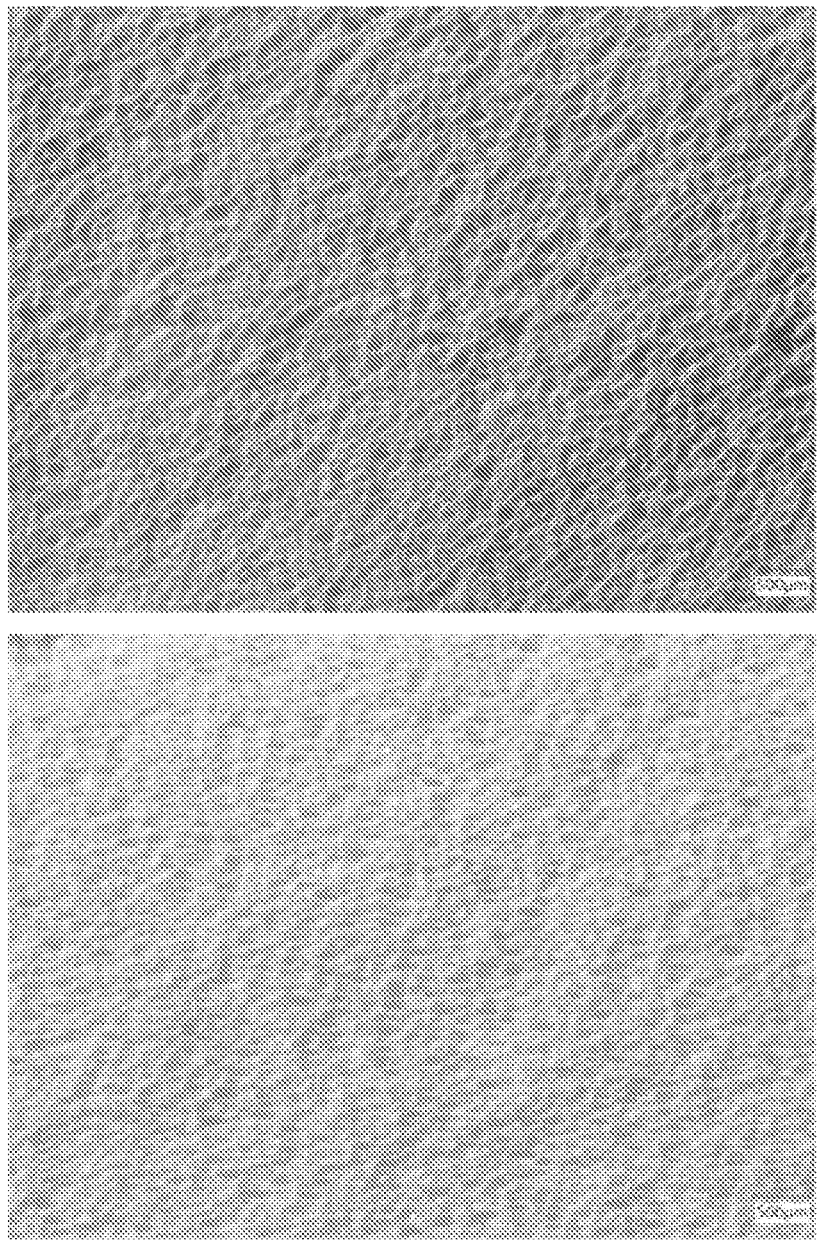

Exemplary optical micrographs of the samples described were prepared and analyzed as follows: Foam 1 (FIG. 10A); Foam 2 (FIG. 10B); Foam 3 (FIG. 10C); and Foam 4 (FIG. 10D). Cell aspect ratio was then measured via micrographic analysis of optical micrographs shown in FIGS. 10A-10D. High contrast optical micrographs were acquired of areas of representative foam structure. A grid of 48 regularly spaced points was placed on each micrograph corresponding to 0.625 square millimeters per point. The foam cell contained by each point was fit with an ellipse. If a point did not fall within a cell, the cell nearest the point was fit. From the fitted ellipse, the major and minor axes were identified. The aspect ratio of each cell was approximated by the ratio of the length of the major axis relative to the minor axis. The aspect ratio corresponds to the average aspect ratio of all the fitted ellipses for a given sample, and data are shown in Tables 4-7 below for samples Foam 1, Foam 2, Foam 3, and Foam 4, respectively.

TABLE 4

Foam 1.

| Property | Control | MG* | % Δ |
| --- | --- | --- | --- |
| Stiffness [kPa] | 450 | 350 | −22 |
| Efficiency [%] | 0.86 | 0.90 | +4.7 |
| Energy Return [mJ] | 32 | 38 | +19 |
| Cell Aspect Ratio | 1.27 | 2.07 | |

*MG is mold gap, which was ⅜ in the foregoing testing.

TABLE 5

Foam 2.

| Property | Control | MG* | % Δ |
| --- | --- | --- | --- |
| Stiffness [kPa] | 533 | 377 | −29 |
| Efficiency [%] | 0.76 | 0.85 | +12 |
| Energy Return [mJ] | 26 | 31 | +22 |
| Cell Aspect Ratio | 1.29 | 2.10 | |

*MG is mold gap, which was ⅜ in the foregoing testing.

TABLE 6

Foam 3.

| Property | Control | MG* | % Δ |
| --- | --- | --- | --- |
| Stiffness [kPa] | 1070 | 560 | −47 |
| Efficiency [%] | 0.78 | 0.82 | +5.1 |
| Energy Return [mJ] | 14 | 25 | +78 |
| Cell Aspect Ratio | 1.39 | 2.43 | |

*MG is mold gap, which was ⅜ in the foregoing testing.

TABLE 7

Foam 4.

| Property | Control | MG* | % Δ |
| --- | --- | --- | --- |
| Stiffness [kPa] | 753 | 565 | −25 |
| Efficiency [%] | 0.80 | 0.86 | +7.5 |
| Energy Return [mJ] | 23 | 28 | +22 |
| Cell Aspect Ratio | 1.33 | 2.73 | |

*MG is mold gap, which was ⅜ in the foregoing testing.

In the foregoing tables, mold gap (MG) is, because of the shape of the plaque samples and plaque mold, calculated as follows:

$$MG = \frac{(\text{Plaque mold width} - preform \text{ width})}{(\text{Plaque mold width})}.$$

In all four tests described above (Tables 4-7 and FIGS. 10A-10D), the molding method disclosed herein was effective in: (a) decreasing the stiffness of each foam by at least 20 percent; (b) increasing the efficiency of each foam by over 4.5 percent; and (c) increasing the energy return of each foam by at least 15 percent, as compared to the control foams comprising the same polymeric material and substantially similar densities molded using a conventional compression molding process. The micrographs of the corresponding foam structures show significant alterations to the cell shapes in the foam structures of the exemplary foams. In all four test samples prepared using the disclosed molding methods, the average cell aspect ratios were found to be greater than two, with increases of at least 0.8 over the conventionally compression molded control foams, which had substantially isotropic cells in their foam structures.

It should be emphasized that the above-described aspects of the present disclosure are merely possible examples of implementations, and are set forth only for a clear understanding of the principles of the disclosure. Many variations and modifications may be made to the above-described aspects of the disclosure without departing substantially from the spirit and principles of the disclosure. All such modifications and variations are intended to be included herein within the scope of this disclosure.

What is claimed:
1. A method of preparing a midsole, comprising:
    arranging a preform in a compression mold;
        wherein the preform comprises a polymeric foam material having a closed cell foam structure;
        wherein the preform is associated with a preform x-axis, y-axis, and z-axis such that each axis is perpendicular to the other two;
        wherein the preform has a preform longitudinal dimension parallel to the preform y-axis of a preform x-y plane;

wherein the preform z-axis is parallel to a direction of compression applied to the compression mold;

wherein the preform has a preform height that is a dimension parallel to the preform z-axis;

wherein the preform has an initial preform height equal to the preform height prior to compression molding;

wherein the preform has a preform area comprising an area of the preform x-y plane; and wherein the preform has an initial preform area that is the preform area prior to compression molding;

wherein the compression mold comprises a mold cavity; and wherein the mold cavity is associated with a mold cavity x-axis, y-axis, and z-axis such that each axis is perpendicular to the other two;

wherein the mold cavity has a mold cavity longitudinal dimension parallel to the mold cavity y-axis of a mold cavity x-y plane;

wherein the mold cavity z-axis is parallel to the direction of compression applied to the compression mold;

wherein the mold cavity has a mold cavity height that is a dimension parallel to the preform z-axis when the mold is closed;

wherein the mold cavity has a mold cavity area corresponding to an area of a mold cavity bottom; and wherein the mold cavity bottom is a mold cavity x-y plane opposite a mold cavity opening;

wherein the initial preform area is less than about 75 percent the mold cavity area;

wherein the arranging comprises aligning the preform x-axis, y-axis, and z-axis with the mold cavity x-axis, y-axis, and z-axis; and wherein the initial preform height is from about 1.1- to about 5-fold greater than the mold cavity height;

closing the compression mold and compressing the preform into a closed mold cavity;

applying heat, pressure, or a combination of both to the closed mold cavity for a duration of time to:

(a) alter at least one preform dimension along the preform x-axis, y-axis, and z-axis; and (b) alter the closed cell foam structure to a closed cell foam structure having a greater proportion of anisotropic cell shapes, thereby forming a compression molded foam article;

opening the compression mold after the at least one preform dimension in the preform x-axis, y-axis, and z-axis and the closed cell foam structure are altered;

removing the compression molded foam article from the compression mold;

wherein the compression molded foam article retains dimensions of the closed mold cavity within about plus or minus 50 percent; and wherein the compression molded foam article has the closed cell foam structure having a greater proportion of closed cells with the anisotropic cell shapes as compared to the preform, or having substantially the same proportion of closed cells with the anisotropic cell shapes as compared to the preform, where an average aspect ratio of the proportion of the closed cells with the anisotropic cell shapes is greater as compared to the preform, or both the proportion and the average aspect ratio of closed cells with the anisotropic cell shapes are greater in the closed cell foam structure of the compression molded foam article as compared to the close call foam structure of the preform.

2. The method of claim 1, wherein a region of the compression molded foam article includes the greater proportion of closed cells with the anisotropic cell shapes, or includes the closed cells with the greater average aspect ratio, or both, and the region occupies at least 1 cubic centimeter of a total volume of the compression molded foam article, and wherein the region does not include an external skin of the compression molded foam article.

3. The method of claim 1, further comprising compressing the preform until a compression ratio of about 1.2 to about 4.0 is achieved; wherein the compression ratio is a ratio of initial preform height to mold cavity depth; wherein the initial preform height is an average height of the preform determined along an axis oriented parallel to the direction in which the compression is applied during compression molding; wherein the initial preform height is determined prior to compression molding; and wherein the mold cavity depth is an average depth of the cavity determined along an axis oriented parallel to the direction in which the compression is applied during compression molding.

4. A method of preparing a midsole, comprising:

arranging a preform in a compression mold;

wherein the preform comprises a polymeric material having a closed cell foam structure;

wherein the preform is associated with a preform x-axis, y-axis, and z-axis such that each axis is perpendicular to the other two;

wherein the preform has a preform longitudinal dimension parallel to the preform y-axis of a preform x-y plane;

wherein the preform z-axis is parallel to a direction of compression applied to the compression mold;

wherein the preform has a plurality of initial preform widths;

wherein each initial preform width of the plurality of initial preform widths is designated as $IPW_i$;

wherein i is an integer having a value of 1 to 100; and wherein each $IPW_i$ has a dimension parallel to the preform x-axis of the preform x-y plane at a position, $Y_i$, along the preform longitudinal dimension prior to compression molding;

wherein the preform has a preform height;

wherein the preform height is a dimension parallel to the preform z-axis; and wherein an initial preform height is the preform height prior to compression molding;

wherein the compression mold comprises a mold cavity associated with a mold cavity x-axis, y-axis, and z-axis such that each axis is perpendicular to the other two;

wherein the mold cavity has a longitudinal dimension parallel to the mold cavity y-axis of a mold cavity x-y plane;

wherein the mold cavity z-axis is parallel to the direction of compression applied to the compression mold;

wherein the mold cavity has a plurality of mold cavity widths;

wherein each mold cavity width of the plurality of mold cavity widths is designated as $CW_j$;

wherein j is an integer having a value of 1 to 100;

wherein each $CW_j$ has a dimension parallel to the mold cavity x-axis of the mold cavity x-y plane of the preform at a position, $P_j$, along the mold
cavity longitudinal dimension;
wherein the mold cavity has a mold cavity height
that is a dimension parallel to the preform z-axis
when the mold is closed;
wherein the arranging comprises aligning the preform
x-axis, y-axis, and z-axis with the mold cavity
x-axis, y-axis, and z-axis;
wherein each $P_i$ is associated with a corresponding
position of the preform longitudinal dimension when
the preform y-axis and the mold cavity y-axis are
aligned;
wherein the initial preform height is from about 1.1- to
about 5-fold greater than the mold cavity height;
wherein the preform and the mold cavity are associated
with a plurality of mold gaps;
wherein each mold gap of the plurality of mold gaps
is designated as $MG_k$;
wherein k is an integer having a value of 1 to 100;
wherein each $MG_k$ is obtained from the following
equation:

$$MG_k = \frac{CW_j - IPW_i}{CW_j}$$

and wherein each mold gap is independently from
about 0.200 to about 0.7;
closing the compression mold and compressing the preform into a closed mold cavity;
applying heat, pressure, or a combination of both to the
closed mold cavity for a duration of time to:
(a) alter at least one preform dimension along the preform
x-axis, y-axis, and z-axis; and
(b) alter the closed cell foam structure of the preform to
a closed cell foam structure having a greater proportion
of anisotropic cell shapes, thereby forming a compression molded foam article;
opening the compression mold after the at least one
preform dimension in the preform x-axis, y-axis, and
z-axis and the closed cell foam structure are altered;
removing the compression molded foam article from the
compression mold;
wherein the compression molded foam article retains
dimensions of the closed mold cavity within about
plus or minus 50 percent; and
wherein the compression molded foam article has the
closed cell foam structure having a greater proportion of closed cells with the anisotropic cell shapes as
compared to the preform, or having substantially the
same proportion of closed cells with the anisotropic
cell shapes as compared to the preform, where an
average aspect ratio of the proportion of the closed
cells with the anisotropic cell shapes is greater as
compared to the preform, or both the proportion and
the average aspect ratio of closed cells with the
anisotropic cell shapes are greater in the closed cell
foam structure of the compression molded foam
article as compared to the closed cell foam structure
of the preform.

5. The method of claim 4, wherein a region of the
compression molded foam article includes the greater proportion of closed cells with the anisotropic cell shapes, or
includes the closed cells with the greater average aspect
ratio, or both, and the region occupies at least 1 cubic
centimeter, or at least 3 cubic centimeters, or at least 5 cubic centimeters of a total volume of the compression molded
foam article, and wherein the region does not include an
external skin of the compression molded foam article.

6. The method of claim 4, wherein each mold gap, $MG_k$,
is independently about 0.200 to about 0.625.

7. The method of claim 4, further comprising compressing
the preform until a compression ratio of about 1.2 to about
4.0 is achieved; wherein the compression ratio is a ratio of
average initial preform height to average mold cavity depth;
wherein the average initial preform height is an average
height of the preform determined along an axis oriented
parallel to the direction in which the compression is applied
during compression molding; wherein the average initial
preform height is determined prior to compression molding;
and wherein the average mold cavity depth is an average
depth of the cavity determined along an axis oriented
parallel to the direction in which the compression is applied
during compression molding.

8. A method of preparing a midsole, comprising:
arranging a preform in a compression mold;
wherein the preform comprises a polymeric material
having a closed cell foam structure;
wherein the preform is associated with a preform
x-axis, y-axis, and z-axis such that each axis is
perpendicular to the other two;
wherein the preform has a preform longitudinal
dimension parallel to the preform y-axis of a
preform x-y plane;
wherein the preform z-axis is parallel to a direction
of compression applied to the compression mold;
wherein the preform has a preform height that is a
dimension parallel to the preform z-axis;
wherein the preform has an initial preform height
equal to the preform height prior to compression
molding;
wherein the preform has a preform volume; and
wherein the preform has an initial preform volume
that is the preform volume prior to compression
molding;
wherein the compression mold comprises a mold cavity; and wherein the mold cavity is associated with a
mold cavity x-axis, y-axis, and z-axis such that each
axis is perpendicular to the other two;
wherein the mold cavity has a longitudinal dimension parallel to the mold cavity y-axis of a mold
cavity x-y plane;
wherein the mold cavity z-axis is parallel to the
direction of compression applied to the compression mold;
wherein the mold cavity has a mold cavity height
that is a dimension parallel to the preform z-axis
when the mold is closed;
wherein the mold cavity has a mold cavity volume
associated with the mold when it is closed;
wherein the arranging comprises aligning the preform
x-axis, y-axis, and z-axis with the mold cavity
x-axis, y-axis, and z-axis;
wherein the initial preform height is from about 1.1- to
about 5-fold greater than the mold cavity height;
wherein less than about 75 percent of the mold cavity
volume is occupied by the preform; and
wherein at least 30 percent of the initial preform
volume is positioned outside the mold cavity;
closing the compression mold and compressing the preform into a closed mold cavity;

applying heat, pressure, or a combination of both to the closed mold cavity for a duration of time to:
(a) alter at least one preform dimension along the preform x-axis, y-axis, and z-axis; and
(b) alter the closed cell foam structure of the preform to a closed cell foam structure having a greater proportion of anisotropic cell shapes, thereby forming a compression molded foam article;
opening the compression mold after the at least one preform dimension in the preform x-axis, y-axis, and z-axis and the closed cell foam structure are altered;
removing the compression molded foam article from the compression mold;
wherein the compression molded foam article retains dimensions of the closed mold cavity within about plus or minus 50 percent; and
wherein the compression molded foam article has the closed cell foam structure having a greater proportion of closed cells with the anisotropic cell shapes as compared to the preform, or having substantially the same proportion of closed cells with the anisotropic cell shapes as compared to the preform, where an average aspect ratio of the proportion of the closed cells with the anisotropic cell shapes is greater as compared to the preform, or both the proportion and the average aspect ratio of closed cells with the anisotropic cell shapes are greater in the closed cell foam structure of the compression molded foam article as compared to the closed cell foam structure of the preform.

9. The method of claim 8, wherein a region of the compression molded foam article includes the greater proportion of closed cells with the anisotropic cell shapes, or includes the closed cells with the greater average aspect ratio, or both, and the region occupies at least 1 cubic centimeter, or at least 3 cubic centimeters, or at least 5 cubic centimeters of a total volume of the compression molded foam article, and wherein the region does not include an external skin of the compression molded foam article.

10. The method of claim 8, wherein less than about 70 percent of the mold cavity volume is occupied by the preform; and wherein at least 55 percent of the initial preform volume is positioned outside the mold cavity.

11. The method of claim 8, wherein the compressing the preform into the closed mold cavity comprises compressing the preform until a final preform height and a final preform volume are reached; wherein the final preform height is the preform height when it is about equal to the mold cavity height; and wherein the final preform volume is the preform volume when it is about equal to the mold cavity volume.

12. The method of claim 8, wherein the initial preform height is from about 1.1- to about 4- fold greater than the mold cavity height.

13. The method of claim 8, wherein the compression molded foam article is associated with a compression molded foam article x-axis, y-axis, and z-axis such that each axis is perpendicular to the other two;
wherein the z-axis is parallel to a direction in which compression is applied during the compressing;
wherein the x-axis and the y-axis define a plane parallel to a major surface of the foam article; and
wherein a physical property determined along the z-axis is different from the physical property determined along the x-axis, the y-axis, or both the x-axis and the y-axis;
wherein the average aspect ratio of the proportion of the closed cells with the anisotropic cell shapes that is an average ratio of the y-axis to the z-axis;
wherein a major axis is parallel to the y-axis; wherein a minor axis is parallel to the z-axis; and wherein the average aspect ratio is from about 1.5 to about 15.

14. The method of claim 13, wherein an efficiency as determined along the z-axis of the compression molded foam article is greater than about 60 percent when determined in accordance with an Efficiency Test Method.

15. The method of claim 13, wherein the compression molded foam article exhibits an efficiency as determined along the z axis that is from about 1.0 percent to about 25 percent greater than a reference foam article when determined in accordance with an Efficiency Test Method; wherein the reference foam article is a reference preform foam article prior to compression molding from which the compression molded foam article is formed; wherein the reference preform foam article comprises essentially the same polymeric material as the compression molded foam article; and wherein the reference preform foam article has a substantially isotropic cell shape.

16. The method of claim 13, wherein the compression molded foam article exhibits an efficiency of from about 1.0 percent to about 25 percent greater than a reference foam article when determined in accordance with an Efficiency Test Method; wherein the reference foam article is a reference compression molded foam article comprising essentially the same polymeric material and having substantially the same density as the compression molded foam article; and wherein the reference compression molded foam article has a substantially isotropic cell shape.

17. The method of claim 13, wherein the compression molded foam article exhibits a stiffness value in the z-axis of the compression molded foam article from about 300 kilopascal to about 2000 kilopascal when determined in accordance with an Efficiency Test Method.

18. The method of claim 13, wherein about 40 percent to about 100 percent of the compression molded foam article comprises the anisotropic cell shape.

19. The method of claim 13, wherein the compression molded foam article is a cushioning element for an article of footwear.

* * * * *

UNITED STATES PATENT AND TRADEMARK OFFICE
CERTIFICATE OF CORRECTION

| | |
|---|---|
| PATENT NO. | : 11,612,210 B2 |
| APPLICATION NO. | : 16/458606 |
| DATED | : March 28, 2023 |
| INVENTOR(S) | : Rainer Malinowski et al. |

It is certified that error appears in the above-identified patent and that said Letters Patent is hereby corrected as shown below:

In the Claims

Claim 1, Column 84, Line 2: "the close call foam structure" should read --the closed cell foam structure--.

Claim 4, Column 85, Line 9: "wherein each $P_i$" should read --wherein each $P_j$--.

Signed and Sealed this
Fourth Day of July, 2023

Katherine Kelly Vidal
*Director of the United States Patent and Trademark Office*